(12) United States Patent
Moon et al.

(10) Patent No.: US 11,581,937 B2
(45) Date of Patent: Feb. 14, 2023

(54) METHOD AND APPARATUS FOR GENERATING BEAM MEASUREMENT INFORMATION IN A WIRELESS COMMUNICATION SYSTEM

(71) Applicant: Samsung Electronics Co., Ltd., Suwon-si (KR)

(72) Inventors: Jungmin Moon, Suwon-si (KR);
Eunyong Kim, Yongin-si (KR);
Heewon Kang, Seongnam-si (KR);
Jaedong Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/390,751

(22) Filed: Apr. 22, 2019

(65) Prior Publication Data
US 2019/0253128 A1    Aug. 15, 2019

Related U.S. Application Data

(63) Continuation of application No. 15/407,889, filed on Jan. 17, 2017, now Pat. No. 10,270,514.
(Continued)

(30) Foreign Application Priority Data

Jan. 16, 2017    (KR) ........................ 10-2017-0007322

(51) Int. Cl.
*H04B 7/08*    (2006.01)
*H04B 7/06*    (2006.01)

(52) U.S. Cl.
CPC ........... *H04B 7/088* (2013.01); *H04B 7/0695* (2013.01); *H04B 7/063* (2013.01)

(58) Field of Classification Search
CPC .......... H04W 72/0413; H04W 72/1284; H04B 7/0695; H04B 7/063; H04B 7/088
See application file for complete search history.

(56) References Cited

U.S. PATENT DOCUMENTS

| | | | |
|---|---|---|---|
| 10,425,139 B2 | 9/2019 | Guo et al. | |
| 10,512,008 B2 | 12/2019 | Deenoo et al. | |
| (Continued) | | | |

FOREIGN PATENT DOCUMENTS

| | | |
|---|---|---|
| CN | 101352089 A | 1/2009 |
| CN | 103765794 A | 4/2014 |
| (Continued) | | |

OTHER PUBLICATIONS

U.S. Non-Final Office Action dated Aug. 6, 2018, issued in U.S. Appl. No. 15/407,954.
(Continued)

*Primary Examiner* — Sung S Ahn
(74) *Attorney, Agent, or Firm* — Jefferson IP Law, LLP

(57) ABSTRACT

The present disclosure is related to a $5^{th}$ generation (5G) or pre-5G communication system to be provided to support a higher data transmission rate since $4^{th}$ generation (4G) communication systems like long-term evolution (LTE). A method for generating beam measurement information of user equipment (UE) is provided. The method of UE includes receiving a first reference signal from a base station, requesting a transmission of a second reference signal when a result of measuring the first reference signal satisfies a predetermined condition, receiving the second reference signal, and generating a measurement result based on the second reference signal.

12 Claims, 57 Drawing Sheets

Related U.S. Application Data

(60) Provisional application No. 62/350,404, filed on Jun. 15, 2016, provisional application No. 62/329,562, filed on Apr. 29, 2016, provisional application No. 62/325,059, filed on Apr. 20, 2016, provisional application No. 62/321,266, filed on Apr. 12, 2016, provisional application No. 62/278,629, filed on Jan. 14, 2016.

(56) References Cited

U.S. PATENT DOCUMENTS

| | | |
|---|---|---|
| 2009/0316811 A1 | 12/2009 | Maeda et al. |
| 2011/0211490 A1 | 9/2011 | Nikula et al. |
| 2012/0039197 A1 | 2/2012 | Jang et al. |
| 2012/0108281 A1 | 5/2012 | Niu et al. |
| 2012/0115463 A1 | 5/2012 | Weng et al. |
| 2012/0208541 A1 | 8/2012 | Luo et al. |
| 2013/0059619 A1 | 3/2013 | Kim et al. |
| 2013/0231058 A1 | 9/2013 | Ramachandran et al. |
| 2013/0301454 A1* | 11/2013 | Seol ............ H04B 7/043 370/252 |
| 2013/0315083 A1 | 11/2013 | Jung |
| 2014/0044044 A1 | 2/2014 | Josiam et al. |
| 2014/0105042 A1 | 4/2014 | Cui |
| 2014/0146863 A1 | 5/2014 | Seol et al. |
| 2014/0161103 A1 | 6/2014 | Sirotkin et al. |
| 2014/0198681 A1 | 7/2014 | Jung et al. |
| 2014/0241274 A1* | 8/2014 | Lee ............ H04L 5/0048 370/329 |
| 2014/0268133 A1 | 9/2014 | McManus et al. |
| 2014/0341310 A1 | 11/2014 | Rahman et al. |
| 2015/0146618 A1* | 5/2015 | Ko ............ H04B 7/0456 370/328 |
| 2015/0236774 A1 | 8/2015 | Son et al. |
| 2015/0358064 A1 | 12/2015 | Benjebbour et al. |
| 2016/0006122 A1 | 1/2016 | Seol et al. |
| 2016/0044518 A1 | 2/2016 | Centonza et al. |
| 2016/0049997 A1 | 2/2016 | Onodera et al. |
| 2016/0095102 A1 | 3/2016 | Yu et al. |
| 2016/0134408 A1* | 5/2016 | Kim ............ H04L 5/0048 370/329 |
| 2016/0142189 A1 | 5/2016 | Shin et al. |
| 2016/0149679 A1 | 5/2016 | Frenne et al. |
| 2016/0157267 A1 | 6/2016 | Frenne et al. |
| 2016/0277954 A1 | 9/2016 | Frenne et al. |
| 2016/0373915 A1 | 12/2016 | Kim et al. |
| 2016/0381610 A1 | 12/2016 | Pu et al. |
| 2017/0034730 A1 | 2/2017 | Zhang et al. |
| 2018/0123669 A1 | 5/2018 | Xi et al. |
| 2018/0199328 A1 | 7/2018 | Sang et al. |
| 2019/0319686 A1 | 10/2019 | Chen, IV et al. |

FOREIGN PATENT DOCUMENTS

| | | |
|---|---|---|
| CN | 104335500 A | 2/2015 |
| CN | 104521155 A | 4/2015 |
| CN | 104541540 A | 4/2015 |
| CN | 104956604 A | 9/2015 |
| CN | 105103598 A | 11/2015 |
| EP | 2077677 A1 | 7/2009 |
| EP | 2882110 A1 | 6/2015 |
| EP | 2 790 440 B1 | 4/2016 |
| KR | 10-2012-0016583 A | 2/2012 |
| KR | 10-2015-0098324 A | 8/2015 |
| WO | 2010/052519 A1 | 5/2010 |
| WO | 2015/080645 A1 | 6/2015 |
| WO | 2015/109153 A1 | 7/2015 |
| WO | 2015/190648 A1 | 12/2015 |
| WO | 2017/123079 A1 | 7/2017 |
| WO | 2018/017840 A1 | 1/2018 |
| WO | 2018/034698 A1 | 2/2018 |
| WO | 2018/056728 A1 | 3/2018 |
| WO | 2018/126876 A1 | 7/2018 |

OTHER PUBLICATIONS

European Search Report dated Jan. 7, 2019, issued in European Patent Application No. 17738708.1.
U.S. Final Office Action dated Jan. 4, 2019, issued in U.S. Appl. No. 15/407,954.
Extended European Search Report dated Aug. 19, 2019, issued in European Patent Application No. 17738707.3.
European Office Action dated Jul. 7, 2020, issued in European Application No. 17738707.3-1220.
U.S. Non-Final Office Action dated Sep. 11, 2020, issued in U.S. Appl. No. 16/685,682.
Indian Office Action dated May 11, 2021, issued in Indian Application No. 201817026157.
U.S. Notice of Allowance dated Jan. 27, 2021, issued in U.S. Appl. No. 16/685,682.
Chinese Office Action dated Sep. 1, 2022, issued in Chinese Application No. 201780006789.3.

* cited by examiner

FIG. 2A

| Full sweep interval 1 | Tx beam | 1 | 2 | 3 | ... | $N_{TX}$ | 1 | 2 | 3 | ... | $N_{TX}$ | ... | 1 | 2 | 3 | ... | $N_{TX}$ |
|---|---|---|---|---|---|---|---|---|---|---|---|---|---|---|---|---|---|
| | Rx beam | 1 | | | | | 2 | | | | | | $N_{RX}$ | | | | |
| | RSRP | | | | | | | | | | | | | | | | |

| Full sweep interval 2 | Tx beam | 1 | 2 | 3 | ... | $N_{TX}$ | 1 | 2 | 3 | ... | $N_{TX}$ | ... | 1 | 2 | 3 | ... | $N_{TX}$ |
|---|---|---|---|---|---|---|---|---|---|---|---|---|---|---|---|---|---|
| | Rx beam | 1 | | | | | 2 | | | | | | $N_{RX}$ | | | | |
| | RSRP | | | | | | | | | | | | | | | | |

| Full sweep interval K | Tx beam | 1 | 2 | 3 | ... | $N_{TX}$ | 1 | 2 | 3 | ... | $N_{TX}$ | ... | 1 | 2 | 3 | ... | $N_{TX}$ |
|---|---|---|---|---|---|---|---|---|---|---|---|---|---|---|---|---|---|
| | Rx beam | 1 | | | | | 2 | | | | | | $N_{RX}$ | | | | |
| | RSRP | | | | | | | | | | | | | | | | |

FIG. 2B

| Full sweep interval 1 | Tx beam | 1 | | | | 1 | | | | | 2 | | | | | ... | $N_{TX}$ | | | |
|---|---|---|---|---|---|---|---|---|---|---|---|---|---|---|---|---|---|---|---|---|
| | Rx beam | 1 | 2 | 3 | ... | $N_{RX}$ | 1 | 2 | 3 | ... | $N_{RX}$ | 1 | 2 | 3 | ... | $N_{RX}$ | 1 | 2 | 3 | ... | $N_{RX}$ |
| | RSRP | | | | | | | | | | | | | | | | | | | |

| Full sweep interval 2 | Tx beam | 1 | | | | 1 | | | | | 2 | | | | | ... | $N_{TX}$ | | | |
|---|---|---|---|---|---|---|---|---|---|---|---|---|---|---|---|---|---|---|---|---|
| | Rx beam | 1 | 2 | 3 | ... | $N_{RX}$ | 1 | 2 | 3 | ... | $N_{RX}$ | 1 | 2 | 3 | ... | $N_{RX}$ | 1 | 2 | 3 | ... | $N_{RX}$ |
| | RSRP | | | | | | | | | | | | | | | | | | | |

| Full sweep interval K | Tx beam | 1 | | | | 1 | | | | | 2 | | | | | ... | $N_{TX}$ | | | |
|---|---|---|---|---|---|---|---|---|---|---|---|---|---|---|---|---|---|---|---|---|
| | Rx beam | 1 | 2 | 3 | ... | $N_{RX}$ | 1 | 2 | 3 | ... | $N_{RX}$ | 1 | 2 | 3 | ... | $N_{RX}$ | 1 | 2 | 3 | ... | $N_{RX}$ |
| | RSRP | | | | | | | | | | | | | | | | | | | |

FIG. 6

| | Phase 1 | | | | | | | | | | Phase 2 | | | |
|---|---|---|---|---|---|---|---|---|---|---|---|---|---|---|
| | Wide TX beams at BS and narrow RX beams at UE | | | | | | | | | | Narrow TX/RX beams at BS and UE | | | |
| Tx beam | 1 | | | 2 | | | ... | $W_{TX}$ | | | 1 | 2 | 3 | 4 | ... | $N_{TX}$ |
| Rx beam | 1 | 2 | ... | $N_{RX}$ | 1 | 2 | ... | $N_{RX}$ | ... | 1 | 2 | ... | $N_{RX}$ | Best RX beam among (1...$N_{RX}$) |
| RSRP | | | | | | | | | | | | | | |

FIG. 10

| | Phase 1 | | | | | | Phase 2 | | | | | |
|---|---|---|---|---|---|---|---|---|---|---|---|---|
| | Omni-directional TX beam ($W_{TX}$=1) at BS and narrow RX beams at UE | | | | | | Narrow TX/RX beams at BS and UE | | | | | |
| Tx beam | 1 | | | | | | 1 | 2 | 3 | 4 | ... | $N_{TX}$ |
| Rx beam | 1 | 2 | 3 | 4 | ... | $N_{RX}$ | Best RX beam among (1... $N_{RX}$) | | | | | |
| RSRP | | | | | | | | | | | | |

FIG. 14

| | Wide TX/RX beams at BS and UE | | | | | Wide TX beams at BS and narrow RX beams at UE | | | | | Narrow TX/RX beams at BS and UE | | | | |
|---|---|---|---|---|---|---|---|---|---|---|---|---|---|---|---|
| Tx beam | 1 | ... | $W_{TX}$ | 1 | ... | $W_{TX}$ | 1 | ... | $W_{TX}$ | 1 | ... | $W_{TX}$ | 1 | 2 | 3 | 4 | ... | $N_{TX}$ |
| Rx beam | 1 | ... | $W_{RX}$ | 1 | ... | $N_{RX}^+$ | Best RX beam among {1$^+$ ... $N_{RX}^+$} |
| RSRP | | | | | | | | | | | | | | | |

Full sweep interval

FIG. 18

"BS beam sweeping in BRS"

|  | #0 | #1 | #2 | #3 | #4 | #5 | #6 |
|---|---|---|---|---|---|---|---|
| Ant0 | wide | wide | wide | wide | wide | wide | wide |
| Ant1 | wide | wide | wide | wide | wide | wide | wide |
| Ant2 | B00 | B01 | B02 | B03 | B04 | B05 | B06 |
| Ant3 | B07 | B08 | B09 | B10 | B11 | B12 | B13 |
| Ant4 | B14 | B15 | B16 | B17 | B18 | B19 | B20 |
| Ant5 | B21 | B22 | B23 | B24 | B25 | B26 | B27 |
| Ant6 | B28 | B29 | B30 | B31 | B32 | B33 | B34 |
| Ant7 | B35 | B36 | B37 | B38 | B39 | B40 | B41 |

METHOD AND APPARATUS FOR GENERATING BEAM MEASUREMENT INFORMATION IN A WIRELESS COMMUNICATION SYSTEM

CROSS-REFERENCE TO RELATED APPLICATION(S)

This application is a continuation application of prior application Ser. No. 15/407,889, filed on Jan. 17, 2017, which was based on and claimed priority under 35 U.S.C. § 119(e) of a U.S. Provisional application Ser. No. 62/278,629, filed on Jan. 14, 2016, in the U.S. Patent and Trademark Office, of a U.S. Provisional application Ser. No. 62/321,266, filed on Apr. 12, 2016, in the U.S. Patent and Trademark Office, of a U.S. Provisional application Ser. No. 62/325,059, filed on Apr. 20, 2016, in the U.S. Patent and Trademark Office, of a U.S. Provisional application Ser. No. 62/329,562, filed on Apr. 29, 2016, in the U.S. Patent and Trademark Office, and of a U.S. Provisional application Ser. No. 62/350,404, filed on Jun. 15, 2016, in the U.S. Patent and Trademark Office, and under 35 U.S.C. § 119(a) of a Korean patent application number 10-2017-0007322, filed on Jan. 16, 2017, in the Korean Intellectual Property Office, the disclosure of each of which is incorporated by reference herein in its entirety.

TECHNICAL FIELD

The present disclosure relates to a wireless communication system. More particularly, the present disclosure relates to a method and an apparatus for generating beam measurement information in a wireless communication system.

BACKGROUND

To meet a demand for radio data traffic that is on an increasing trend since commercialization of a $4^{th}$ generation (4G) communication system, efforts to develop an improved $5^{th}$ generation (5G) communication system or a pre-5G communication system have been conducted. For this reason, the 5G communication system or the pre-5G communication system is called a communication system beyond 4G network or a system since the post long-term evolution (LTE).

To achieve a high data transmission rate, the 5G communication system is considered to be implemented in a super high frequency (mmWave) band (e.g., 60 GHz band). To relieve a path loss of a radio wave and increase a transfer distance of a radio wave in the super high frequency band, in the 5G communication system, beamforming, massive multiple-input multiple-output (MIMO), full dimensional MIMO (FD-MIMO), array antenna, analog beam-forming, large scale antenna technologies have been discussed.

Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation have been developed.

In addition to this, in the 5G system, hybrid frequency shift keying (FSK) and quadrature amplitude modulation (QAM) modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) which are an advanced access technology, and so on have been developed.

The 5G communication system may use beamforming and a terminal (e.g., user equipment (UE)) may measure signal strength of a beam (hereinafter, may be interchangeably used with a beam) transmitted by a base station (eNB, 5G-NB) and may use the measured signal to manage mobility such as a handover, a cell addition, a cell release, and a cell change. The base station may transmit a beam reference signal (BRS), which is a beamformed reference signal, by beam sweeping and the UE may receive a reference signal by the beam sweeping and measure strength, quality, or the like of the reference signal per beam pair to report the measured strength, quality, or the like of the reference signal to the base station. Further, the UE may perform communication using the beam pair having the best signal strength or quality. In the present disclosure, the information generated by allowing the UE to measure the BRS may be called beam measurement information and a transmission beam and a reception beam of the selected beam pair may be said to be aligned with each other.

When the direction of the UE is changed, the directions of the aligned transmission beam and reception beam is misaligned, and therefore communication quality may suddenly deteriorate. Therefore, the UE may change a beam using the beam measurement information. However, to allow the UE to select or change the beam, the reference signals transmitted for all the beams need to be measured by the beam sweeping and a considerable time may be consumed.

Therefore, a method for reducing deterioration in communication quality by reselecting a beam within a short time when the direction of the UE is changed, is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for requesting a reference signal to allow user equipment (UE) to reselect a beam in addition to a reference signal transmitted by setting of a base station when it is determined that a direction of the UE is changed.

Further, various embodiments of the present disclosure are directed to the provision of a method for reducing an overhead of a signal caused at the time of requesting a reference signal to allow UE to reselect a beam.

In accordance with an aspect of the present disclosure, a method of UE is provided. The method includes receiving a first reference signal from a base station, requesting a transmission of a second reference signal when a result of measuring the first reference signal satisfies a predetermined condition, receiving the second reference signal, and generating a measurement result based on the second reference signal.

In accordance with another aspect of the present disclosure, a method of a base station is provided. The method includes transmitting a first reference signal to a UE, receiving a transmission request for a second reference signal when a predetermined condition is satisfied, transmitting the second reference signal to the UE, and receiving, from the UE, a measurement result generated based on the second reference signal.

In accordance with another aspect of the present disclosure, a UE is provided. The UE includes a transceiver configured to transmit or receive a signal. and at least one processor configured to receive a first reference signal from a base station, request a transmission of a second reference signal when a result of measuring the first reference signal satisfies a predetermined condition, receive the second reference signal, and generate a measurement result based on the second reference signal.

In accordance with another aspect of the present disclosure, a base station is provided. The base station includes a transceiver configured to transmit and receive a signal, and at least one processor configured to transmit a first reference signal to a UE, receive a transmission request for a second reference signal when a predetermined condition is satisfied, transmit the second reference signal to the UE, and receive, from the UE, a measurement result generated based on the second reference signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A and 2B are diagrams illustrating a method for receiving, by UE, a BRS to generate beam measurement information according to an embodiment of the present disclosure;

FIG. 6 is a diagram illustrating a method for determining a beam pair according to the method described in FIG. 5 according to an embodiment of the present disclosure;

FIG. 10 is a diagram illustrating a method for determining a beam pair according to an embodiment of the present disclosure;

FIG. 14 is a diagram illustrating a method for determining a beam pair according to an embodiment of the present disclosure;

FIG. 18 is a diagram illustrating beam information when a plurality of beams are transmitted through a plurality of antennas according to an embodiment of the present disclosure;

Throughout the drawings, like reference numerals will be understood to refer to like parts, components, and structures.

DETAILED DESCRIPTION

Figure 1:
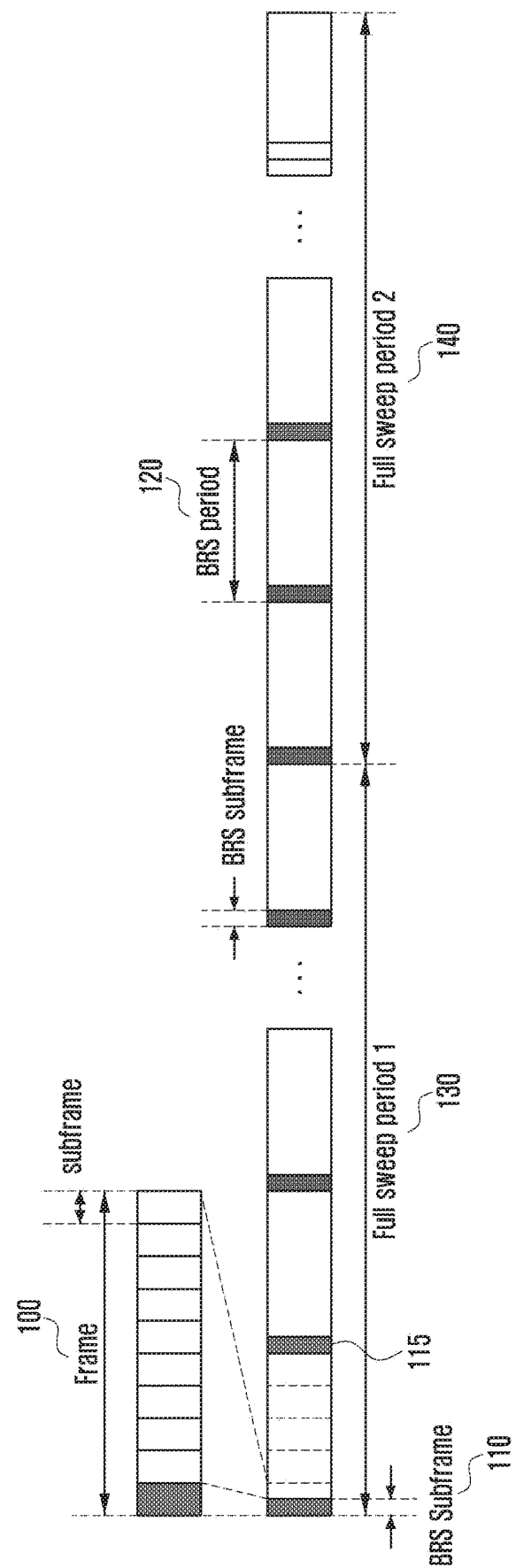
FIG. 1 is a diagram illustrating a method for receiving, by user equipment (UE), a beam reference signal (BRS) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this case, it may be understood that each block of processing flow charts and combinations of the flow charts may be performed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in each block of the flow chart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in each block of the flow chart. Since the computer program instructions may also be mounted on the computer or the other programmable data processing apparatuses, the instructions performing a series of operation operations on the computer or the other programmable data processing apparatuses to create processes executed by the computer, thereby executing the computer or the other programmable data processing apparatuses may also provide operations for performing the functions described in each block of the flow chart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are continuously shown may be simultaneously performed in fact or be performed in a reverse sequence depending on corresponding functions sometimes.

The term '-unit' used in the present disclosure means software or hardware components such as field-programmable gate array (FPGA) and application-specific integrated circuit (ASIC) and the "unit" performs any roles. However, the meaning of the term "unit" is not limited to software or hardware. The unit may be configured to be in a memory medium that may be addressed and may also be configured to reproduce one or more processor. Accordingly, for example, the unit includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the units may be combined with a smaller number of components and the units or may further separated into additional components and units. In addition, the components and the units may also be implemented to reproduce one or more central processing units (CPUs) within a device or a security multimedia card.

The present disclosure relates to a method for measuring signal strength of a beam transmitted (hereinafter, interchangeably used with a beam) from user equipment (UE) to a base station in a mobile communication system on the basis of beamforming (hereinafter, interchangeably used with beamforming). The UE may measure the signal strength of the beam transmitted by the base station and use the measured result to perform the following operations.

The UE may measure the signal strength of the beam transmitted by the base station and use the measured result to perform handover.

The UE may measure the signal strength of the beam transmitted by the base station and use the measured result to perform a cell addition, a cell release, a cell switch, and a cell change.

The UE may measure the signal strength of the beam transmitted by the base station and may use the measured result to perform beam measurement information feedback (from the UE to the base station) transmitted to the base station and switch a beam used for communication.

The environment considered in the present disclosure is as follows.

The base station may use an array antenna or the like to form $N_{BS}$ beams and use the formed $N_{BS}$ beams for communication with the UE. When transmitting downlink (DL) data to the UE, the base station may select beams suitable for DL communication with the UE among the $N_{BS}$ beams to transmit the DL data and when receiving uplink (UL) data from the UE, select beams suitable for UL communication with the UE among the $N_{BS}$ beams to receive the UL data.

The beam used when the base station transmits the DL data to the UE may equal to or different from the beam used when the base station receives the UL data from the UE. Further, the number of beams selected for the base station to transmit the DL data and the number of beams selected for the base station to receive the UL data may also be one or more.

The UE may use the array antenna or the like to form $N_{UE}$ beams and use the formed $N_{UE}$ beams for communication with the base station. When transmitting the UL data to the base station, the UE may select beams suitable for the UL communication with the base station among the $N_{UE}$ beams to transmit the UL data and when receiving the DL data from the base station, select beams suitable for the DL communication with the UE among the $N_{UE}$ beams to receive the DL data.

The beam used when the UE transmits the UL data to the base station may equal to or different from the beam used when the UE receives the DL data from the base station. Further, the number of beams selected for the UE to transmit the UL data and the number of beams selected for the UE to receive the DL data may also be one or more.

As described above, the base station and the UE may select beams suitable for communication among a plurality of beams to transmit and receive data. For the beam selection, in the mobile communication system based on beamforming, the base station may transmit a beam reference signal (BRS) that is a reference signal beamformed at a predetermined time interval or whenever the need arises. The BRS may be a reference signal transmitted per base station's beam and in the present disclosure, the BRS will be described by way of example. However, the scope of the present disclosure is not limited thereto. The present disclosure may be applied even to the case of using signals such as channel state information reference signal (CSI-RS), cell-specific reference signal (CRS), mobility RS, and synchronization signal.

The base station may transmit the BRS through all of the beams or some of the beams and the UE may receive the BRS through all of the beams or some of the beams and generate the beam measurement information using the BRS. The measurement information may mean a measurement result for the reference signal when the reference signal transmitted through the base station's beam is received through the UE's beam and in the present disclosure, the measurement of the reference signal transmitted through the beam may be expressed by the measurement of the beam.

For example, the beam measurement information may include the signal strength, the signal quality, or the like of the beam that the base station transmits. The signal strength of the beam may include referenced signal received power (RSRP) and the signal quality of the beam may include referenced signal received quality (RSRQ). In the present disclosure, the beam measurement information may be interchangeably used with terms such as BRS measurement information, BRS signal strength, and BRS signal quality. As described above, the UE uses the reference signal to generate the beam measurement information, and thus the UE may determine through what beam the base station transmits data to the UE and through what beam the UE receives the data for implementing best communication. Further, the UE notifies the base station of the beam measurement information, and thus the base station may select a beam to be used when performing the communication with the UE.

After the UE measures the BRS, if it is determined that beams of surrounding base stations provides the higher signal strength or quality than the serving base station's beam, the UE may notify the base station of the determination result. The base station receiving the information may perform an operation of handing over the UE to neighboring base stations. The UE measures the BRS that the serving base station and the surrounding base stations transmit and then may form gathering of the base stations having the received signal strength equal to or more than a predetermined level and notify the base station of the formed gathering of the base stations. The base station receiving such information may perform transmission and reception by selecting one of a plurality of base stations belonging to the collection of the base stations when performing communication with the UE.

If it is determined that the UE measures the BRS and then the beam pair in use and another beam pair provide higher signal strength or quality, the UE may also select other beam pairs to transmit and receive data.

A process of transmitting, by a base station, BRS and receiving, by UE, the BRS is described below.

FIG. 1 is a diagram illustrating a method for receiving, by UE, a BRS according to an embodiment of the present disclosure.

Referring to FIG. 1, it is assumed that the base station forms $N_{BS}$ beams and selects all or some of the $N_{BS}$ beams to communicate with the UE. Further, it is assumed that the UE forms $N_{UE}$ beams and selects all or some of the $N_{UE}$ beams to communicate with the base station. Therefore, a total of $N_{BS}*N_{UE}$ beam pairs consisting of the base station's beam and the UE's beam are present between the base station and the UE and the UE may select the best beam pair in terms of the received signal strength only when all BRS received signal strengths for the $N_{BS}*N_{UE}$ beam pairs need to be measured.

Referring to FIG. 1 the BRS that the base station transmits may not be transmitted per subframe (hereinafter, interchangeably used with subframe) like a CRS of long-term evolution (LTE) but may be transmitted only in a periodically allocated subframe. For example, as illustrated in FIG. 1, the base station may transmit the BRS in one subframe 110 included in one radio frame 100. Alternatively, the base station may transmit the BRS in a plurality of subframes included in one radio frame.

Further, the base station may transmit the BRS through one beam in a symbol or a plurality of symbols unit, and therefore the number of beams that may the BRS in one subframe is restrictive. Accordingly, in order for the UE to measure all the RSRPs for $N_{BS}*N_{UE}$ beam pairs, the measurement may need to be performed in several subframes depending on $N_B S$, $N_{UE}$, the number of symbols per subframe, etc.

In FIG. 1, the subframe in which the BRS is transmitted may be named a BRS subframe 110, a period at which the BRS subframe is allocated may be called a BRS period 120, and time taken for the UE to measure all of the $N_{BS}*N_{UE}$ beam pairs may be named full sweep periods 130 and 140 The full sweep period is the time taken for the base station and the UE to measure all the beam pairs by the beam sweeping and may be named an entire beam measurement period.

In the present disclosure, the base station may first transmit the BRS while sweeping a transmission beam and the UE may receive the BRS that the base station transmits in the state in which it fixes a reception beam. The beam sweep may mean an operation of changing a beam and transmitting a reference signal and an operation of changing a beam and receiving a reference signal. If the UE receives the BRS for all the beams of the base station through a specific reception beam, the UE changes the reception beam to perform the same operation.

For example, the UE may use a first beam to receive the BRS that the base station transmits in the BRS subframe 110. After the base station receives all the transmitted BRSs, the UE may use a second beam in a subsequent BRS subframe 115 to receive the BRS that the base station transmits. When the UE forms the $N_{UE}$ beams, the UEs may use all or some of the beams to receive each BRS that each of the base stations transmits. FIG. 1 describes, by way of example, the case in which each of the UEs uses one beam in one BRS subframe to receive the BRSs that the base stations transmits, but the present disclosure is not limited thereto. For example, the base station may transmit the BRS while sweeping the beam in the plurality of BRS subframes and the UE may also use one beam in the plurality of BRS subframes to receive the BRSs.

By the method, the UE may measure all the BRS signal strengths for the $N_{BS}*N_{UE}$ beam pairs for the full sweep period.

FIGS. 2A and 2B are diagram illustrating a method for receiving, by UE, a BRS to generate beam measurement information according to an embodiment of the present disclosure.

Referring to FIG. 2A, the UE may receive the BRS for all the transmission beams ($N_{TX}$ beams) of the base station using a first beam to generate the beam measurement information and then the UE may change the beam up to $N_{RX}$ beams to repeat the operation. The UE may generate the beam measurement information for $N_{BS}*N_{UE}$ beam pairs by using the method as described above.

In the present disclosure, the base station may be called a transmitter Tx or $5^{th}$ generation (5G)NB, the UE may be called a receiver (RX), the base station's beam may be called a transmission beam, and the UE's beam may be a reception beam. The $N_BS$ and the $N_{TX}$ may mean the number of base station's beams and the $N_{UE}$ and the $N_{RX}$ may mean the number of UE's beams.

The base station may transmit the BRS in the state in which the base station fixes the transmission beam, and the UE may also consider the situation in which the UE receives the BRS transmitted by the base station while sweeping the reception beam.

Referring to FIG. 2B, if the UE receives a BRS for a specific transmission beam of the base station as all the reception beams to measure all the BRS signal strengths, the base station may change the transmission beam to perform the same operation. The UE may generate the beam measurement information for $N_{BS}*N_{UE}$ beam pairs by using the method as described above. The UE may measure the BRS RSRP or the BRS RSRQ for each beam pair (transmission beam i of the base station and reception beam j of the UE).

When the UE uses one array antenna to measure the RSRP or the RSRQ for each beam pair, only one measurement value is present. However, when the UE uses a plurality of antenna arrays to measure the RSRP or the RSRQ for each beam pair, the measurement values for each array antenna may be present, and as a result a method for determining measurement information (representative value) on a cell is required. Therefore, the present disclosure may use the following method.

The UE may set a highest value, a lowest value, or a median among the BRS signal strengths measured by the plurality of array antennas as the cell measurement information (representative value).

The UE may set a mean of the BRS signal strengths measured by the plurality of array antennas as the cell measurement information (representative value).

The UE may receive the BRSs through the plurality of array antennas and combine the BRSs to set the result as the cell measurement information (representative value). At this point, maximum ratio combining, etc. may be applied.

As described above, the UE may perform the following operations or similar operations using a procedure of transmitting, by a base station, BRS and receiving and measuring, by UE, the BRS.

1. Short-Term Beam Measurement Feedback

The short-term beam measurement feedback may determine a beam to be used by the base station or the UE for transmission and reception at the time of scheduling and may be used to change the beam.

2. Long-Term Beam Measurement Report

The long-term measurement report may determine a target base station for the handover, the cell addition, the cell release, the cell switch, the cell change, or the like and may be used to perform the determination.

Even though the terms "feedback and the report" are separately used, these terms may basically correspond to an operation of notifying, by UE, a base station of a beam measurement result. Although the terms "short-term and long-term" are separately used, there is no clear division of the short-term and the long-term. However, since the primary uses thereof are different from each other as described above, they will be described as separate operations.

The short-term beam measurement may be mainly used to change, at appropriate timing, the beam pair at which the serving base station and UE transmit and receive control information and data depending on fading of a wireless channel, a rotation of the UE, or the like.

However, even the case of performing the short-term measurement to change the beam pair has the following problem.

When the base station and the UE transmit and receive the BRS by the method as illustrated in FIG. 2A or 2B, the UE needs to independently measure all the BRS signal strengths for the $N_{BS}*N_{UE}$ beam pairs. Since the base station selects one or more of the $N_{BS}$ beams to perform communication with the UE, and the UE also selects one or more of the $N_{UE}$ beams to perform communication with the base station, independently measuring, by the UE, all of the RSRPs of the BRS for the $N_{BS}*N_{UE}$ beam pairs is a method capable of increasing accuracy of the measurement.

However, since the base station may transmit the BRS through one beam in a symbol unit or a plurality of symbol units, the number of beams that may transmit the BRS in one subframe is restrictive. Accordingly, in order for the UE to measure all the RSRPs for the $N_{BS}*N_{UE}$ beam pairs, the measurement may need to be performed in several subframes. Therefore, when the direction of the UE is changed and thus a new beam pair is selected, a considerable time may be consumed.

Further, if a narrower beam is used for increasing a beam gain, the number of beam for covering a predetermined area will be increased. At this point, the full sweep period is also increased. In other words, a time for determining the best beam pair or a beam pair suitable for communication after measuring all the RSRPs for the $N_{BS}*N_{UE}$ beam pairs, is increased. This may be highly likely to cause a beam mismatch problem between the base station and the UE when the UE moves or rotates. The beam mismatch between the base station and the UE may mean the case in which the best beam pair known by the base station through the feedback from the UE and the best beam pair depending on the result actually measured by the UE are different. In the present disclosure, the optimal beam pair may mean the beam pair having the best signal strength or quality as a BRS measurement result and in the present disclosure, may be interchangeably used with the term "best beam pair".

To address the above issue, the present disclosure proposes a method for requesting, by UE, a transmission of second BRS and using the received second BRS depending on the request of the UE to generate beam measurement information and select a beam pair. By the method, when the direction of the UE is changed, the UE may quickly determine a new beam pair and minimize deterioration in communication quality.

Generally, the BRS transmitted to the UE by the setting of the base station for beam selection (by default) may be called a first BRS (e.g., regular BRS). The BRS transmitted by the request of the UE may be called a second BRS (e.g., special BRS). However, the present disclosure includes the case in which the second BRS is periodically transmitted depending on the setting of the base station, and the second BRS may be defined as the reference signal transmitted by the base station for the beam selection of the UE in addition to the first BRS.

The present disclosure proposes a beam measurement method using both of a first beam and a second beam. The first beam and the second beam may mean beams having different beam widths. The first beam may generally mean a beam that the base station transmits. The base station may generally transmit the first BRS and the second BRS through the first beam. The first beam may also be called a narrow beam.

On the other hand, the second beam may mean a beam having a beam width larger than the first beam. For example, the second beam may also mean an omni-directional beam and may also mean one beam having the same beam width as that of k first beams (k>1). The one beam having the same beam width as that of k first beams may be called a wide beam.

In this case, the wide beam may be generated by simultaneously transmitting the k first beams in the same resource to be used and may be defined as the wide beam even when the beam wide is not the same as the width of the k first beams due to the inter-beam interference or the like. The second beam may be used only in the base station, used only in the UE, or used in both of the base station and the UE.

Figure 3:
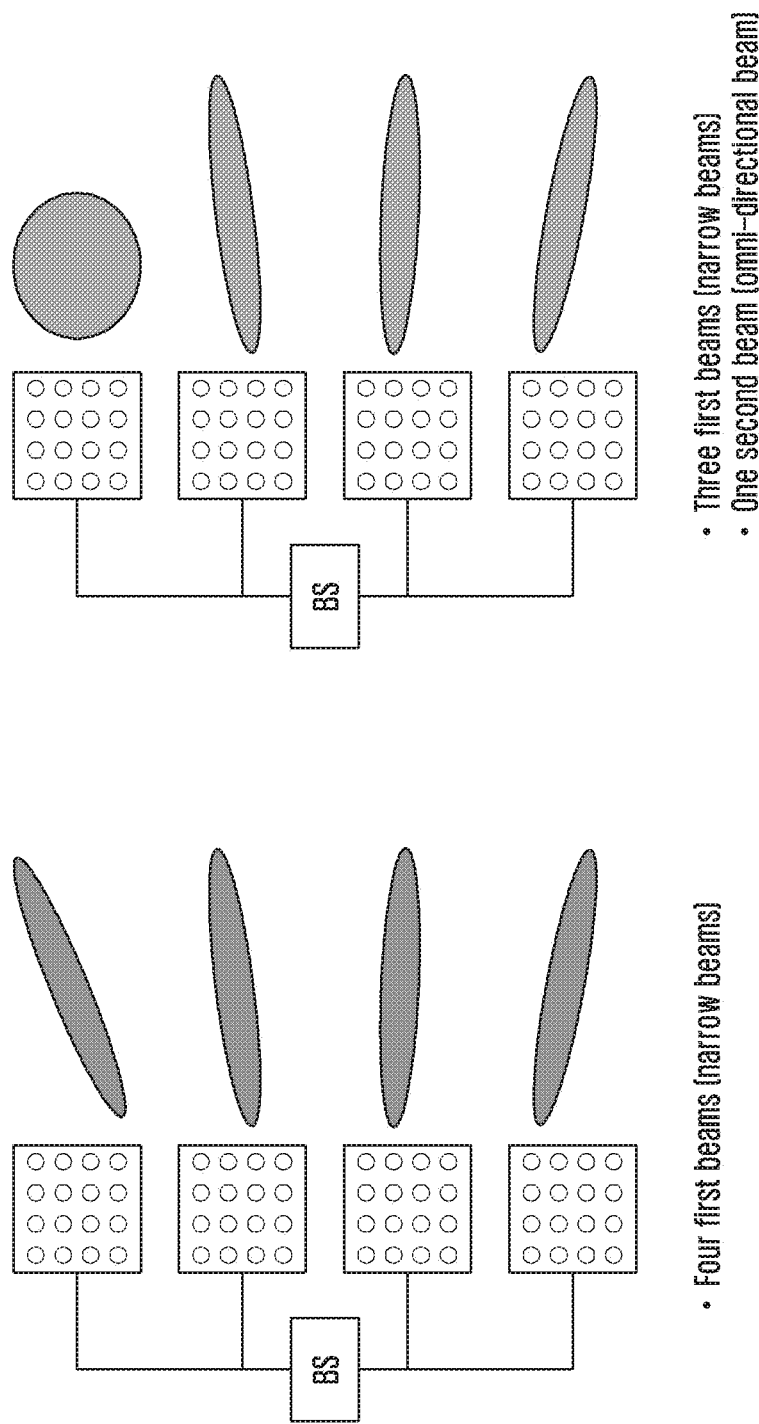
FIG. 3 is a diagram illustrating a situation in which the BRS is transmitted using a first beam and a second beam according to an embodiment of the present disclosure.

FIG. 3 is a diagram illustrating a case in which BRS is transmitted using a first beam and a second beam according to an embodiment of the present disclosure.

Referring to FIG. 3, the base station may transmit the BRS using only the first beam or transmit the BRS simultaneously using the first beam and the second beam.

FIG. 3 illustrates that the second beam is the omni-directional beam. However, the second beam may include the wide beam having the increased beam width by simultaneously transmitting the first beam in the same resource and the base station may transmit the BRS using the beam.

When a plurality of array antennas are present in one base station, one or more of the array antennas may transmit the BRS using the first beam (narrow beam) and the remaining antenna arrays may transmit the BRS using the second beam. For example, the second BRS may be transmitted using the second beam and the first BRS may be transmitted using the first beam. However, embodiments of the present disclosure are not limited thereto and may be applied to even the case in which the second BRS is transmitted through the first beam or the case in which the first BRS is transmitted through the second beam.

The second BRS may be periodically transmitted every BRS period, periodically transmitted every multiple of the BRS period, or aperiodically transmitted by the request of the UE. The detailed content thereof will be described below.

The second BRS may be a signal that may be commonly received by all the UEs, and may also be a signal that may be received only by UE that requests the signal. The base station needs to share the configuration information of the second BRS with the UE, prior to transmitting the second BRS. The base station may transmit the configuration information to the UE through, for example, a radio resource control (RRC) message, or the like. The configuration information of the second BRS may be called second BRS configuration information.

The second BRS configuration information may include a transmission time, a transmission period, a transmission frequency, a transmission duration, and a transmission symbol location of the second BRS, the number of second beams having different directions, a second beam sweep pattern, or the like. However, when the second BRS is transmitted by the request of the UE, the second BRS configuration information may not include information such as the transmission period and the transmission frequency.

Figure 4:
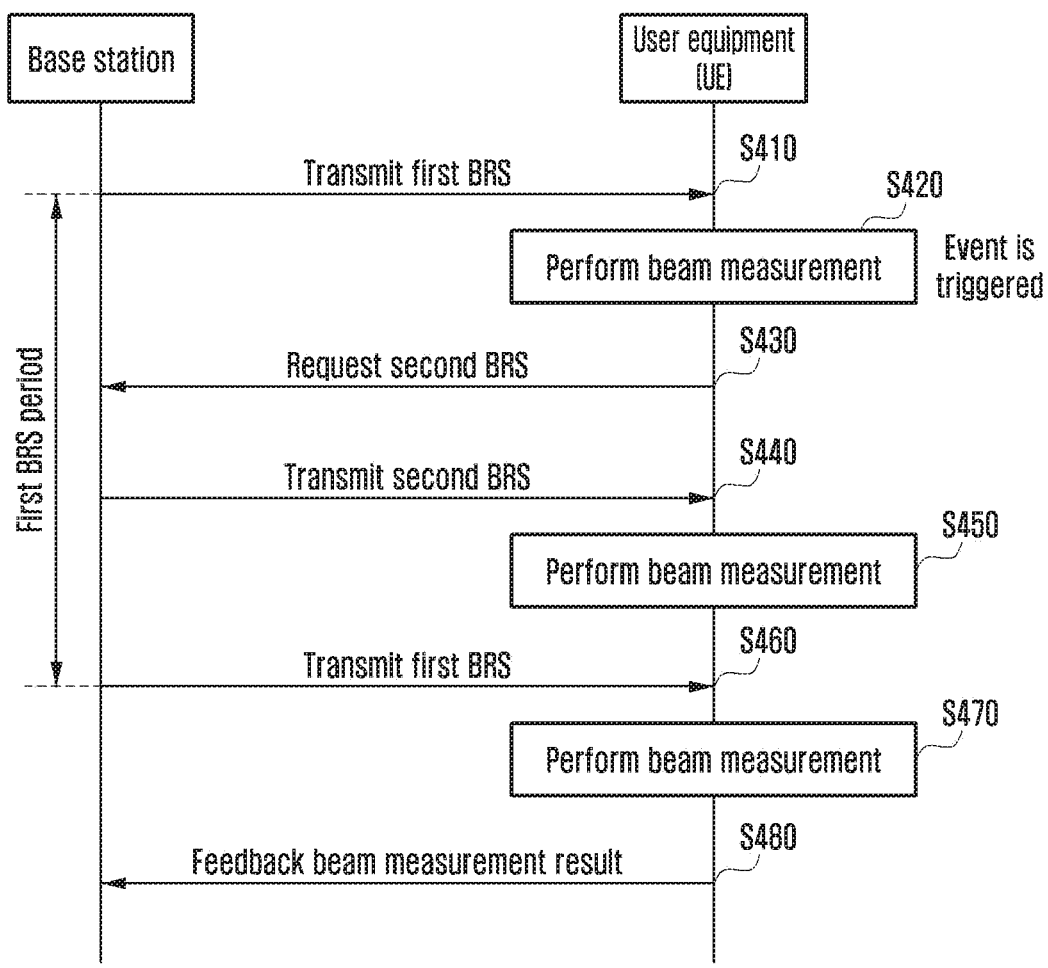
FIG. 4 is a diagram illustrating a process of selecting a beam using a first BRS and a second BRS according to an embodiment of the present disclosure.

FIG. 4 is a diagram illustrating a process of selecting a beam using a first BRS and a second BRS according to an embodiment of the present disclosure.

Referring to FIG. 4, in operation S410, the base station may transmit the first BRS. The base station may transmit first BRS configuration information including the transmission time, the transmission period, the transmission frequency, the transmission duration, the transmission symbol location, or the like of the first BRS to the UE in advance and may transmit the BRS depending on the configuration information. The base station may transmit the first BRS configuration information to the UE using the RRC message, or the like. Therefore, the UE may receive the BRS depending on the first BRS configuration information.

Further, in operation S420, the UE may perform the beam measurement. As described above, the base station may perform the beam sweeping to transmit the BRS and the UE may receive the BRS through the beam sweeping and measure the strength, the quality, or the like of the reference signal received through each beam pair.

If it is determined from the beam measurement result that the specific condition is satisfied, then in operation S430, the UE may request the base station to transmit the second BRS (special BRS). For example, if it is determined from the beam measurement result that the direction of the UE is changed, the UE may request the base station to transmit the second BRS. The detailed content of the specific condition is described below. Alternatively, the UE may sense the change of the direction using the sensor included in the UE and request the transmission of the second BRS using the sensed direction.

In operation S440, the base station may transmit the second BRS. As described above, the base station may transmit the second BRS configuration information to the UE in advance and the base station may transmit the second BRS depending on the second BRS configuration information. As described above, the base station may transmit the second BRS within the first BRS transmission period depending on the request of the UE.

The base station may transmit the second BRS to the UE through the first beam or the second beam. The base station may transmit the second BRS using the first beam included in the beam pair that is communicating with the UE or the second beam that is a combination of other beams having the same beam width around the first beam. Alternatively, the base station may also transmit the second BRS using the second beam without directivity.

The UE may sweep the UE's beam for the second BRS transmitted by the base station to perform the beam measurement and select the beam pair.

In operation S450, the UE may perform the beam measurement. As described above, the UE may receive the second BRS (special BRS) while sweeping the reception beam and may perform the beam measurement.

The UE may select a new beam pair by the beam measurement. At this point, the reception beam of the UE is changed without the transmission beam of the base station being changed, and therefore the UE may use the selected reception beam without the separate feedback to perform the communication with the base station.

However, even when the base station's beam is not changed, the channel quality indicator (CQI), the RSRP, the RSRQ, or the like for the corresponding beam may be changed. In this case, the UE may feedback the beam measurement results of the CQI, the RSRP, the RSRQ, or the like to the base station.

In operation S460, the UE may receive the first BRS. The UE may receive the first BRS using a newly selected reception beam and in operation S470, the UE may perform the beam measurement using the received BRS.

Further, in operation S480, the UE may feedback the beam measurement result to the base station.

The condition in which the UE requests the base station to transmit the second BRS (special BRS) is as follows.

When the RSRP or the RSRQ of the beam pair determined using the first BRS (regular BRS) is smaller than a predetermined value, the UE may request transmit the second BRS (special BRS) to the base station.

If the RSRP or RSRQ of the beam pair determined using the first BRS (regular BRS) is drastically reduced over a predetermined value as the continuous beam measurement result, the UE may request the second BRS (special BRS) to the base station.

If RSRP or RSRQ of a transmission and reception beam pair measured by the UE while receiving downlink data (hereinafter, DL data) from the base station through physical downlink shared channel (PDSCH) is less than a predetermined value, the UE may request the second BRS (special BRS) to the base station.

If it is determined as the continuous measurement result that RSRP or RSRQ of a transmission and reception beam pair measured by the UE while receiving DL data from the base station through PDSCH is rapidly decreased by a predetermined value or more, the UE may request the second BRS (special BRS) to the base station.

If a decoding error with respect to DL data occurs k times (k=1 or k>1) or more while the UE receives the DL data from the base station through PDSCH, the UE may request the second BRS (special BRS) to the base station.

If hybrid automatic repeat request (HARQ) negative acknowledgment (NACK) with respect to UL data is received k times (k=1 or k>1) or more after the UE transmits the uplink data (hereinafter, UL data) to the base station through physical uplink shared channel (PUSCH), the UE may request the second BRS (special BRS) to the base station.

If the RSRP or the RSRP of other beam pairs other than the beam pair determined by the UE using the first BRS (regular BRS) is greater than a predetermined value or if the time when the UE measures the beam pair having the best signal strength passes a predetermined time T (T>0) or more from the present time, the UE requests the second BRS (special BRS) to the base station.

The UE may acquire the RSRP (or RSRQ) information on the BRS for each beam pair if receiving a regular BRS during the BRS full sweep interval. For example, when the number of beams of the base station is four, and the number of beams of the UE is two, the UE may acquire information during N-th full sweep interval, (N+1)-th full sweep interval, as shown below:

| | N-th full sweep interval | | | | | | | |
|---|---|---|---|---|---|---|---|---|
| SG-NB beam | 1 | 2 | 3 | 4 | 1 | 2 | 3 | 4 |
| UE beam | | | 1 | | | | 2 | |
| RSRP (N) | $R_{11}$ | $R_{21}$ | $R_{31}$ | $R_{41}$ | $R_{12}$ | $R_{22}$ | $R_{32}$ | $R_{42}$ |

| | (N + 1)-th full sweep interval | | | | | | | |
|---|---|---|---|---|---|---|---|---|
| SG-NB beam | 1 | 2 | 3 | 4 | 1 | 2 | 3 | 4 |
| UE beam | | | 1 | | | | 2 | |
| RSRP (N + 1) | $R_{11}$ | $R_{21}$ | $R_{31}$ | $R_{41}$ | $R_{12}$ | $R_{22}$ | $R_{32}$ | $R_{42}$ |

If using the RSRP of all the beam pairs measured during the N-th full sweep interval and the RSRP of all the beam pairs measured during the (N+1)-th full sweep interval, the UE may detect the rotation and the beam misalignment of the UE, and when it is determined that the rotation and the beam misalignment occur, the UE may transmit a signal requesting a second BRS (special BRS) to the base station. A specific example is as follows.

(a) For all the beam pairs, differences between RSRP measured during the N-th full sweep interval and RSRP measured during the (N+1)-th full sweep interval are summed It may be represented by the following Equation 1.

$$A.\ D_{sum} = |R_{11}(N+1) - R_{11}(N)|^\alpha + |R_{21}(N+1) - R_{21}(N)|^\alpha + |R_{31}(N+1) - R_{31}(N)|^\alpha + |R_{41}(N+1) - R_{41}(N)|^\alpha + |R_{12}(N+1) - R_{12}(N)|^\alpha + |R_{22}(N+1) - R_{22}(N)|^\alpha + |R_{32}(N+1) - R_{32}(N)|^\alpha + |R_{42}(N+1) - R_{42}(N)|^\alpha \quad \text{Equation 1}$$

B. When $D_{sum}$ is greater than a predetermined threshold, the UE determines that rotation and beam misalignment occur and transmits the signal requesting the special BRS to the base station. Here, alpha is a given constant value.

(b) For all the beam pairs, RSRP measured during the N-th full sweep interval and RSRP measured during the (N+1)-th full sweep interval are compared. After checking the number of beam pairs of which increment or decrement of the RSRP is greater than a predetermined X dBm, when the number is greater than a predetermined threshold value (threshold), the UE determines that the rotation and the beam misalignment occur and transmits the signal requesting the special BRS to the base station.

(c) The sum of RSRPs of beams of all the base station measured by a beam of an i-th UE during the N-th full sweep interval and the sum of RSRPs of beams of all the base station measured by a beam of an i-th UE during the (N+1)-th full sweep interval are calculated. This may be represented by the following Equations 2 and 3.

If $i=1 >> P_1(N)=R_{11}(N)+R_{21}(N)+R_{31}(N)+R_{41}(N)$ $$P_1(N+1)=R_{11}(N+1)+R_{21}(N+1)+R_{31}(N+1)+R_{41}(N+1) \quad \text{Equation 2}$$

If $i=2 >> P_2(N)=R_{12}(N)+R_{22}(N)+R_{32}(N)+R_{42}(N)$ $$P_2(N+1)=R_{12}(N+1)+R_{22}(N+1)+R_{32}(N+1)+R_{42}(N+1) \quad \text{Equation 3}$$

C. Based on the above Equations, when a reception beam i of the UE having the largest Pi(N) (i=1 or 2) in the N-th full sweep interval and the greatest Pi(N+1) (i=1 or 2) in the (N+1)-th full weep interval is changed, the UE determines that the rotation and the beam misalignment occur and transmits the signal requesting the second BRS (special BRS) to the base station.

The UE may request the base station to transmit the second BRS (special BRS) through the dedicated UL resources (physical uplink control channel (PUCCH) or PUSCH) previously allocated to the UE, the beam feedback message, the scheduling request (SR), or the like.

Specific operations of performing, by the UE, beam measurement while receiving the first BRS (regular BRS) and the second BRS (special BRS) will be described below.

Figure 5:
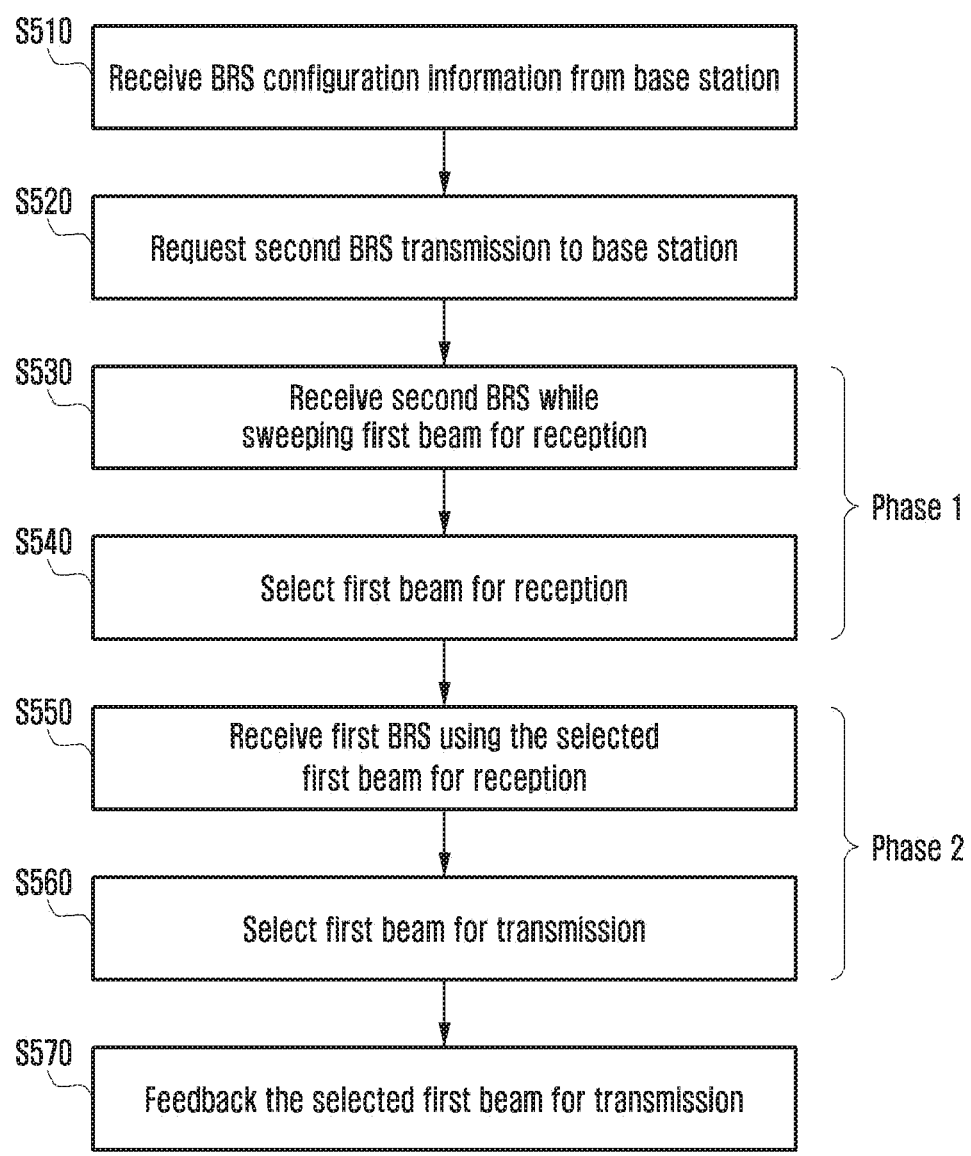
FIG. 5 is a diagram illustrating a method for selecting a beam pair according to an embodiment of the present disclosure.

FIG. 5 is a diagram illustrating a method for selecting a beam pair according to an embodiment of the present disclosure.

Referring to FIG. 5, the base station may transmit the BRS using the first beam and the second beam. In the present disclosure, the beam selection method will be described when the second beam is the wide beam. The beam measurement method will be described in the case in which the UE receives the BRS using only the first beam. In operation S510, the UE may receive the BRS configuration information from the base station.

The BRS configuration information includes a BRS subframe index, a BRS subframe period, a BRS full sweep interval, BRS transmission resource information (time, frequency, symbol, subcarrier, antenna port, and resource block index) in a BRS subframe, a BRS beam switching unit of the base station and the UE, etc. Further, the BRS configuration information may include first BRS configuration information and second BRS configuration information.

The UE may confirm whether the second BRS transmission request condition is satisfied while receiving the first BRS or the DL data (PDSCH). The second BRS transmission request condition is the same as those described above and therefore the description thereof will be omitted.

When the second BRS transmission request condition is satisfied, in operation S520, the UE may request the second BRS transmission the base station. The base station may transmit the second BRS through the first beam or the second beam. The present disclosure describes, by way of example, the case in which the base station transmits the second BRS through the second beam. In particular, the present disclosure describes, by way of example, the case in which the base station transmits the second BRS using the wide beam. However, the scope of the present disclosure is not limited thereto, but may be applied even to the case in which the second BRS is transmitted through the first beam or the omni-directional beam.

The signal requesting, by the UE, the second BRS may also be transmitted through mmWave radio access technology (RAT) (that is, 5G RAT) or through LTE.

If the UE requests the second BRS from the base station, the base station may transmit the second BRS. Further, the base station may transmit the first BRS transmitted by default. The base station may transmit both of the first BRS and the second BRS. As described above, in the present embodiment, the base station may transmit the second BRS to the UE through the second beam. The base station may transmit the second BRS using the second beam that is a combination of other beams having the same beam width around the first beam included in the beam pair that is communicating with the UE.

In operation S530, the UE may receive the second BRS transmitted by the base station while sweeping the reception beam one by one. Further, the UE may measure the signal strength by the beam pair. The BRS may be received using the first beam for reception that is the reception beam having the beam width of the first beam of the UE.

In operation S540, the UE may the transmission beam and the reception beam. The UE may select the transmission beam and the reception beam having the best signal strength or quality on the basis of the measurement result of the received BRS. The UE may select the second beam for transmission and the first beam for reception that have the greatest RSRP or RSRQ. However, the transmission beam of the base station may be fixed, and therefore the UE may also select only the reception beam. The second beam for transmission may mean the transmission beam having the beam width of the second beam.

In operation S550, the UE may receive the first BRS using the selected reception beam. The UE may receive all the first BRSs transmitted by the base station in the state in which the selected first beam for reception is fixed and measure the signal strength per the beam pair. The base station may transmit the first BRS using the first beam.

In operation S560, the UE may the transmission beam and the reception beam. The UE may select the transmission beam and the reception beam having the best signal strength or quality on the basis of the measurement result of the received BRS. The UE may select the first beam for transmission and the first beam for reception that have the greatest RSRP or RSRQ. However, in operation S540, the reception beam of the UE is selected and fixed, and therefore the UE may also select only the transmission beam. The first beam for transmission may mean the transmission beam having the beam width of the first beam.

By this process, the UE may select the beam pair to be used for communication.

In operation S570, the UE notifies the base station of the selected transmission beam, and thus the base station and the UE share the beam information to be used for communication.

Herein, it is described that the UE determines the beam pair having the best signal strength, but the UE may search for the beam pair having the second best signal strength, the best beam pair having the third best signal strength, and the beam pair having the n-th best signal strength.

Further, it is described herein that the UE selects the beam pair and then feeds back the first beam for transmission of the beam pair having the best signal strength to the base station. However, the UE may feedback the first beam for transmission of the beam pair having the best signal strength as well as the first beam for transmission of the beam pair having the second best signal strength, the first beam for transmission of the beam pair having the second best signal strength, and the first beam for transmission of the beam pair having the n-th best signal strength to the base station. Further, it is also possible to feedback the second beam for transmission of the base station for the first beam for transmission of the UE.

When the UE performs the beam measurement as illustrated in FIG. 5, an index of the beam used when the base station and the UE transmits and receives the BRS may be changed as illustrated in FIG. 6.

FIG. 6 is a diagram illustrating a method for determining a beam pair according to an embodiment of the present disclosure.

Referring to FIG. 6, $W_{TX}$, $N_{TX}$, and $N_{RX}$ may mean the number of second beams for transmission beams operated by the base station, the number of first beams for transmission operated by the base station, and the number of first beams for reception operated by the UE, respectively.

The UE may receive and measure the BRS transmitted through the second beam for transmission by sweeping the reception beam and select the reception beam having the best signal strength using the measured BRS. Further, the UE may use the reception beam to allow the base station to receive the BRS transmitted by sweeping the first beam for transmission and may select the transmission beam having the best signal strength using the same.

Figure 7:
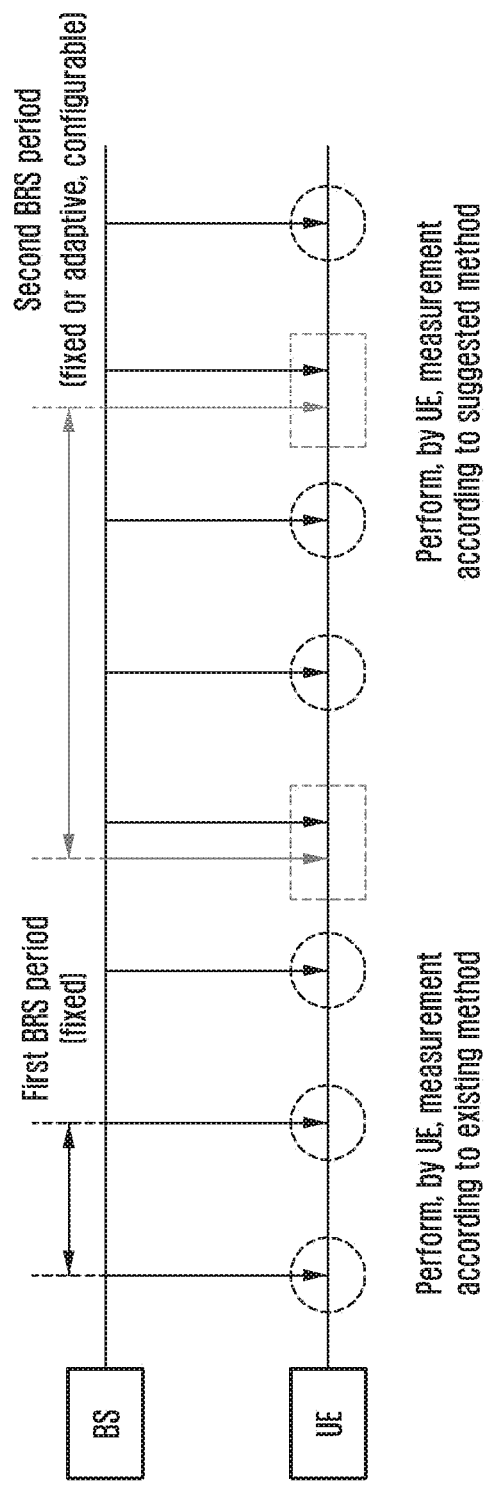
FIG. 7 is a diagram illustrating a method for selecting a beam pair according to an embodiment of the present disclosure.

FIG. 7 is a diagram illustrating another method for selecting a beam pair according to an embodiment of the present disclosure.

Referring to FIG. 7, even when there is no request of the UE, the case in which the second BRS is transmitted by the configuration of the base station will be described.

The UE receives the first BRS (regular BRS) at a first BRS period (BRS period). At this point, in a BRS subframe, the base station transmits the BRS while changing the transmission beam at an interval of a beam switch unit, and the UE receives the BRS by one reception beam. Further, the UE may receive the first BRS while changing the reception beam every the BRS subframe.

The UE may receive the second BRS (BRRS) at the second BRS period (BRRS period). At this point, the UE may receive the second BRS depending on the preset period on the basis of the second BRS configuration information that the base station configures. The second BRS configuration information may include second BRS transmission starting timing, a second BRS transmission period, a second BRS transmission time, a second BRS transmission frequency, a second BRS duration (for example: first subframe), a second BRS symbol length (for example: subcarrier spacing 300 kHZ), a second BRS beam switching unit (for example: 1 symbol), or the like.

The second BRS may be transmitted through beam patterns freely set by the base station such as the first beam (narrow beam) and the second beam (for example, wide beam, sector beam, omni beam). In FIG. 7, the case in which the second BRS is transmitted through the omni beam pattern will be described by way of example.

The base station may transmit the second BRS and the first BRS using a symbol shorter than the symbol length used when transmitting the second BRS and the first BRS. For example, if 75 kHz subcarrier spacing is applied to generate the first BRS, 300 kHz subcarrier spacing may be applied to generate the second BRS. In this case, the second BRS may be transmitted at a symbol having a size of ¼ of the symbol where the first BRS is transmitted.

The reason for using the shorter symbol to transmit the second BRS is for the UE to perform the beam sweep at a shorter time interval when the second BRS is transmitted.

The UE receives the second BRS at the second BRS period (BRRS period). At this point, the UE may change the reception beam every symbol or N symbos. In the present disclosure, it is assumed that the transmission beam is fixed when the base station transmits the second BRS. However, it is also possible to change the transmission beam every symbol or every N symbols when the base station transmits the second BRS.

The UE may store the reception beam received by the greatest RSRP or RSRQ in the subframe where the second BRS is transmitted. The UE may use the reception beam to perform communication with the base station.

The UE receives the first BRS by the reception beam by which the second BRS is received with the greatest RSRP or RSRQ in a first BRS subframe after the subframe in which the second BRS is transmitted. In the BRS subframe, the base station sweeps the transmission beam in a state in which the UE fixes the reception beam, and thus the UE may find a best transmission and reception beam pair by receiving the BRS by the reception beam selected using the second BRRS. The detailed operation is described below with reference to FIG. 8.

Figure 8:
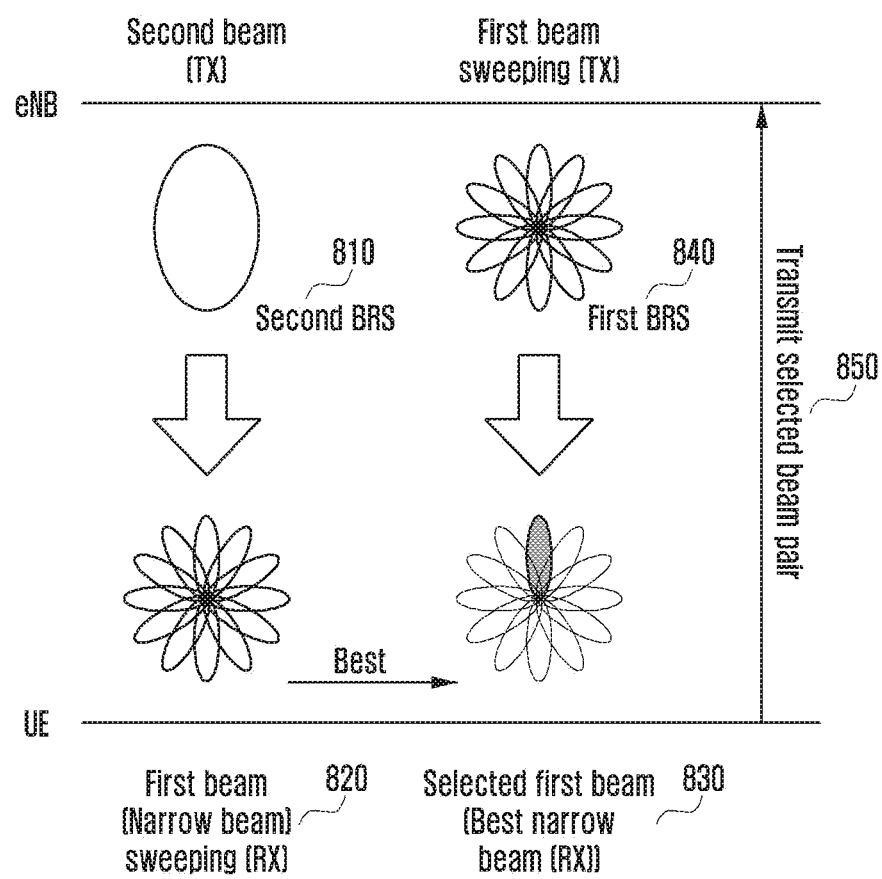
FIG. 8 is a diagram illustrating a process of determining a beam pair according to an embodiment of the present disclosure.

FIG. 8 is a diagram illustrating a process of determining a beam pair according to an embodiment of the present disclosure.

FIG. 8 is not an embodiment applied only to FIG. 7 but may be applied to the whole of the present disclosure.

Referring to FIG. 8, when the second BRS is periodically transmitted, the UE may receive a second BRS 810 at the second period (BRRS period) interval. When the second BRS is not periodically transmitted, the UE may transmit a second BRS request and a second BRS 810 when a specific condition is satisfied.

The second BRS 810 transmitted by the base station may be transmitted through the beam patterns freely set the base station such as the first beam and the second beam, but the present disclosure describes, by way of example, the case in which the second BRS 810 is transmitted through the second beam.

In the present disclosure, it is assumed that the transmission beam is fixed when the base station transmits the second BRS. However, it is also possible to change the transmission beam every symbol or every N symbols when the base station transmits the second BRS.

The UE may change (sweep) the reception beam every symbol or every N symbols to receive the second BRS. The UE may sweep in operation 820 the first beam to receive the second BRS.

The UE may select the reception beam received by the greatest RSRP or RSRQ in the subframe where the second BRS is transmitted.

The UE receives the first BRS by a reception beam 830 by which the second BRS is received with the greatest RSRP or RSRQ in a first BRS subframe after the subframe in which the second BRS is transmitted. In the BRS subframe, the UE may receive a first BRS 840 transmitted by allowing the base station to sweep the transmission beam in the state in which the reception beam is fixed.

The UE may determine the signal strength or quality using the received first BRS and find the best transmission and reception beam pair.

The UE may select the beam pair and notify the base station of the selected beam pair 850.

Figure 9:
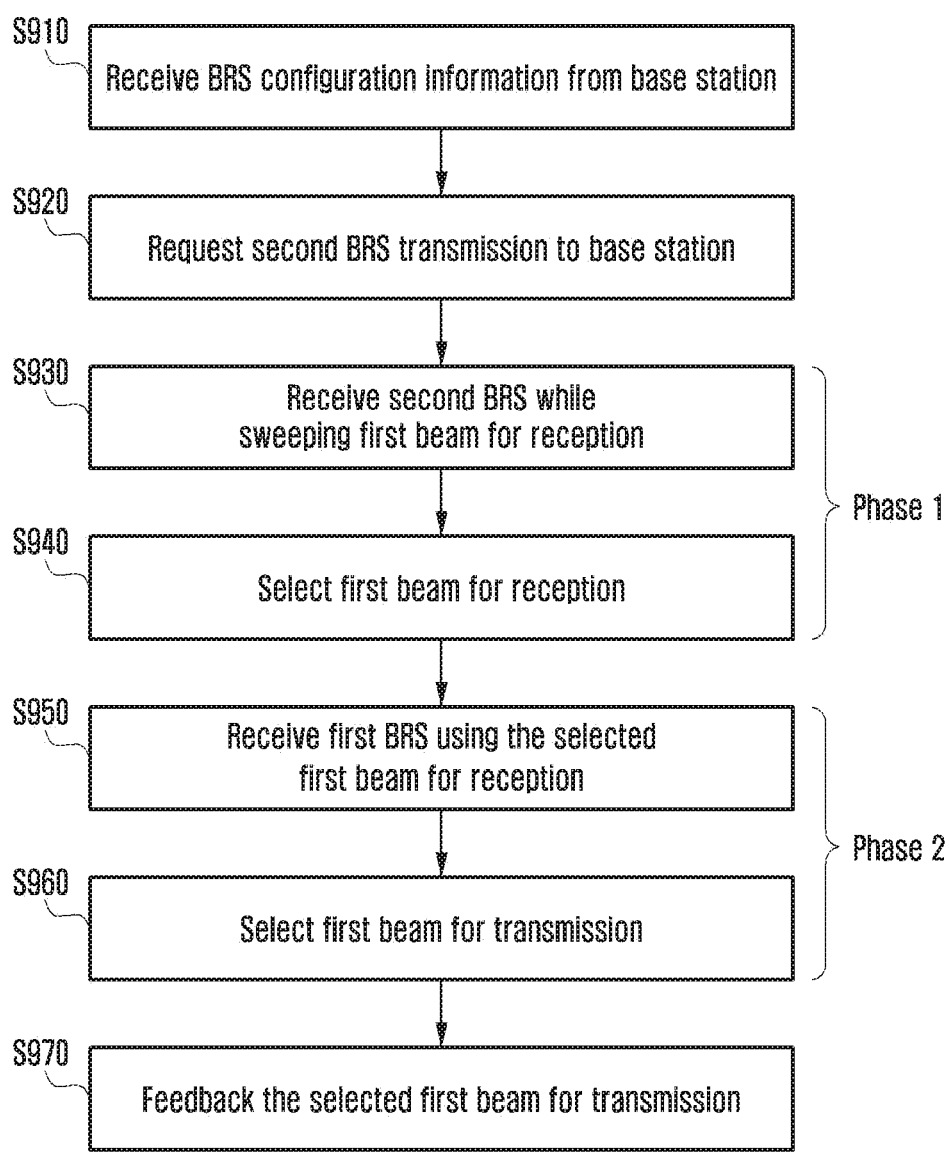
FIG. 9 is a diagram illustrating a method for selecting a beam pair according to an embodiment of the present disclosure.

FIG. 9 is a diagram illustrating a method for selecting a beam pair according to an embodiment of the present disclosure.

Referring to FIG. 9, the base station may transmit the BRS using both of the first beam and the second beam. The present disclosure describes the beam selection method in the case of the omni-directional beam without directivity. The beam measurement method is described in the case in which the UE receives the BRS using only the first beam. In operation S910, the UE may receive the BRS configuration information from the base station.

The BRS configuration information transmitted by the base station may include a BRS subframe index, a BRS subframe period, a BRS full sweep interval, BRS transmission resource information (time, frequency, symbol, subcarrier, antenna port, and resource block index) in a BRS subframe, a BRS beam switching unit of the base station and the UE, etc. The BRS configuration information may include first BRS configuration information and second BRS configuration information.

The UE may confirm whether the second BRS transmission request condition is satisfied while receiving the first BRS or the DL data (PDSCH). The second BRS transmission request condition is the same as those described above and therefore the description thereof will be omitted.

When the second BRS transmission request condition is satisfied, then in operation S920, the UE may request the second BRS transmission the base station. At this point, the base station may transmit the second BRS through the first beam or the second beam. The present disclosure describes, by way of example, the case in which the base station transmits the second BRS through the second beam. In particular, unlike FIG. 5, the case in which the base station uses the omni-directional beam without directivity to transmit the second BRS is described by way of example.

If the UE requests the second BRS to the base station, the base station may transmit the second BRS. Further, the base station may transmit the first BRS transmitted by default. The base station may be in the state in which it transmits both of the first BRS and the second BRS. As described above, in the present disclosure, the base station may use the omni-directional beam without directivity to transmit the second BRS.

In operation S930, the UE may receive the second BRS transmitted by the base station while sweeping the reception beam one by one. The UE may measure the signal strength by the beam pair. The BRS may be received using the first beam for reception that is the reception beam having the beam width of the first beam of the UE.

In operation S940, the UE may select the reception beam. The UE may select the transmission beam and the reception beam having the best signal strength or quality on the basis of the measurement result of the received BRS. The UE may select the first beam for reception that have the greatest RSRP or RSRQ.

In operation S950, the UE may receive the first BRS using0 the selected reception beam. The UE may receive all the first BRSs transmitted by the base station in the state in which the selected first beam for reception is fixed and measure the signal strength per the beam pair. The base station may transmit the first BRS using the first beam.

In operation S960, the UE may select the transmission beam. The UE may select the transmission beam having the best signal strength or quality on the basis of the measurement result of the received BRS. The UE selects the first beam for transmission and the first beam for reception that have the greatest RSRP or RSRQ. However, the reception beam of the UE is selected and fixed in the operation S940, and therefore the UE may also select only the transmission beam.

By the process, the UE may select the beam pair to be used for communication.

In operation S970, the UE notifies the base station of the selected transmission beam, and thus the base station and the UE share the beam information to be used for communication.

Herein, it is described that the UE determines the beam pair having the best signal strength, but the UE may search for the beam pair having the second best signal strength, the best beam pair having the third best signal strength, and the beam pair having the n-th best signal strength.

It is also described herein that the UE selects the beam pair and then feeds back the first beam for transmission of the beam pair having the best signal strength to the base station However, the UE may feedback the first beam for transmission of the beam pair having the best signal strength as well as the first beam for transmission of the beam pair having the second best signal strength, the first beam for transmission of the beam pair having the second best signal strength, and the first beam for transmission of the beam pair having the n-th best signal strength to the base station. It is also possible to feedback the second beam for transmission of the base station for the first beam for transmission of the UE.

When the UE performs the beam measurement as illustrated in FIG. 9, an index of the beam used when the base station and the UE transmits and receives the BRS may be changed as illustrated in FIG. 10.

FIG. 10 is a diagram illustrating a method for determining a beam pair according to an embodiment of the present disclosure.

Referring to FIG. 10, $N_{TX}$ and $N_{RX}$ indicate the number of first beams for transmission operated by the base station, and the number of first beams for reception operated by the UE.

The UE may receive and measure the BRS transmitted using the omni-directional beam by sweeping the reception beam and select the reception beam having the best signal strength using the measured BRS. The UE may use the reception beam to allow the base station to receive the BRS transmitted by sweeping the first beam for transmission and may select the transmission beam having the best signal strength using the same.

As in the beam measurement method described with reference to FIG. 5, if the base station uses the second beam (wide beam) when transmitting the BRS, a beam gain is decreased as compared to the case of using the first beam. Accordingly, a cell edge user and the like may not receive the second BRS transmitted by using the wide beam. The present disclosure suggests an operation of performing beam measurement by using the first BRS when the UE fails to receive the second BRS.

Figure 11:
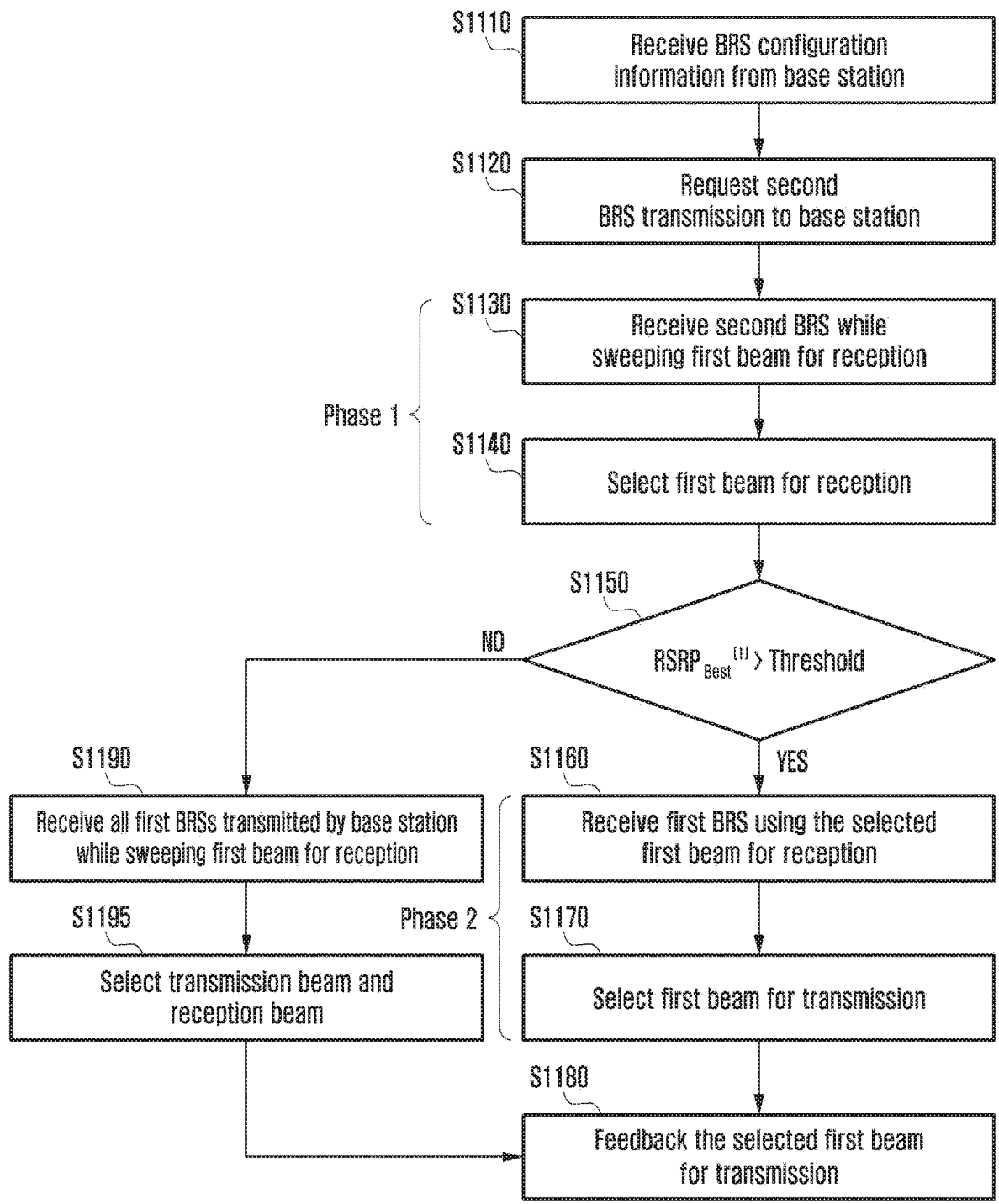
FIG. 11 is a diagram illustrating a method for selecting a beam pair according to an embodiment of the present disclosure.

FIG. 11 is a diagram illustrating a method for selecting a beam pair according to an embodiment of the present disclosure.

Referring to FIG. 11, in operation S1110, the UE receives the BRS configuration information from the base station.

The BRS configuration information transmitted by the base station may include a BRS subframe index, a BRS subframe period, a BRS full sweep interval, BRS transmission resource information (time, frequency, symbol, subcarrier, antenna port, and resource block index) in a BRS subframe, a BRS beam switching unit of the base station and the UE, etc. Further, the BRS configuration information may include first BRS configuration information and second BRS configuration information.

The UE may confirm whether the second BRS transmission request condition is satisfied while receiving the first BRS or the DL data (PDSCH). The second BRS transmission request condition is the same as those described above and therefore the description thereof will be omitted.

When the second BRS transmission request condition is satisfied, in operation S1120, the UE may request the second BRS transmission the base station. At this point, the base station may transmit the second BRS through the first beam or the second beam and the present embodiment describes, by way of example, the case in which the base station transmits the second BRS through the second beam. In particular, the present embodiment describes, by way of example, the case in which the base station transmits the second BRS using the wide beam. The scope of the present disclosure is not limited thereto, and may be applied even to the case in which the second BRS is transmitted through the first beam or the omni-directional beam.

If the UE requests the second BRS from the base station, the base station may transmit the second BRS. The base station may transmit the first BRS by default. The base station may transmit both of the first BRS and the second BRS. As described above, in the present embodiment, the base station may transmit the second BRS to the UE through the second beam. The base station may transmit the second BRS using the second beam that is a combination of other beams having the same beam width around the first beam included in the beam pair that is communicating with the UE.

In operation S1130, the UE may receive the second BRS transmitted by the base station while sweeping the reception beam one by one. Further, the UE may measure the signal strength by the beam pair. At this point, the BRS may be received using the first beam for reception that is the reception beam having the beam width of the first beam of the UE.

In operation S1140, the UE may the transmission beam and the reception beam. The UE may select the transmission beam and the reception beam having the best signal strength or quality on the basis of the measurement result of the received BRS. The UE may select the second beam for transmission and the first beam for reception that have the greatest RSRP or RSRQ. However, the transmission beam of the base station may be fixed, and therefore the UE may also select only the reception beam. The second beam for transmission may mean the transmission beam having the beam width of the second beam.

In operation S1150, the UE may determine whether the RSRP or the RSRQ of the selected beam pair is equal to or greater than a predetermined value.

If the RSRP or the RSRQ of the selected beam pair is equal to or greater than the predetermined value, the UE may be operated as in FIG. 5 above. Therefore, the following operations S1160 to S1180 may be performed as in the operations S550 to S570 of FIG. 5.

If the RSRP or the RSRQ of the selected beam pair is less than the predetermined value, it may mean that the UE has a difficulty in receiving the second BRS.

Therefore, in operation S1190, the UE may receive all the first BRSs transmitted by the base station while sweeping the first beam for reception by one.

In operation S1195, the UE may select the transmission beam and the reception beam having the greatest RSRP or RSRQ.

Unlike FIG. 5, the UE may receive the BRS using all the reception beams to measure the signal strength or the signal quality, thereby selecting the best beam pair. Further, the UE notifies the base station of the selected transmission beam, and thus the base station and the UE may share the beam information to be used for communication.

Herein, it is described that the UE determines the beam pair having the best signal strength, but the UE may search for the beam pair having the second best signal strength, the best beam pair having the third best signal strength, and the beam pair having the n-th best signal strength.

Further, it is described herein that the UE selects the beam pair and then feeds back the first beam for transmission of the beam pair having the best signal strength to the base station. However, the UE may feedback the first beam for transmission of the beam pair having the best signal strength as well as the first beam for transmission of the beam pair having the second best signal strength, the first beam for transmission of the beam pair having the second best signal strength, and the first beam for transmission of the beam pair having the n-th best signal strength to the base station. Further, it is also possible to feedback the second beam for transmission of the base station for the first beam for transmission of the UE.

As in the beam measurement method described with reference to FIG. 9, if the base station uses the second beam (omni-directional beam) when transmitting the BRS, a beam gain is decreased as compared to the case of using the first beam. As a result, the cell edge user and the like may not receive the second BRS transmitted by using the omni-directional beam. Therefore, the present disclosure suggests an operation of performing beam measurement by using the first BRS when the UE fails to receive the second BRS.

Figure 12:
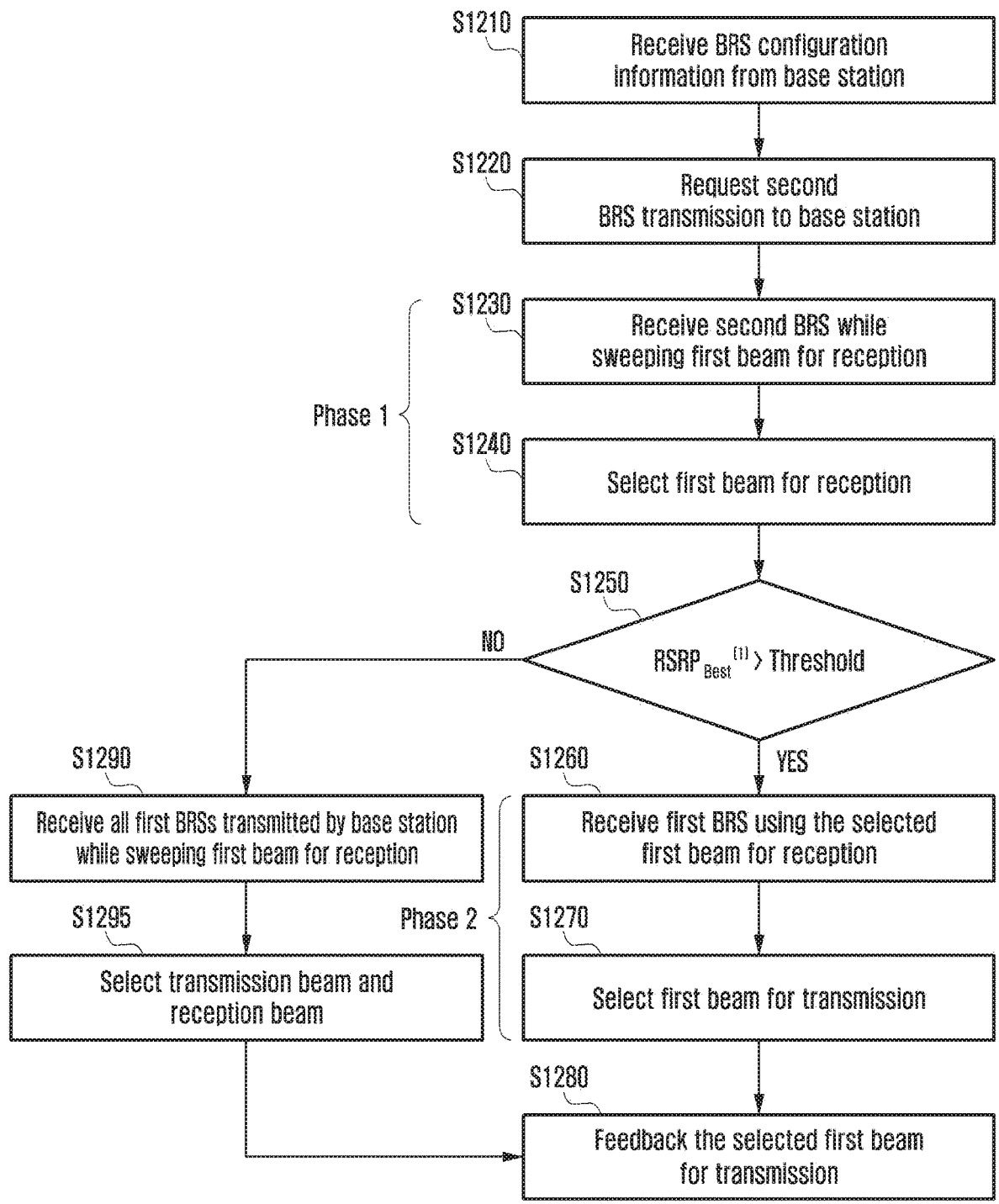
FIG. 12 is a diagram illustrating a method for selecting a beam pair according to an embodiment of the present disclosure.

FIG. 12 is a diagram illustrating a method for selecting a beam pair according to an embodiment of the present disclosure.

Referring to FIG. 12, in operation S1210, the UE receives the BRS configuration information from the base station.

The BRS configuration information transmitted by the base station may include a BRS subframe index, a BRS subframe period, a BRS full sweep interval, BRS transmission resource information (time, frequency, symbol, subcarrier, antenna port, and resource block index) in a BRS subframe, a BRS beam switching unit of the base station and the UE, etc. Further, the BRS configuration information may include first BRS configuration information and second BRS configuration information.

The UE may confirm whether the second BRS transmission request condition is satisfied while receiving the first BRS or the DL data (PDSCH). The second BRS transmission request condition is the same as those described above and therefore the description thereof will be omitted.

When the second BRS transmission requirements are satisfied, in operation S1220, the UE may request the second BRS transmission the base station. The base station may transmit the second BRS through the first beam or the second beam; the present embodiment describes, by way of example, the case in which the base station transmits the second BRS through the second beam. The present embodiment describes, by way of example, the case in which the base station transmits the second BRS using the omni-directional beam. However, the scope of the present disclosure is not limited thereto.

If the UE requests the second BRS to the base station, the base station may transmit the second BRS. Further, the base station may transmit the first BRS transmitted by default. The base station may transmit both of the first BRS and the second BRS. As described above, in the present embodiment, the base station may transmit the second BRS to the UE through the second beam. The base station may transmit the second BRS using the omni-directional beam without directivity.

In operation S1230, the UE may receive the second BRS transmitted by the base station while sweeping the reception beam one by one. Further, the UE may measure the signal strength by the beam pair. At this point, the BRS may be received using the first beam for reception that is the reception beam having the beam width of the first beam of the UE.

In operation S1240, the UE may the transmission beam and the reception beam. The UE may select the transmission beam and the reception beam having the best signal strength or quality on the basis of the measurement result of the received BRS. The UE may select the first beam for reception that have the greatest RSRP or RSRQ.

In operation S1250, the UE may determine whether the RSRP or the RSRQ of the selected beam pair is equal to or greater than a predetermined value.

If the RSRP or the RSRQ of the selected beam pair is equal to or greater than the predetermined value, the UE may be operated as in FIG. 9 described above. Therefore, the following operations S1260 to S1280 may be performed as in the operations S950 to S970 of FIG. 9.

If the RSRP or the RSRQ of the selected beam pair is less than the predetermined value, it may mean that the UE has a difficulty in receiving the second BRS transmitted through the omni-direction beam.

Accordingly, in operation S1290, the UE may receive all the first BRSs transmitted by the base station while sweeping the first beam for reception by one.

Further, in operation S1295, the UE may select the transmission beam and the reception beam having the greatest RSRP or RSRQ.

Unlike FIG. 9, the UE may receive the BRS using all the reception beams to measure the signal strength or the signal quality, thereby selecting the best beam pair. Further, the UE notifies the base station of the selected transmission beam and thus the base station and the UE share the beam information to be used for communication.

Herein, it is described that the UE determines the beam pair having the best signal strength, but the UE may search for the beam pair having the second best signal strength, the best beam pair having the third best signal strength, and the beam pair having the n-th best signal strength.

It is described herein that the UE selects the beam pair and then feeds back the first beam for transmission of the beam pair having the best signal strength to the base station. However, the UE may feedback the first beam for transmission of the beam pair having the best signal strength as well as the first beam for transmission of the beam pair having the second best signal strength, the first beam for transmission of the beam pair having the second best signal strength, and the first beam for transmission of the beam pair having the n-th best signal strength to the base station. Further, it is also possible to feedback the second beam for transmission of the base station for the first beam for transmission of the UE.

When the base station transmits the BRS using both of the first beam and the second beam (wide beam) and even the UE receives the BRS using both of the first beam and the second beam (wide beam), the beam measurement method may be operated as in FIG. 13 below.

Figure 13:
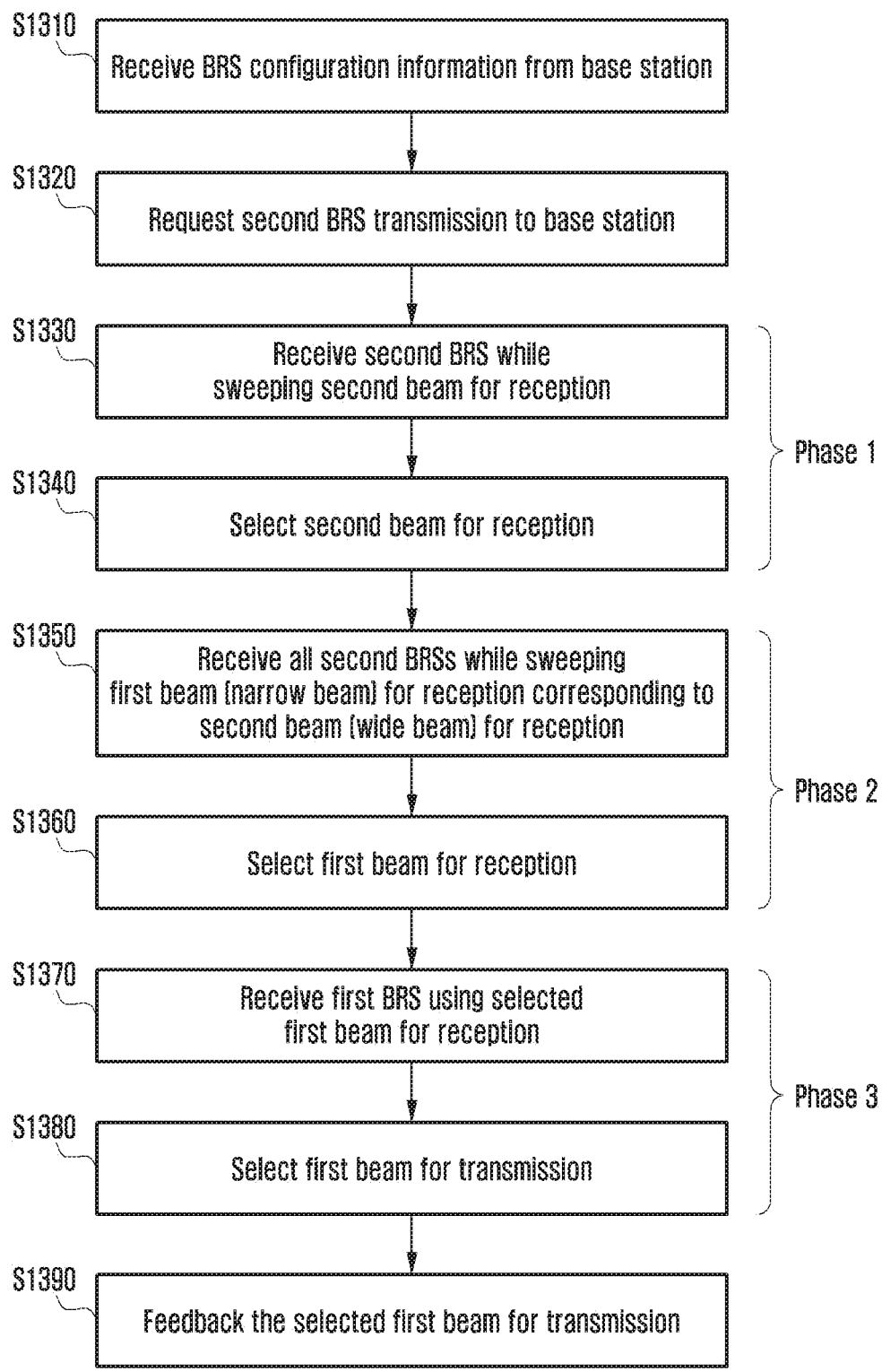
FIG. 13 is a diagram illustrating a method for selecting a beam pair according to an embodiment of the present disclosure.

FIG. 13 is a diagram illustrating a method for selecting a beam pair according to an embodiment of the present disclosure.

FIG. 13 describes, by way of example, the case in which the second beam used by the base station and the UE is the wide beam.

Referring to FIG. 13, in operation S1310, the UE receives the BRS configuration information from the base station.

The BRS configuration information transmitted by the base station may include a BRS subframe index, a BRS subframe period, a BRS full sweep interval, BRS transmission resource information (time, frequency, symbol, subcarrier, antenna port, and resource block index) in a BRS subframe, a BRS beam switching unit of the base station and the UE, etc. Further, the BRS configuration information may include first BRS configuration information and second BRS configuration information.

The UE may confirm whether the second BRS transmission request condition is satisfied while receiving the first BRS or the DL data (PDSCH). The second BRS transmission requirements are the same as those described above and therefore the description thereof will be omitted.

When the second BRS transmission requirements are satisfied, in operation S1320, the UE may request the second BRS transmission the base station. As described above, the present embodiment describes, by way of example, the case in which the base station transmits the second BRS using the wide beam. If the UE requests the second BRS to the base station, the base station may transmit the second BRS. Further, the base station may transmit the first BRS transmitted by default. That is, the base station may be in the state in which it transmits both of the first BRS and the second BRS.

In operation S1330, the UE may receive all the second BRSs transmitted by the base station while sweeping the second beam for reception one by one.

In operation S1340, the UE may select the second beam for reception. The UE may select the second beam for reception having the best signal strength or quality on the basis of the measurement result of the second BRS. That is, the UE may select the second beam (wide beam) for transmission and the second beam (wide beam) for reception having the greatest RSRP or RSRQ. However, the transmission beam of the base station may be fixed, and therefore the UE may also select only the reception beam.

In operation S1350, the UE may receive all the second BRSs transmitted by the base station while sweeping the first beam (narrow beam) for reception corresponding to the second beam for reception one by one.

In operation S1360, the UE may select the first beam for reception. The UE may select the second beam (wide beam) for transmission and the first beam (narrow beam) for reception having the greatest RSRP or RSRQ. However, as described above, the transmission beam of the base station may be fixed, and therefore the UE may also select only the reception beam.

In operation S1370, the UE may receive all the first BRSs transmitted by the base station in the state in which the first beam for reception selected is fixed.

In operation S1380, the UE may select the first beam for transmission. The UE may select the first beam for transmission and the first beam for reception that have the greatest RSRP or RSRQ. However, the reception beam of the UE is fixed, and therefore the UE may also select only the transmission beam.

By this process, the UE may select the beam pair to be used for communication.

In operation S1390, the UE notifies the base station of the selected transmission beam, and thus the base station and the UE share the beam information to be used for communication.

Herein, it is described that the UE determines the beam pair having the best signal strength, but the UE may search for the beam pair having the second best signal strength, the best beam pair having the third best signal strength, and the beam pair having the n-th best signal strength.

It is described herein that the UE selects the beam pair and then feeds back the first beam for transmission of the beam pair having the best signal strength to the base station However, the UE may feedback the first beam for transmission of the beam pair having the best signal strength as well as the first beam for transmission of the beam pair having the second best signal strength, the first beam for transmission of the beam pair having the second best signal strength, and the first beam for transmission of the beam pair having the n-th best signal strength to the base station. It is also possible to feedback the second beam for transmission of the base station for the first beam for transmission of the UE.

When the UE performs the beam measurement as illustrated in FIG. 13, an index of the beam used at the time of BRS transmission and reception by the base station and the UE is changed as illustrated in FIG. 14.

FIG. 14 is a diagram illustrating a method for determining a beam pair according to an embodiment of the present disclosure.

Referring to FIG. 14, $W_{TX}$, $W_{RX}$, and $N_{TX}$ each indicate the number of second beams (wide beams) for transmission operated by the base station, the number of second beams (wide beams) for reception operated by the UE, and the number of first beams (narrow beams) operated by the base station. Further, 1+ and $N_{RX}$+ mean the index of the first beam (narrow beam) for reception corresponding to the second beam (wide beam) for reception selected by the UE.

That is, the UE may receive and measure the BRS transmitted through the second beam for transmission by sweeping the second beam for reception and select the second beam for reception having the best signal strength using the measured BRS. The UE may receive the BRS transmitted through the second beam for transmission by sweeping the first beam for reception corresponding to the second beam for reception and select the first beam for reception using the same. The UE may use the first beam for reception to allow the base station to receive the BRS transmitted by sweeping the first beam for transmission and may select the transmission beam having the best signal strength using the same.

Like the beam measurement method described with reference to FIG. 5, if the base station uses the second beam (wide beam) when transmitting the BRS, a beam gain is decreased as compared to the case of using the first beam (narrow beam). If the UE uses the second beam (wide beam) when receiving the second BRS, a beam gain is decreased as compared to the case of using the first beam (narrow beam). As a result, a cell edge user and the like may not receive the second BRS transmitted by using the wide beam. Therefore, the present disclosure suggests an operation of performing beam measurement by using the first BRS when the second BRS is not received. The detailed content thereof is described below with reference to FIGS. 15A and 15B.

Figure 15A:
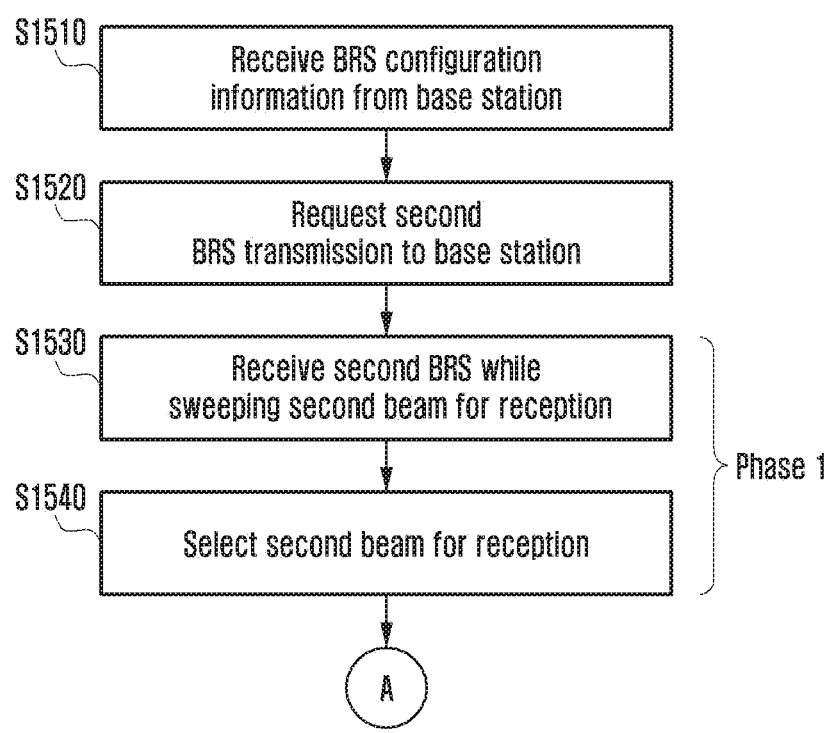
FIGS. 15A and 15B are diagrams illustrating a method for selecting a beam pair according to an embodiment of the present disclosure.
Figure 15B:
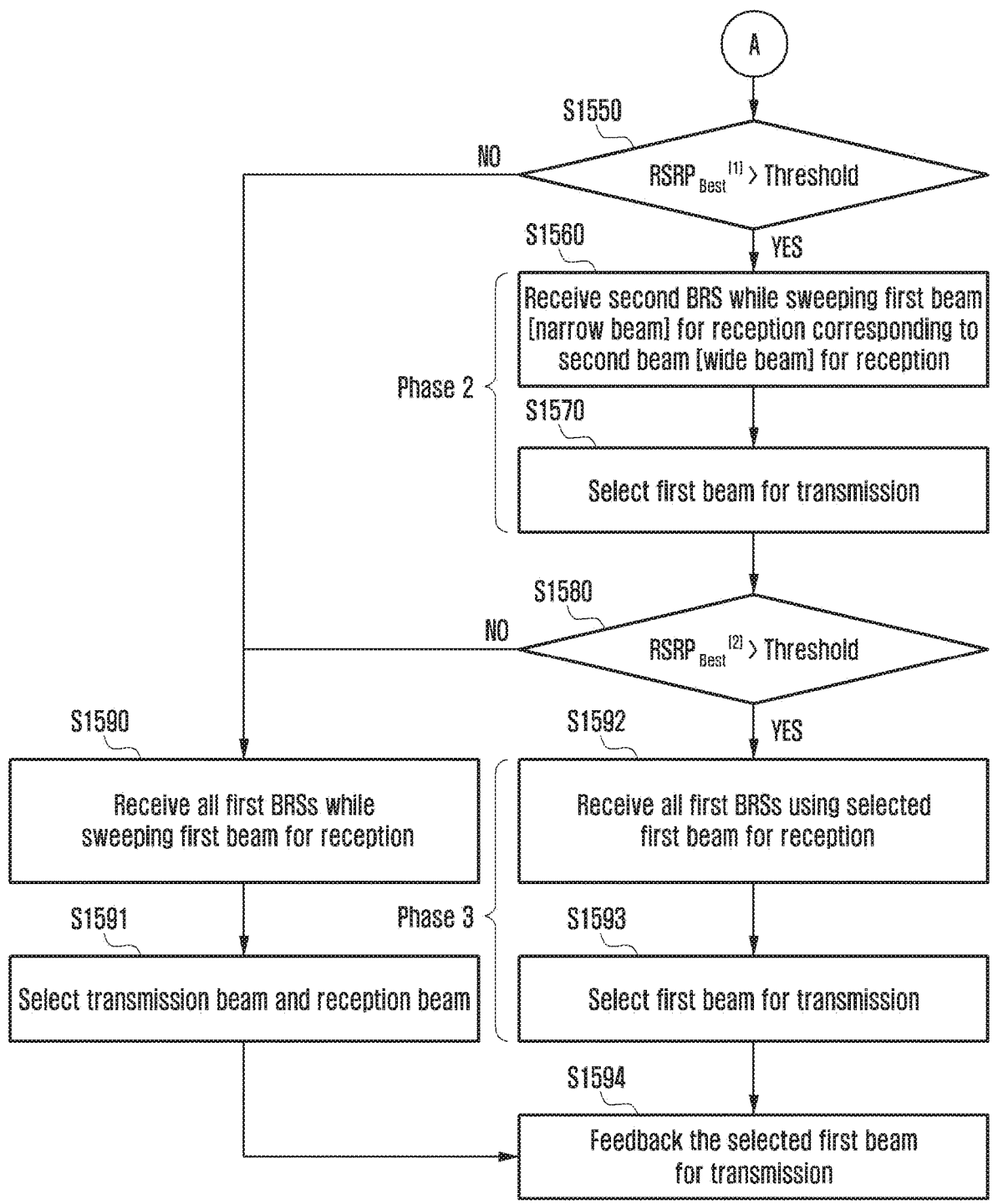

FIGS. 15A and 15B are diagrams illustrating a method for selecting a beam pair according to another embodiment of the present disclosure.

Referring to FIG. 15A, operations S1510 to S1540 are the same as the operations S1310 to S1340 and therefore the description thereof will be omitted.

Referring to FIG. 15B, after the second beam for reception is selected, in operation S1550, the UE may confirm whether the signal strength or the signal quality of the BRS received through the selected beam pair exceeds the threshold.

If the signal strength or the signal quality of the selected beam pair does not exceed the threshold, it may mean that the UE has a difficulty in receiving the second BRS. In operations S1590 and S1591, the UE may receive all the first BRSs transmitted by the base station while sweeping the first beam for reception one by one and select the transmission beam and the reception beam having the best signal strength or the signal quality.

The UE may receive the BRS using all the reception beams to measure the signal strength or the signal quality, thereby selecting the best beam pair. Further, in operation S1594, the UE notifies the base station of the selected transmission beam, and thus the base station and the UE may share the beam information to be used for communication.

On the other hand, when the signal strength or the signal quality of the selected beam pair exceeds the threshold, the UE may be operated as in FIG. 13. In operation S1560, the UE may receive the BRS transmitted through the second beam for transmission by sweeping the first beam for reception corresponding to the second beam for reception and in operation S1570, select the first beam for reception. The detailed content thereof is the same as the operations S1350 and S1360.

In operation S1580, the UE may confirm whether the signal strength or the signal quality of the beam pair of the selected first beam for reception and second beam for transmission exceeds the threshold.

If the signal strength or the signal quality of the selected beam pair does not exceed the threshold, it may mean that the UE has a difficulty in receiving the second BRS. Therefore, in operations S1590 and S1591, the UE may select the beam pair using all the reception beams and the transmission beams as described above.

On the other hand, when the signal strength or the signal quality of the selected beam pair exceeds the threshold, the UE may be operated as in FIG. 13. In operation S1592, the UE may receive the first BRS transmitted from the base station in the state in which the first beam for reception selected is fixed.

In operation S1593, the UE may select the first beam for transmission. The UE may select the first beam for transmission having the greatest RSRP or RSRQ and feedback the selected first beam for transmission to the base station. The detailed content thereof is the same as the operations S1370 to S1390.

Figure 16A:
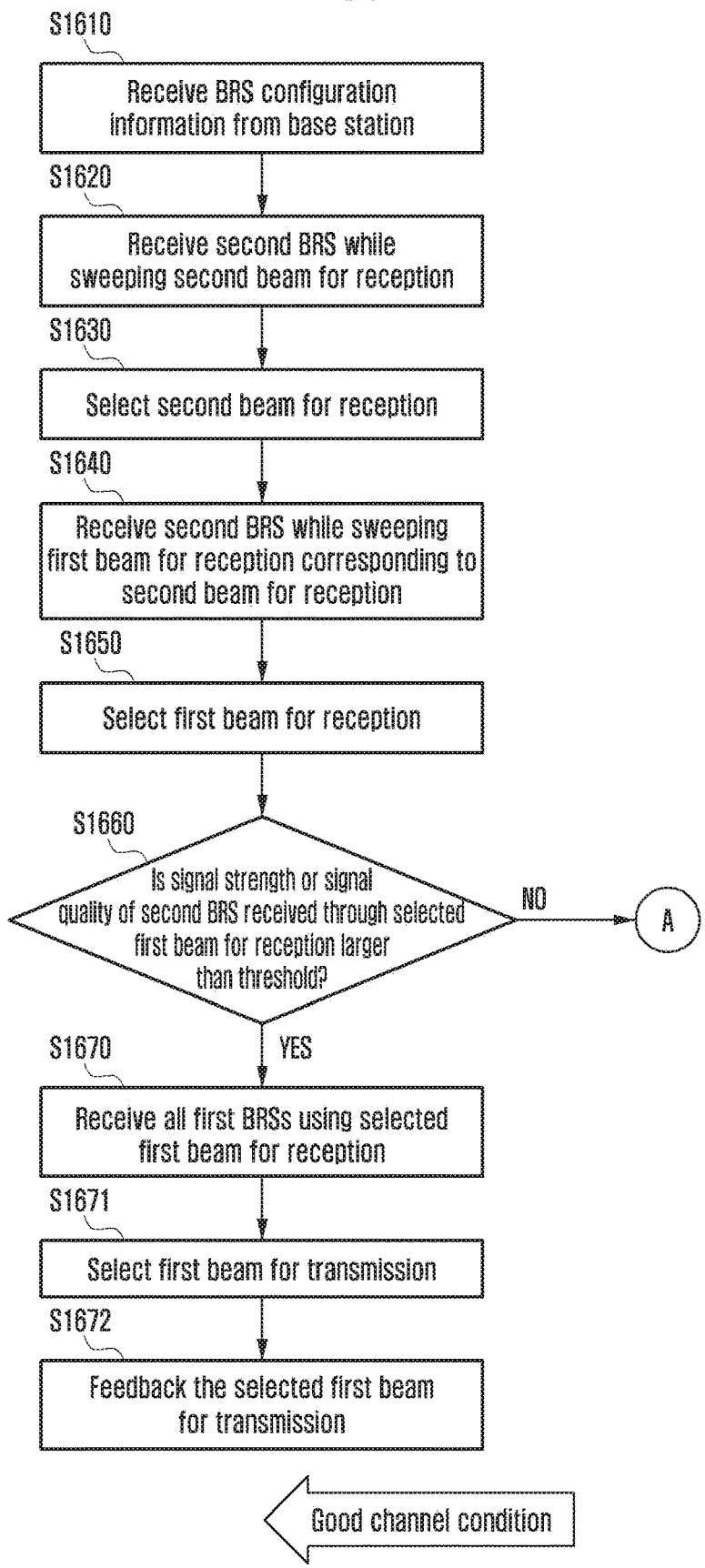
FIGS. 16A and 16B are diagrams illustrating a method for selecting a beam pair according to an embodiment of the present disclosure.
Figure 16B:
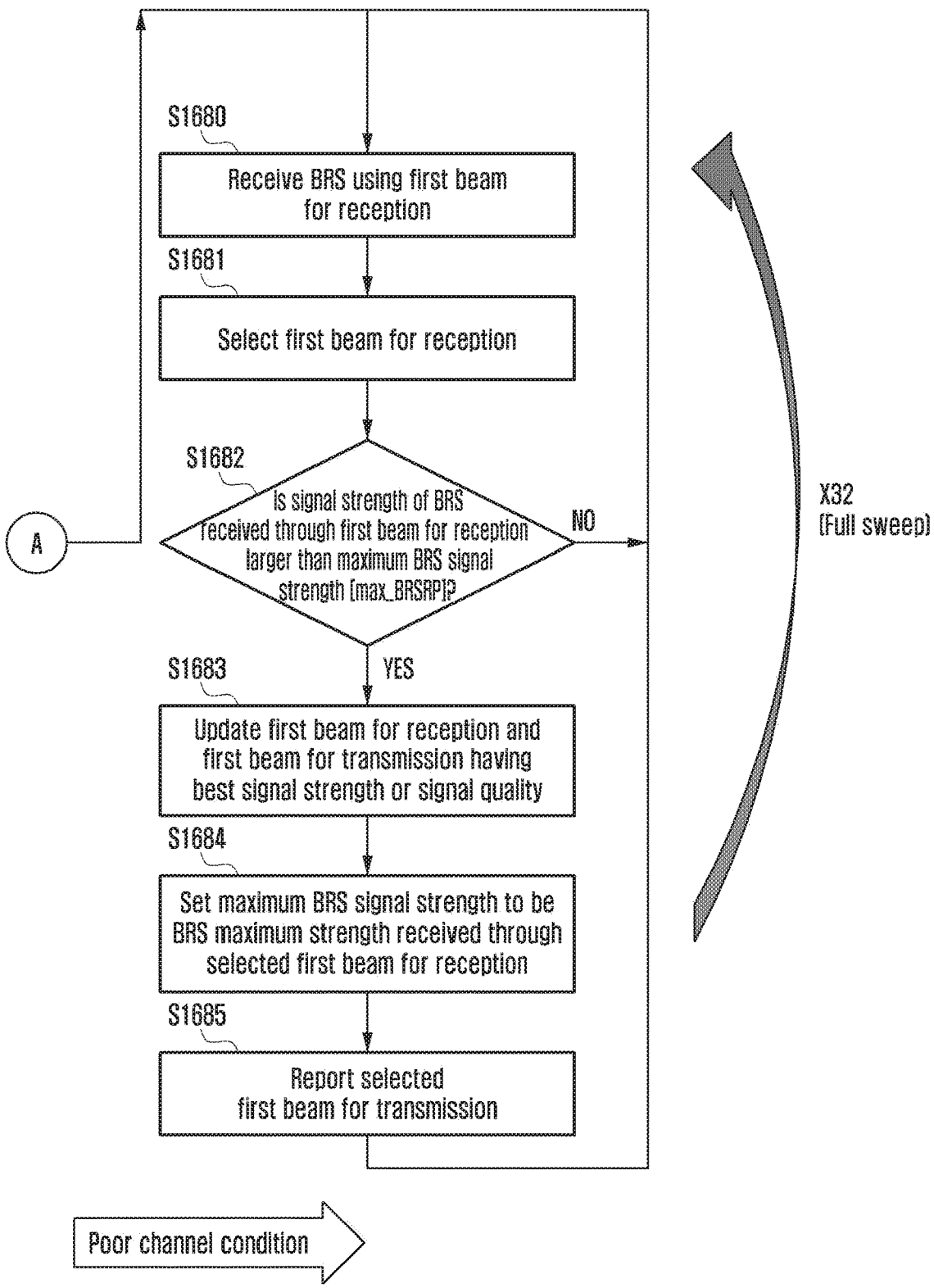

FIGS. 16A and 16B are diagrams illustrating a method for selecting a beam pair according to an embodiment of the present disclosure.

As in FIGS. 13 and 15A and 15B, FIGS. 16A and 16B illustrate the beam measurement method of the case in which the base station transmits the BRS using both of the first beam and the second beam (wide beam) and the UE receives the BRS using both the first beam and the second beam (wide beam).

Referring to FIG. 16A, in operation S1610, the UE may receive the BRS configuration information. In operation S1620, the UE may receive the second BRS by sweeping the second beam for reception and in operation S1630, select the second beam for reception. In operation S1640, the UE may receive the second BRS by sweeping the first beam for reception corresponding to the second beam for reception and in operation S1650, select the first beam for reception having the best signal strength.

The process is the same as the operations S1310 to S1360 of FIG. 13 and therefore the detailed content thereof will be omitted.

The UE may select the first beam for reception and in operation S1660, confirm whether the signal strength or the signal quality of the second BRS received through the selected first beam for reception is greater than the threshold.

If the signal strength or the signal quality of the second BRS is greater than the threshold, the UE may perform operations S1670 to S1672. The process is the same as the operations S1370 and S1380 and therefore the description thereof will be omitted.

Referring to FIG. 16B, on the other hand, when the signal strength or the signal quality of the second BRS is smaller than the threshold, it may mean that the UE has a difficulty in receiving the second BRS. Accordingly, in operation S1680, the UE may receive the BRS using the first beam for reception. The UE may receive the BRSs through each of the first beams for reception.

In operation S1681, the UE may select the first beam for reception having the best signal strength or quality. Further, the UE may derive the signal strength of the BRS received through the first beam for reception.

In operation S1682, the UE may confirm whether the signal strength of the BRS through the first beam for reception is greater than the maximum BRS signal strength (max_BRSRP).

The maximum BRS signal strength may mean the maximum strength of the BRS received through the first beam for reception that was previously in use.

If the signal strength of the BRS received through the first beam for reception exceeds the maximum BRS signal strength, it may mean that there is the first beam for reception having better signal quality. As a result, in S1683, the UE may update the first beam for reception and the first beam for transmission having the best signal strength or quality.

In operation S1684, the UE may set the maximum BRS signal strength to be the BRS maximum strength received through the selected first beam for reception.

In operation S1685, the UE may report the selected first beam for transmission.

On the other hand, if the signal strength of the BRS received through the first beam for reception does not exceed the maximum signal strength of the BRS, the beam for reception need not be changed, and therefore the UE may return to operation S1680.

As illustrated in the present drawing, the BRS may be transmitted every 5 m. The BRS transmission structure considered in the present disclosure is described below.

Figure 17:
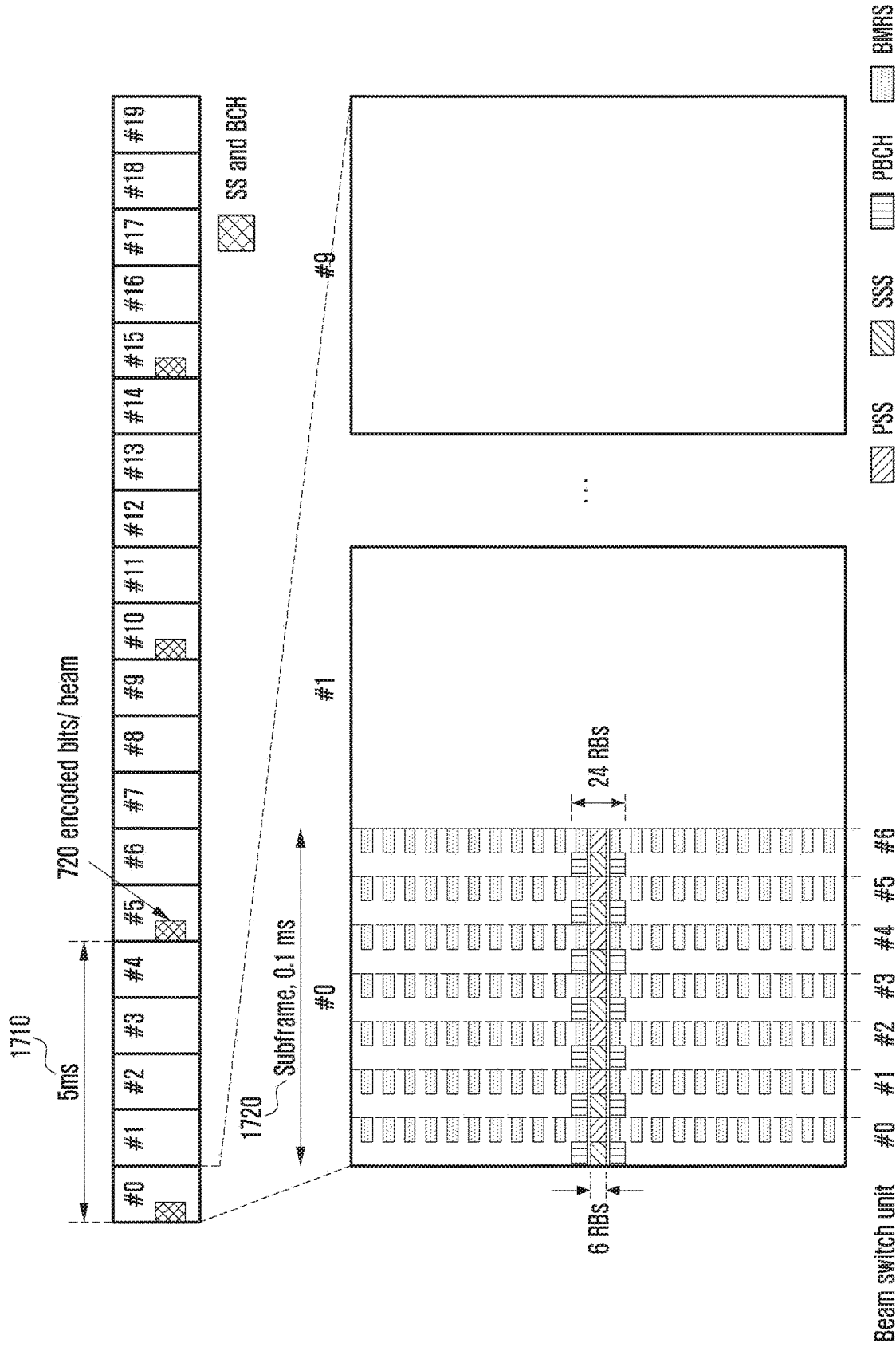
FIG. 17 is a diagram illustrating a BRS transmission structure within a subframe according to an embodiment of the present disclosure.

FIG. 17 is a diagram illustrating a BRS transmission structure within a subframe according to an embodiment of the present disclosure.

Referring to FIG. 17, the BRS may be transmitted every 5 ms 1710. One subframe 1720 may be allocated to transmit the BRS. However, the period at which the BRS is transmitted may be changed.

The present disclosure describes, by way of example, the case in which a length of the subframe 1720 is 0.1 ms, but embodiments of the present disclosure are not limited thereto. The length of the subframe 1720 may be changed. Further, the period where the BRS is transmitted may also be changed depending on the length of the subframe.

7 beam switch units may be present in the subframe. The base station may change the beam depending on the beam switch unit and transmit the BRS. Alternatively, the UE may also change the beam depending on the beam switch unit and transmit the BRS. Further, in the FDM scheme, a plurality of beams may also be transmitted simultaneously.

FIG. 18 is a diagram illustrating beam information when a plurality of beams are transmitted through a plurality of antennas according to an embodiment of the present disclosure.

Referring to FIG. 18, when a plurality of antenna arrays are present in the base station, at least one of the antenna arrays may transmit the BRS through the second beam (wide beam) and the other antenna arrays may transmit the BRS through the first beam.

Referring to FIG. 18, it may be confirmed that array antennas (or antenna ports) 1 and 2 1810 may transmit the BRS through the same second beam (wide beam) in all the beam switch units 0 to 7 1830 and array antennas (or antenna ports) 2 to 7 1820 may transmit the BRS while switching different first beams every beam switch unit. Information 1840 corresponding to each antenna port may mean the index information of the beam.

A resource allocated to transmit the second beam may mean a region in which the second BRS is transmitted (Some BRS resources are reserved for Special BRS (SBRS), where BS wide beam is applied during a subframe).

The remaining BRS resource may be used to sweep the first beam. (Remaining BRS resources are used for BS narrow beam sweeping (full sweep within a subframe).

The second BRS configuration information may be transmitted through a physical broadcast channel (PBCH). (SBRS configuration information is conveyed via PBCH).

The base station may notify the UE of the mapping relationship among the index (or antenna port) of the array antenna, the index of the beam switch unit, and the beam index as illustrated in FIG. 18. The base station may notify the UE of the information through a 5G PBCH, a 5G RRC message, a 4G RRC message, or the like.

Figure 19:
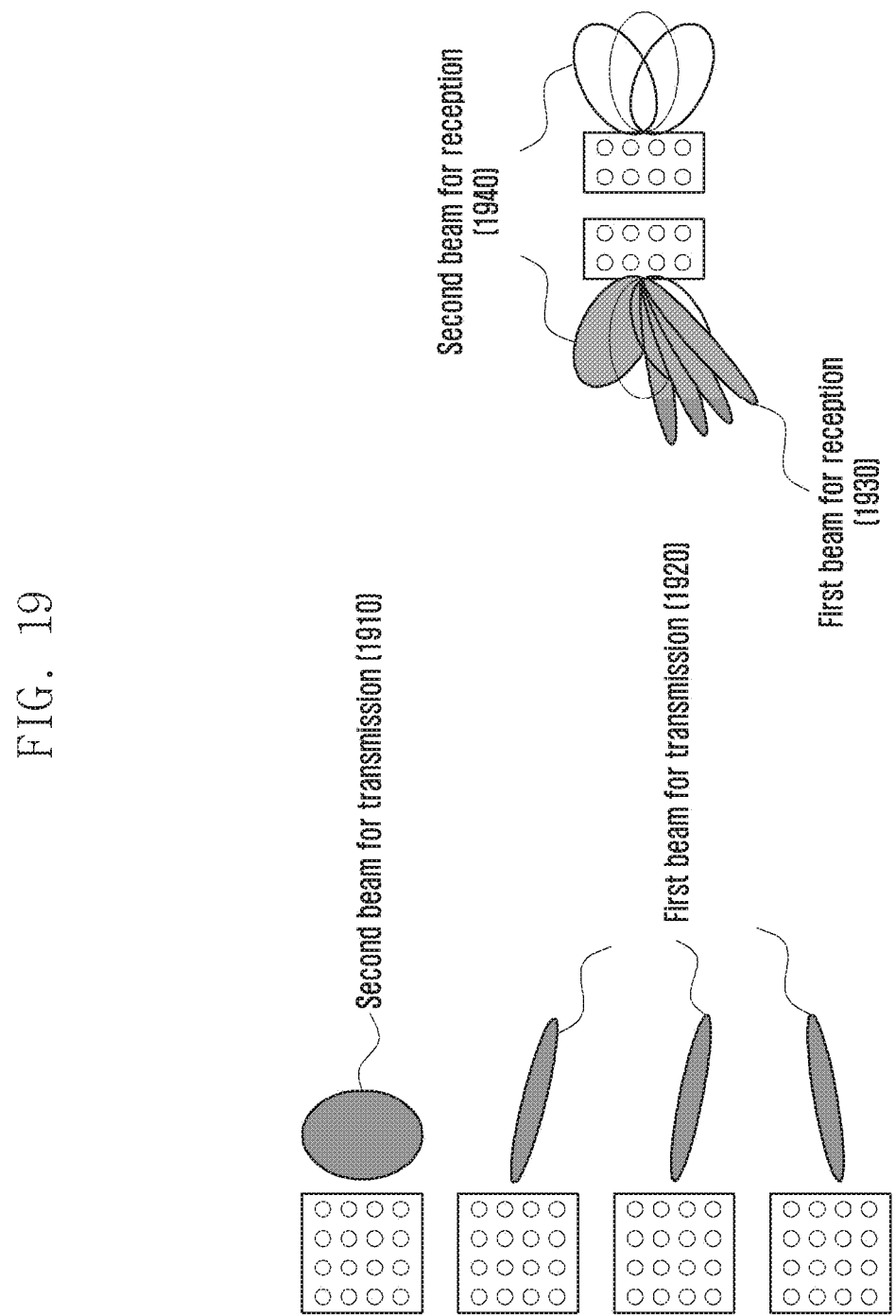
FIG. 19 is a diagram illustrating a method for transmitting and receiving, by a base station and UE, BRS simultaneously using a first beam and a second beam according to an embodiment of the present disclosure.

FIG. 19 is a diagram illustrating a method for transmitting and receiving, by a base station and UE, BRS simultaneously using a first beam and a second beam according to an embodiment of the present disclosure.

Referring to FIG. 19, the base station and the UE may receive the BRS simultaneously using the first beam and the second beam.

A second beam 1910 of the base station may be used to transmit the second BRS. The second beam for transmission may include the wide beam or the omni-directional beam and the detailed content thereof is as described above.

A first beam 1920 of the base station may be used to transmit the first BRS. The first beam for transmission may include the narrow beam.

However, the base station may transmit the second BRS using the first beam for transmission and may also transmit the first BRS using the second beam for transmission. Further, the base station's beam is called the transmission beam, but the transmission beam may be used to transmit the downlink data or receive the uplink data.

A first beam 1930 for reception of the UE may be used to receive the first BRS and the second beam 1940 for reception of the UE may be used to receive the second BRS. The UE may transmit the first BRS using the first beam for transmission and may also receive the second BRS using the second beam for reception. Further, the UE's beam is called the reception beam, but the reception beam may be used to transmit the uplink data as well as receiving the downlink data.

Figure 20:
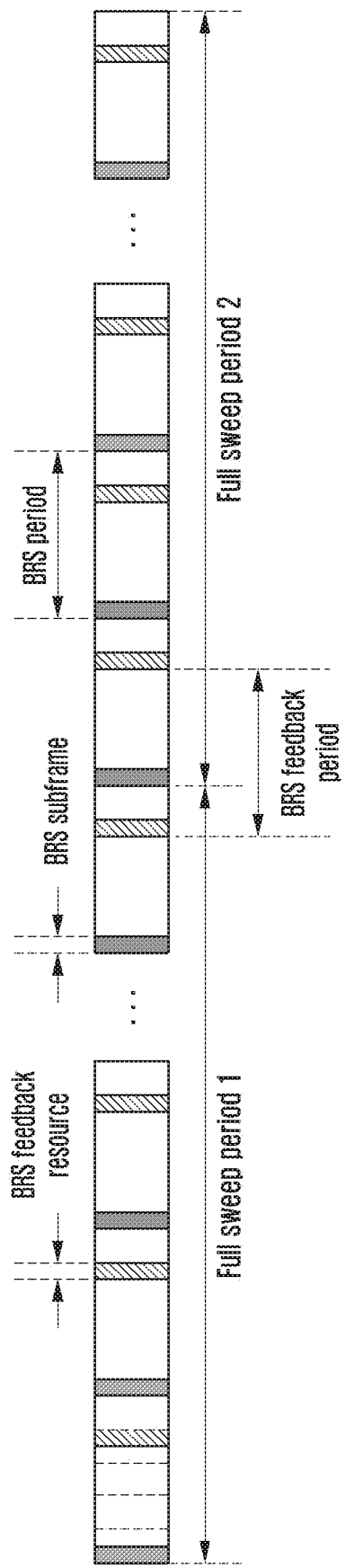
FIGS. 20 and 21 are diagrams illustrating a method for feeding back a beam measurement result according to an embodiment of the present disclosure.
Figure 21:
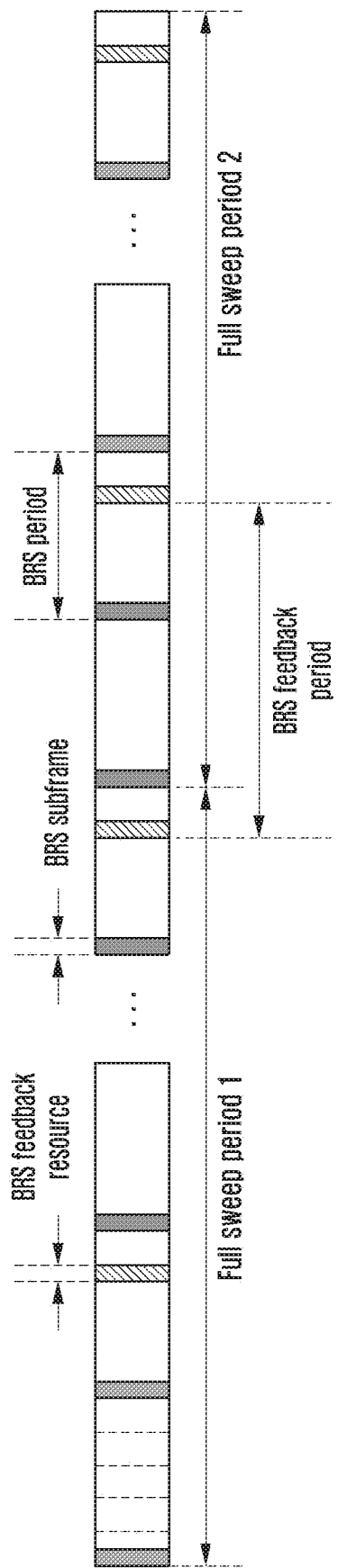

FIGS. 20 and 21 are diagrams illustrating a method for feeding back a beam measurement result according to an embodiment of the present disclosure.

Referring to FIG. 20, the UE may measure the BRS transmitted by the base station and feedback the measured result to the base station. Resources used for feedback may be resources periodically allocated in advance, or resources allocated by the request to the base station as required.

When the resources used for feedback are resources periodically allocated in advance, a period thereof may be set. When transmitting the BRS configuration information to the UE, the base station may transmit report configuration information for reporting the BRS configuration information to the UE, in which the report configuration information may include information related to the resource used for feedback.

FIGS. 20 and 21 illustrate that the resource for the beam measurement feedback is periodically allocated and the period is different.

Referring to FIG. 20, the transmission period of the BRS and the feedback period of the BRS may be identically set. Alternatively, as illustrated in FIG. 21, they may also be set to feedback the BRS measurement result after the BRS is transmitted predetermined times.

The resource for feedback may also be allocated aperiodically. The detailed content thereof is described below with reference to FIG. 22.

Figure 22:
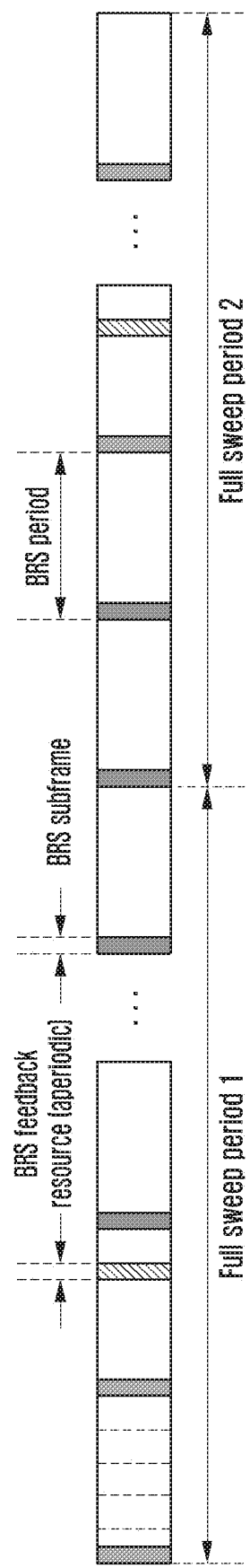
FIG. 22 is a diagram illustrating a method for feeding back a beam measurement result according to an embodiment of the present disclosure.

FIG. 22 is a diagram illustrating a method for feeding back a beam measurement result according to an embodiment of the present disclosure.

Referring to FIG. 22, the resource for the beam measurement feedback may not be allocated periodically. In this case, the resource for feedback may be aperiodically allocated by the request of the UE, or the like.

When transmitting the beam measurement result, the UE may feedback the base station of the beam measurement result, including the following information, or the like.

Transmission beam identifier (hereinafter, TX beam ID):
The feedback may include a transmission beam (best TX beam) of a serving base station having the best signal strength or quality for the selected reception beam of the UE. The feedback may further include a transmission beam identifier (2nd best TX beam ID) having second best signal strength or quality, a transmission beam identifier (3rd best TX beam ID) having third best signal strength or quality, . . . , a transmission beam identifier (n-th best TX beam ID) having n-th best signal strength or quality for the reception beam. The feedback may include the RSRP or the RSRQ between the respective beam pairs.

The feedback may include all the TX beam IDs of the serving base station in which the RSRP or the RSRQ is equal to greater than the threshold, for the reception beam selected by the UE. The feedback may include the RSRP or the RSRQ between the respective beam pairs.

The feedback may include a transmission beam identifier having the greatest RSRP or RSRQ, a transmission beam identifier having second greatest RSRP or RSRQ, . . . , a transmission beam identifier (n-th best TX beam ID) having n-th greatest RSRP or RSRQ among the TX beams of the serving base station in which the RSRP or the RSRQ is equal to or greater than the threshold, for the selected reception beam of the UE.

The feedback may include a transmission beam identifier (best TX beam ID) of neighbor base stations having the best signal strength or quality, a transmission beam identifier (2nd best TX beam ID) having second best signal strength or quality, a transmission beam identifier (3rd best TX beam ID) having third best signal strength or quality, . . . , a transmission beam identifier (n-th best TX beam ID) having n-th best signal strength or quality, and a neighbor base station ID, for the selected reception beam of the UE. The feedback may include the RSRP or the RSRQ between the respective beam pairs.

Further, the beam measurement result for a BRS transmitted by the neighbor base station may be used for inter-cell interference coordination, etc.

The feedback may include all the TX beam IDs of the neighbor base stations in which the RSRP or the RSRQ is equal to greater than the threshold and the neighbor base station ID, for the selected reception beam of the UE. The feedback may include the RSRP or the RSRQ between the respective beam pairs.

The feedback may include a transmission beam identifier (best TX beam) having the greatest RSRP or RSRQ, a transmission beam identifier (2nd best TX beam) having second greatest RSRP or RSRQ, . . . , a transmission beam identifier (n-th best TX beam ID) having n-th greatest RSRP or RSRQ, and a neighbor base station ID among the TX beams of the neighbor base stations in which the RSRP or the RSRQ is equal to or greater than the threshold, for the selected reception beam of the UE Further, it may include the RSRP or the RSRQ between the respective beam pairs.

The feedback may include the selected receive beam identifier (best RX beam ID) of the UE. The reception beam identifier may include the identifier of reception beam having the best signal strength or quality.

The feedback may include a second BRS (special BRS) transmission request indicator. However, the second BRS transmission request indicator may not be included in the beam measurement result and the detailed content thereof will be described below.

As described above, the second BRS may be transmitted through the first beam (narrow beam), the second beam (wide beam, omni-directional beam), or the like.

The above listed feedback information of the UE is under an assumption that the UE performs feedback after full sweeping, that is, after performing measurement for all TX/RX beam pairs. The detailed content thereof is described below with reference to FIG. 23.

Figure 23:
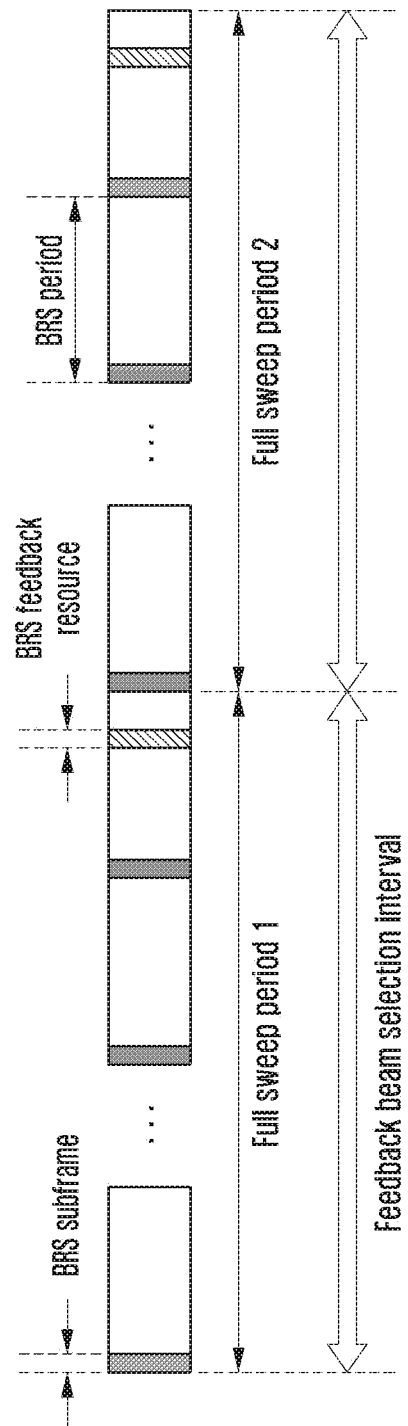
FIG. 23 is a diagram illustrating a process of performing a feedback after performing a measurement for all beam pairs according to an embodiment of the present disclosure.

FIG. 23 is a diagram illustrating a process of performing a feedback after performing a measurement for all beam pairs according to an embodiment of the present disclosure.

Referring to FIG. 23, the BRS feedback resource may be allocated after the UE transmits all the BRSs in the BRS subframe for the full sweep period. The UE may measure the BRS for all the beam pairs for the full sweep period and may use the measured BRS to determine the identifier of the beam having the best signal strength or quality, the RSRP and the RSRQ when the BRS is received through the beam, or the like.

As described above, the UE may transmit the identifier having the best signal strength or quality by including it in the beam measurement result.

However, embodiments of the present disclosure are not limited thereto. For example, as described in FIGS. 20 and 21, the UE may report the measurement result in the BRS subframe or the predetermined number of BRS subframes within the full sweep period. Even in the case, the UE may report the foregoing information.

As described above, even when the full sweep period and the interval in which the UE derives the beam measurement information do not coincide with each other, the content of the present disclosure may be applied. The interval in which the beam measurement result is derived may be called a beam selection interval.

When the feedback beam selection interval is smaller than the full sweep period, the UE feeds back the beam measurement result before the full sweep is completed. Therefore, the feedback may be performed with respect to the result measured in the feedback beam selection interval, in the same manner as the case in which the full sweep period and the feedback beam selection interval coincide with each other.

On the other hand, when the feedback beam selection interval is greater than the full sweep period, the UE performs the measurement on the respective beam pairs at least once and then performs the feedback. For a beam pair by which the BRS is received at least two times, the UE may determine a representative value for the corresponding beam pair through linear averaging, weighted averaging, latest value selection, maximum value selection, minimum value selection, or the like. Thereafter, the feedback may be performed in the same manner as the case in which the full sweep period and the feedback beam selection interval coincide with each other.

Feedback beam selection intervals that are adjacent to each other in terms of time may be set so as not to overlap each other, or may be set so as to overlap each other.

Figure 24:
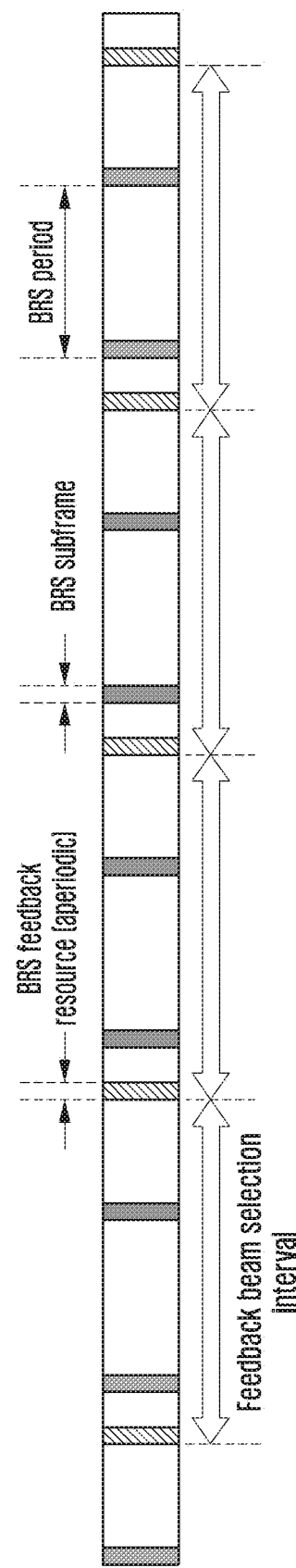
FIGS. 24 and 25 are diagrams illustrating a case in which feedback beam selection intervals are set to overlap with each other and a case in which the feedback beam selection intervals are set not to overlap with each other according to an embodiment of the present disclosure.
Figure 25:
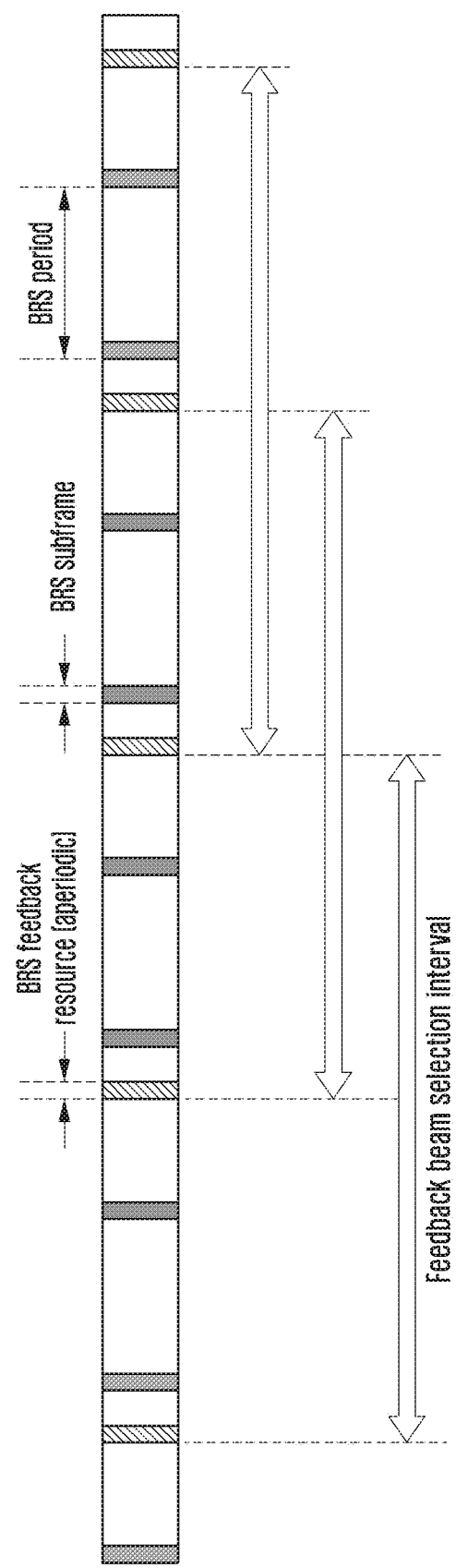

FIGS. 24 and 25 are diagrams illustrating a case in which feedback beam selection intervals are set to overlap with each other and a case in which the feedback beam selection intervals are set not to overlap with each other according to an embodiment of the present disclosure.

Referring to FIG. 24, the feedback beam selection intervals may be selected not to overlap each other and the UE may use the measurement result in the feedback beam selection interval to generate and report the beam measurement result.

Referring to FIG. 25, the feedback beam selection intervals may be selected to overlap each other. The UE may use the measurement result in the overlapped interval in the next feedback beam selection interval and may generate and report the beam measurement result using the measurement result.

The present disclosure describes a method for requesting, by UE, a second BRS and selecting a beam using the requested second BRS, when a specific condition such as a change in a direction of the UE is satisfied. A condition in which the UE requests the second BRS is described below.

First, the UE may request special BRS transmission to the base station in the following cases.

Figure 26:
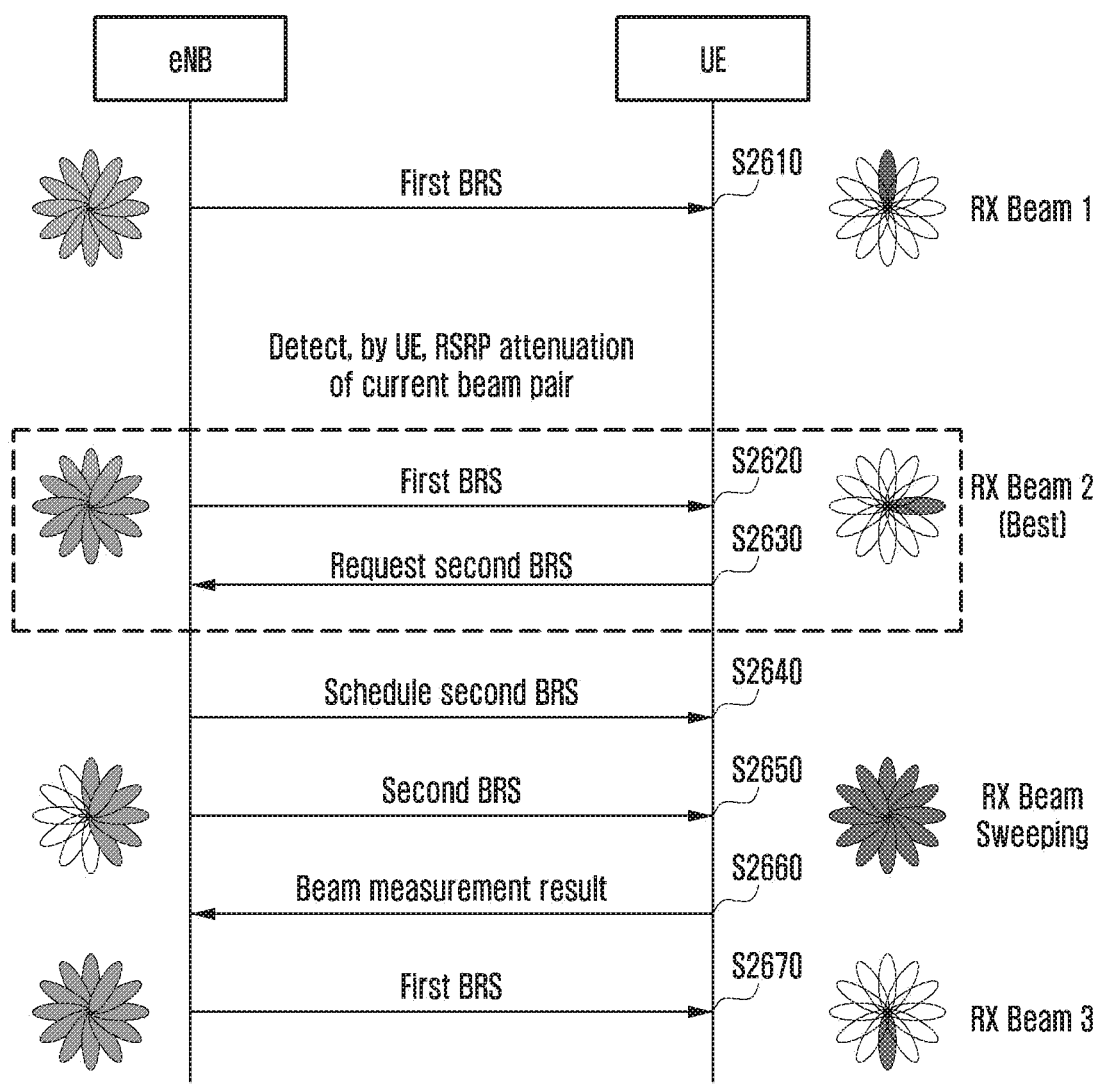
FIG. 26 is a diagram for describing a condition in which the UE requests the second BRS according to an embodiment of the present disclosure.

FIG. 26 is a diagram for describing a condition in which the UE requests the second BRS according to an embodiment of the present disclosure.

Referring to FIG. 26, when the RSRP or the RSRQ of the beam pair having the best signal strength or quality determined using the first BRS is attenuated, the UE may request the second BRS from the base station.

For example, when the RSRP or the RSRQ of the beam pair having the best signal strength or quality determined using the first BRS (regular BRS) is smaller than the predetermined value, the UE may request the second BRS to the base station.

The UE may request the second BRS (special BRS) from the base station as a result of measuring the first BRS (regular BRS) for the beam pair k times (k>1), if RSRP or RSRQ is rapidly decreased by a predetermined value or greater.

If k=2, the UE requests the second BRS from the base station when RSRPbestBeamPair[n−1]−RSRPbestBeamPair[n]>threshold.

The may UE request the second BRS from the base station if the RSRP or the RSRQ of the measured transmission and reception beam pair while the UE receives DL data from the base station through PDSCH is less than a predetermined value.

As a continuous measurement result k times, RP or RSRQ of a transmission and reception beam pair measured by the UE while receiving DL data from the base station through PDSCH is rapidly decreased by a predetermined value or greater, the UE may request the second BRS to the base station.

In operation S2610, the UE may receive the first BRS through a reception beam 1. The reception beam 1 may be a beam having the best signal strength or quality.

The UE may receive the first BRS in operation S2620. If it is determined that the signal strength or quality is drastically decreased due to any one of the foregoing examples, the UE may request the second BRS. As illustrated in FIG. 26, the UE may request the second BRS if it is determined that the signal strength or quality is better when the BRS is received through a reception beam 2.

Tf the foregoing conditions are satisfied, then the UE may request the second BRS in operation S2630.

In operation S2640, the base station may schedule the second BRS and in operation S2650, may transmit the second BRS.

As illustrated in FIG. 26, the base station may transmit the second BRS using the second beam. The second beam may mean a beam having the same beam width as a sum of beam widths of k first beams. The base station may transmit the second beam by the method for simultaneously transmitting first beams around a transmission beam included in a beam pair in the same resource.

The UE may receive the second BRS while sweeping the reception beam and select the measurement result reception beam.

In operation S2660, the UE may transmit the beam measurement result to the base station. Even when the base station's beam is not changed, the CQI, the RSRP, the RSRQ, or the like for the corresponding beam may be changed and the UE may transmit the beam measurement results of the CQI, the RSRP, the RSRQ, or the like to the base station.

The UE may receive the first BRS using the selected reception beam in operation S2670. Further, the UE may select the transmission beam having the best signal strength or quality and may feedback the selected transmission beam to the base station.

The UE may use the determined beam pair to perform communication with the base station.

Figure 27:
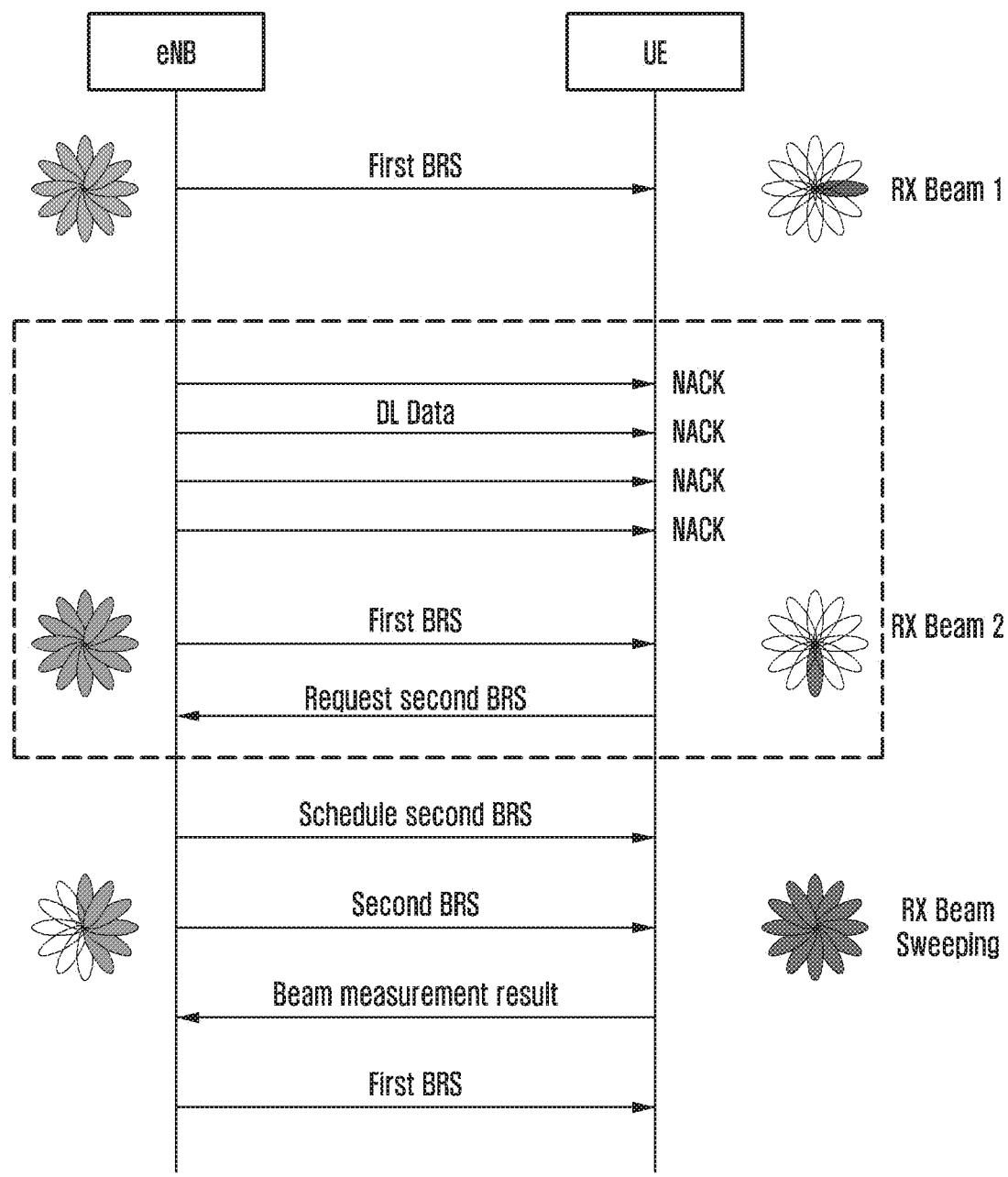
FIG. 27 is a diagram for describing another condition in which the UE requests the second BRS according to an embodiment of the present disclosure.

FIG. 27 is a diagram for describing another condition in which the UE requests the second BRS according to an embodiment of the present disclosure.

Referring to FIG. 27, the UE may request the second BRS (special BRS) from the base station if a decoding error with respect to DL data occurs k times (k=1 or k>1) or more while the UE receives the DL data from the base station through PDSCH. The UE may request the second BRS (special BRS) to the base station if HARQ NACK with respect to UL data is received k times (k=1 or k>1) or more after the UE transmits the UL data to the base station through PUSCH.

The detailed operation is the same as one described in FIG. 26 and therefore the description thereof will be omitted.

Figure 28:
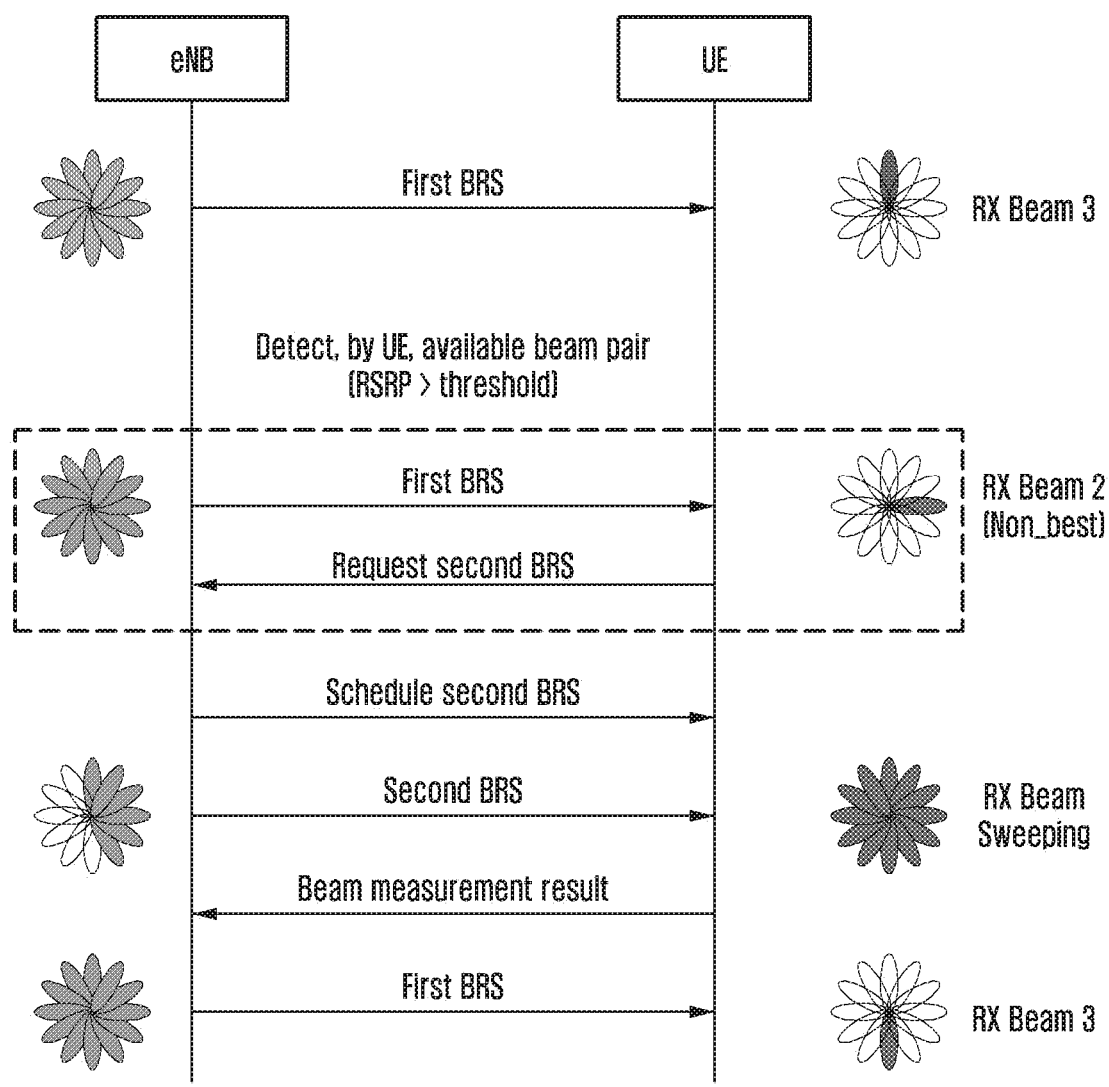
FIGS. 28, 29A, and 29B are diagrams for describing another condition in which the UE requests the second BRS according to an embodiment of the present disclosure.
Figure 29A:
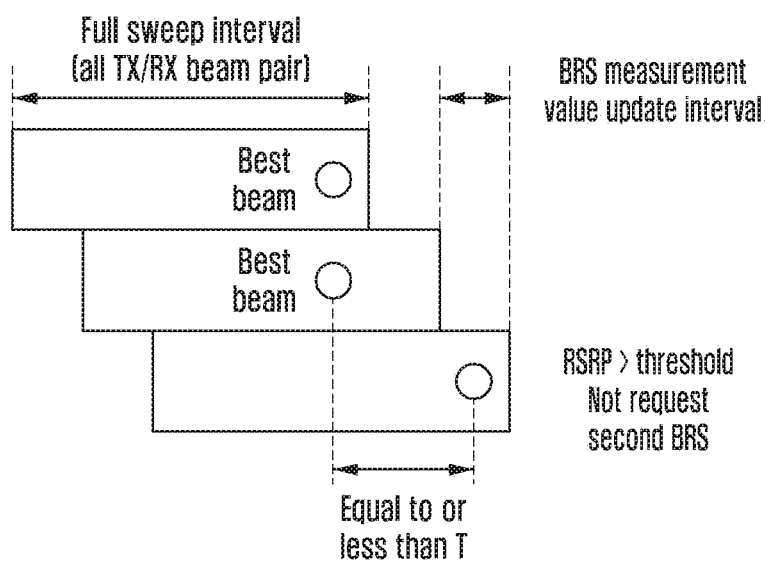
Figure 29B:
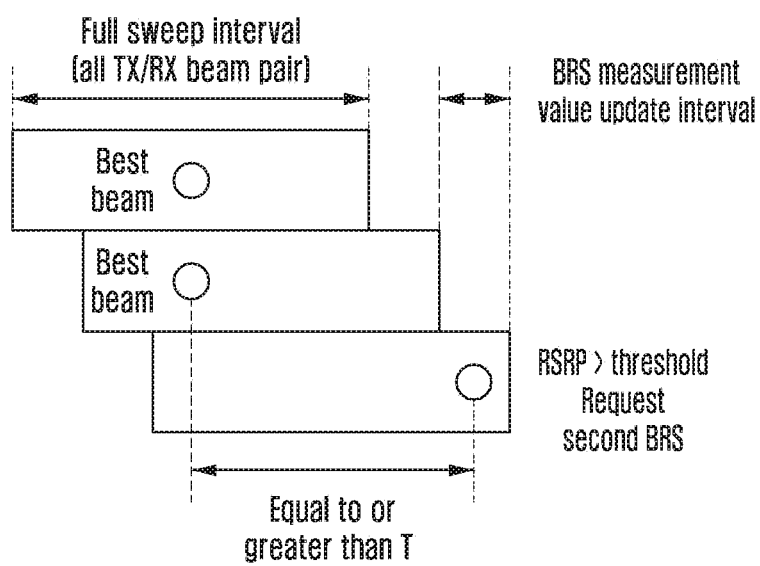

FIGS. 28, 29A, and 29B are diagrams for describing another condition in which the UE requests the second BRS according to an embodiment of the present disclosure.

Referring to FIG. 28, the UE may request the second BRS if the RSRP or the RSRQ of the beam pair other than the beam pair having the best signal strength or quality among the beam pairs measured using the first BRS (regular BRS) is greater than the predetermined value.

The UE may request the second BRS when the UE detects the beam pair of which the RSRP or the RSRQ exceeds the threshold other than the beam pair used for the transmission and reception of the current signal.

Rhe detailed operation is the same as one described in FIG. 26 and therefore the description thereof will be omitted.

Referring to FIG. 29B, even when the UE detects the beam pair of which the RSRP or the RSRQ exceeds the threshold, the UE may request the second BRS (special BRS) to the base station only when the time taken for the UE to measure the beam pair having the best signal strength or quality elapses over a predetermined time T (T>0) from the present.

Referring to FIG. 29A, even when the UE detects the beam pair of which the RSRP or the RSRQ exceeds the threshold, the UE may request the second BRS only when the difference between the time taken for the UE to measure the beam pair having the best signal strength or quality and the time taken to detect the beam pair of which the RSRP or the RSRQ exceeds the threshold is less than a predetermined time.

According to another embodiment of the present disclosure, the UE may request the second BRS under the following conditions.

When N (numNeighBeam) beam pairs having RSRP that is a threshold (rsrpNeighBeam) dBm or greater among beam pairs that are not the current serving beam pair (a pair of a transmission beam of the base station and a reception beam of the UE) are found, and for each beam pair corresponding thereto, the currently measured RSRP is increased by threshold (rsrpChangeNeighBeam) dB or greater as compared to immediately previously measured RSRP, the UE may request the second BRS to the base station. The base station may set all relevant parameters, that is, numNeighBeam, rsrpNeighBeam, rsrpChangeNeighBeam, etc. for the UE through RRC signaling, etc.

The content may be expressed as the following:

--- if the UE finds at least numNeighBeam beam pairs whose RSRPs are more
than rsrpNeighBeam dBm and
the latest BRS measurement result using each of the numNeighBeam beam pairs found is increased by more than rsrpChangeNeighBeam dB compared to the previous BRS measurement result.

---

The UE may also request the second BRS to the base station based on RSRP information of the BRS measured by using all beam pairs that may be used by the UE. Considering the conditions, the detailed content of requesting, by the UE, the second BRS to the base station will be described below.

Figure 30:
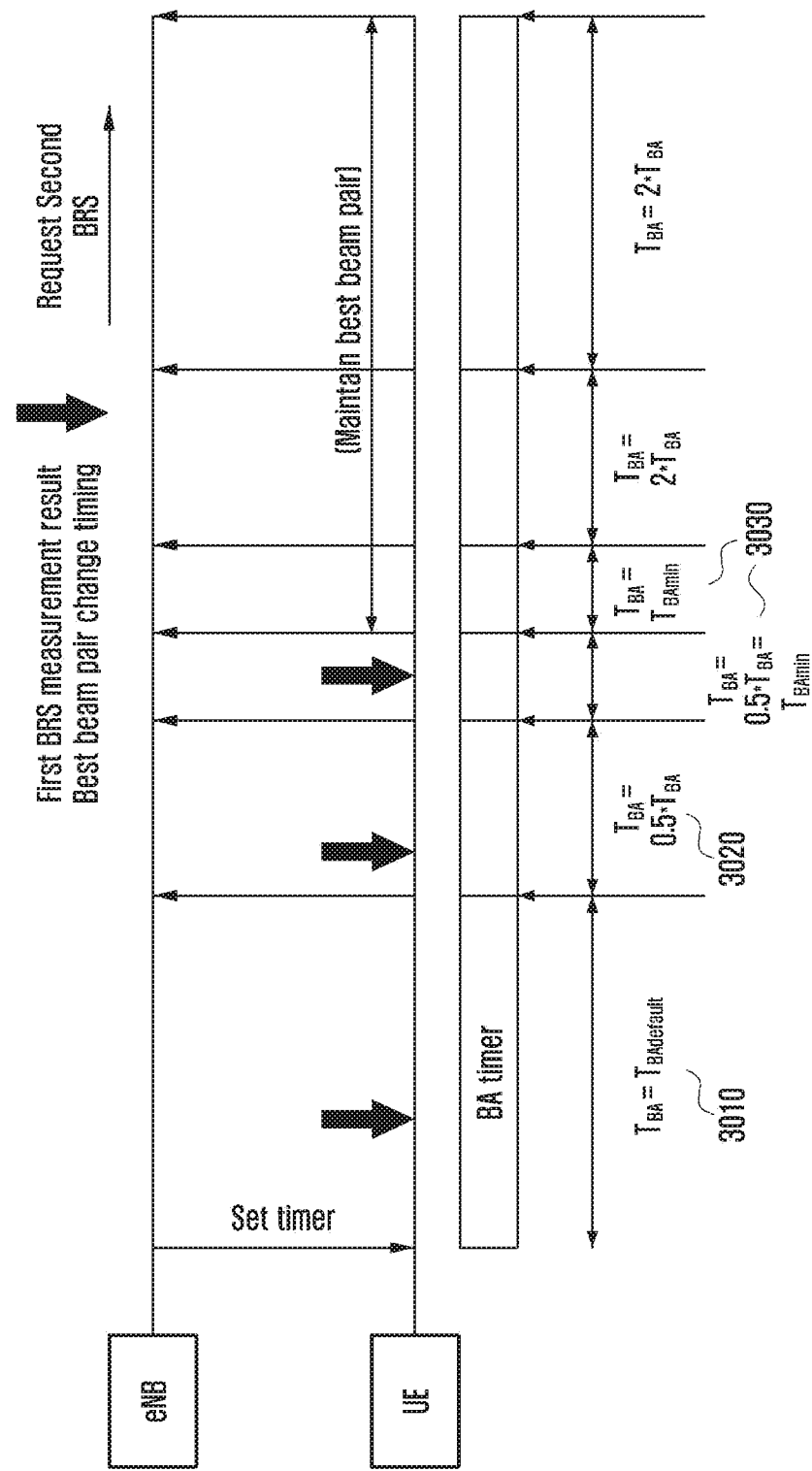
FIG. 30 is a diagram for describing a method for requesting, by UE, a second BRS on the basis of a timer according to an embodiment of the present disclosure.

FIG. 30 is a diagram for describing a method for requesting, by a UE, a second BRS on the basis of a timer according to an embodiment of the present disclosure.

Referring to FIG. 30, the base station may set a beam alignment (BA) timer in the UE using the RRC message, or the like and the UE may operate the beam alignment timer. The base station may include the BA timer information in the BRS configuration information. Alternatively, the base station may transmit the BA timer information to the UE using separate configuration information.

If a value of the BA timer is $T_{BA}$, the UE may transmit a message for requesting the second BRS to the base station every time when the BA timer expires, that is, $T_{BA}$ is elapsed.

The base station informs the UE of $T_{BAdefault}$ which is a basic timer value (default BA timer) value, and the UE may adaptively adjust $T_{BA}$ based on the $T_{BAdefault}$. Here, $T_{BAdefault}$ may be a full sweep interval, etc. As an example, the UE may adjust $T_{BA}$ as follows.

The UE may set an initial value of the $T_{BA}$ as $T_{BAdefault}$ in operation 3010.

If it is determined as the first BRS (regular BRS) measurement result of the UE that the beam pair (best beam pair) having the best signal strength or quality is changed, the UE may set the $T_{BA}$ that is the timer value to be 0.5 times in operation 3020. A minimum value of the $T_{BA}$ may be set to be a minimum timer value ($T_{BAmin}$). The base station may also notify the UE of the minimum timer value. The basic timer value, the minimum timer value, or the like may be included in the timer configuration information.

If the $T_{BA}*0.5$ is smaller than the $T_{BAmin}$, the UE may set the timer value ($T_{BA}$) to be the minimum timer value ($T_{BAmin}$) in operation 3030.

If it is determined as the first BRS (regular BRS) measurement result of the UE that the beam pair (best beam pair) having the best signal strength or quality is kept unchanged, the UE may set the $T_{BA}$ that is the timer value to be 2 times in operation 3030. A maximum value of the $T_{BA}$ may be set to be a maximum timer value ($T_{BAmax}$). The base station may also notify the UE of the maximum timer value. If the $T_{BA}*2$ is larger than the $T_{BAmax}$, the UE may set the timer value ($T_{BA}$) to be the maximum timer value ($T_{BAmax}$). Here, $T_{BAmax}$ may also be $T_{BAdefault}$.

The basic timer value, the minimum timer value, the maximum timer value, or the like may be included in the timer configuration information.

If the $T_{BA}$ elapses and thus the timer (BA timer) expires, the UE transmits the message requesting the second BRS to the base station and may update the timer (BA timer) (i.e., determine a new $T_{BA}$) by the foregoing method.

When the UE satisfies the specific condition to request the second BRS, it may be a matter of whether to request the second BRS using a certain resource. Accordingly, a detailed process of requesting the resource for requesting the second BRS and allocating the resource is described below.

Figure 31:
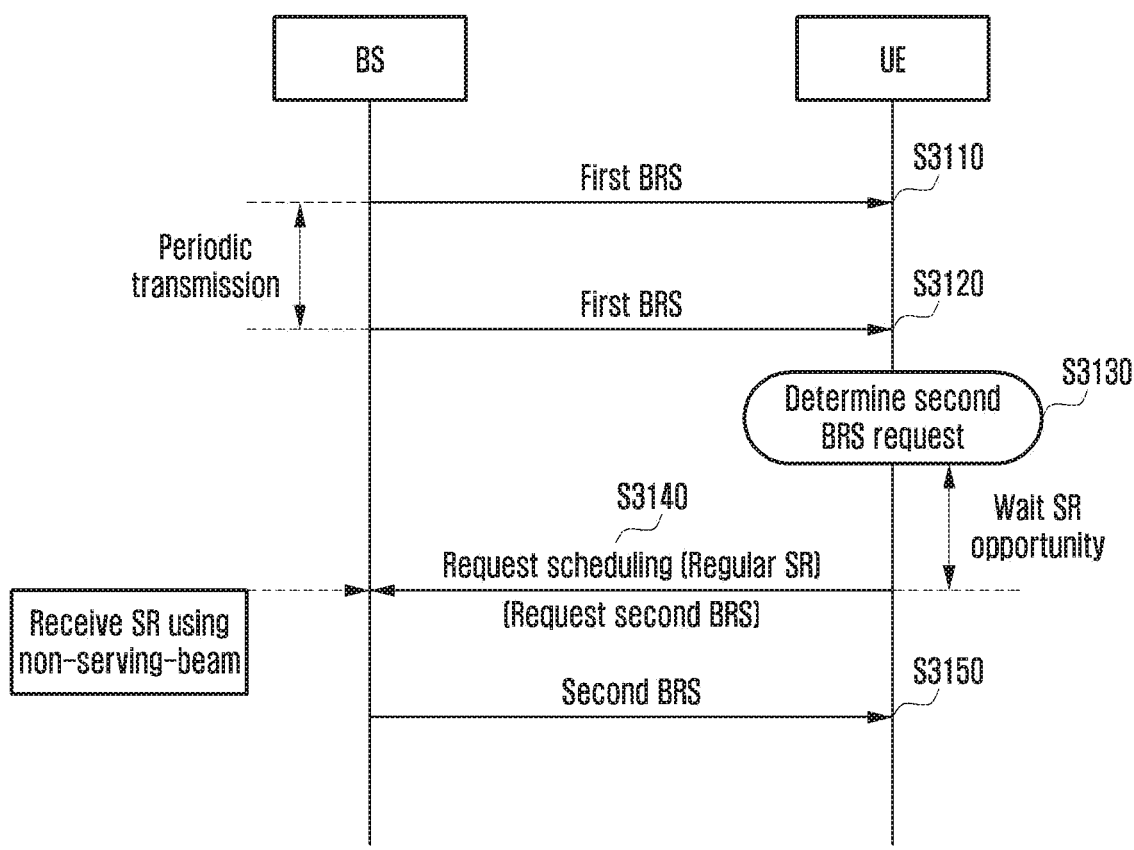
FIG. 31 is a diagram illustrating a method for requesting a second BRS according to an embodiment of the present disclosure.

FIG. 31 is a diagram illustrating a method for requesting a second BRS according to an embodiment of the present disclosure.

Referring to FIG. 31, the UE may receive the first BRS in operations S3110 and S3120. The UE may receive the first BRS at a predetermined period.

When the specific conditions are satisfied, the UE may determine to request the second BRS in operation S3130. The detailed content is the same as described above and therefore will be omitted below.

If the UE determines to request the second BRS, then in operation S3140, the UE may transmit the signal requesting the uplink resource allocation to the base station. The UE may request the uplink resource allocation using a SR message. The SR message may mean the message requesting the general uplink request allocation and in the present disclosure, may be called a regular SR or a normal SR. On the other hand, the signal requesting the uplink resource allocation for requesting the second BRS may be separately defined and may be called the SR message or a special SR for requesting the second BRS. The detailed content thereof is described below.

If the base station receives the scheduling request (regular SR) by a non-serving beam (non-serving (non-best) beam) other than a current serving beam of the base station (serving (or best) beam), the base station may know that beam tracking for the UE is performed abnormally. This is because if the beam tracking is performed normally, the base station may receive the regular SR by the current serving beam of the base station. The serving beam means the beam used for data transmission and reception and may mean a beam determined as having the best signal strength. When the base station receives the regular SR through the non-serving beam, the base station may allow the UE to schedule the second BRS (special BRS). When there is no separate second BRS request message of the UE, the base station may transmit the second BRS depending on the beam receiving the SR in operation S3150.

When transmitting the regular SR for the second BRS (special BRS), the UE may use the UE's beam having the best signal strength as the latest BRS measurement result.

The UE may be allocated the resource depending on the SR and may request the second BRS in the resource. However, a method for requesting, by UE, a second BRS may be various. Therefore, various methods for requesting, by UE, a second BRS will be described.

Figure 32A:
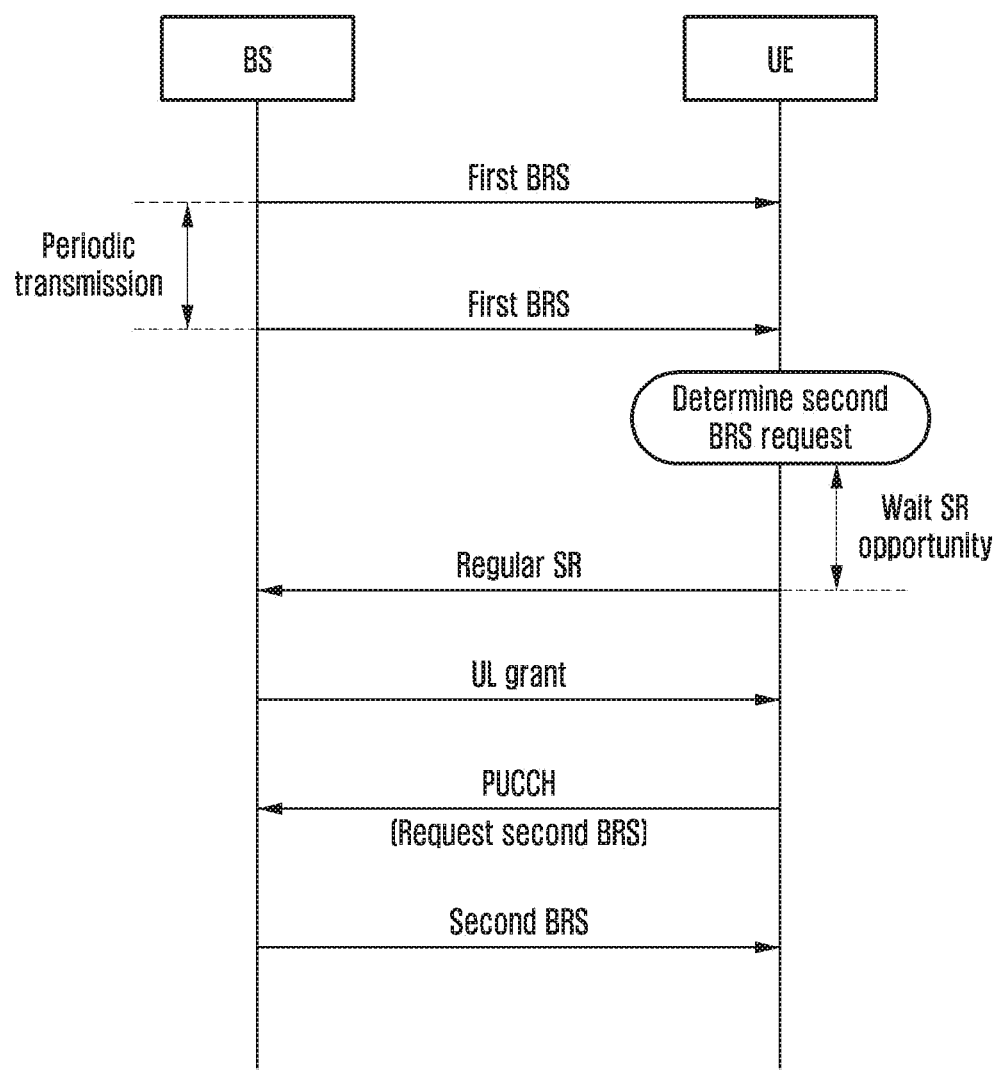
FIGS. 32A, 32B, and 32C are diagrams illustrating a method for requesting a second BRS according to an embodiment of the present disclosure.
Figure 32B:
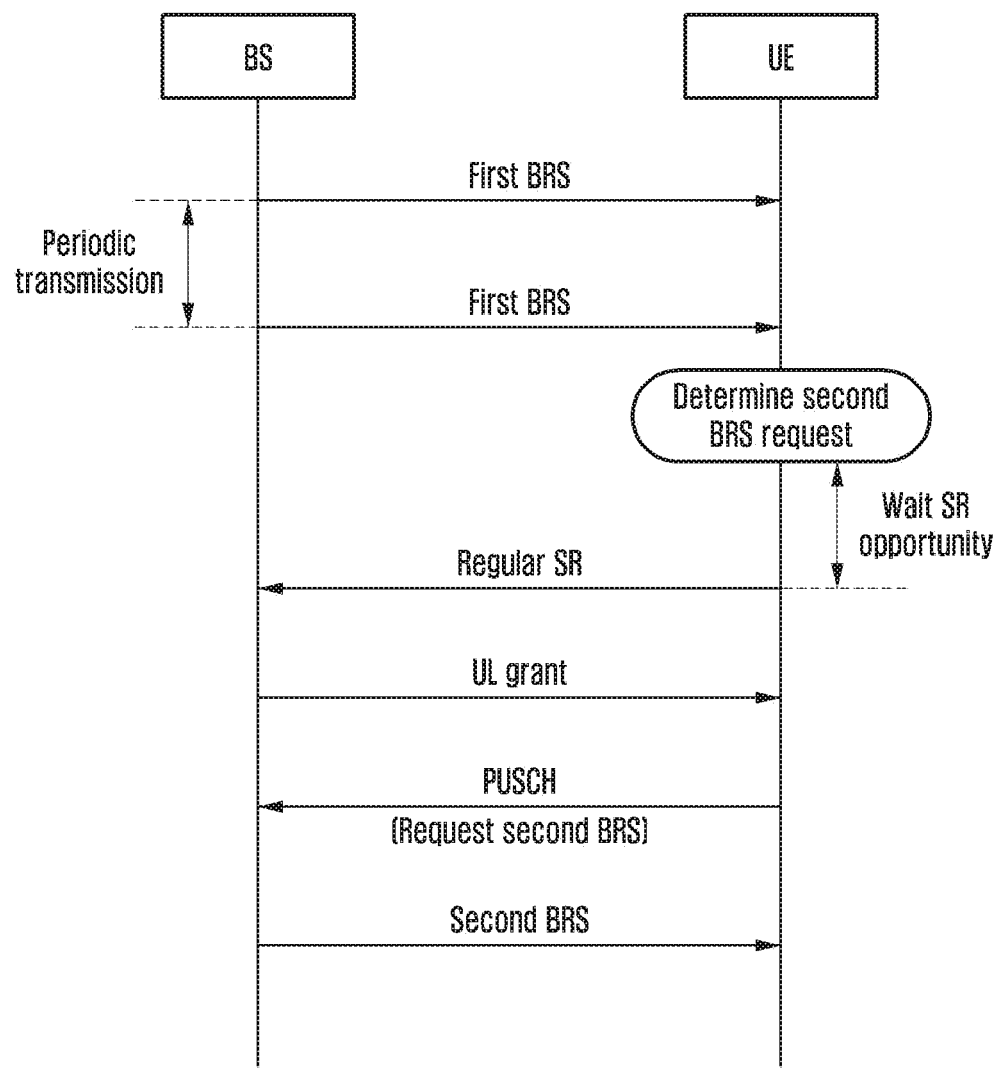
Figure 32C:
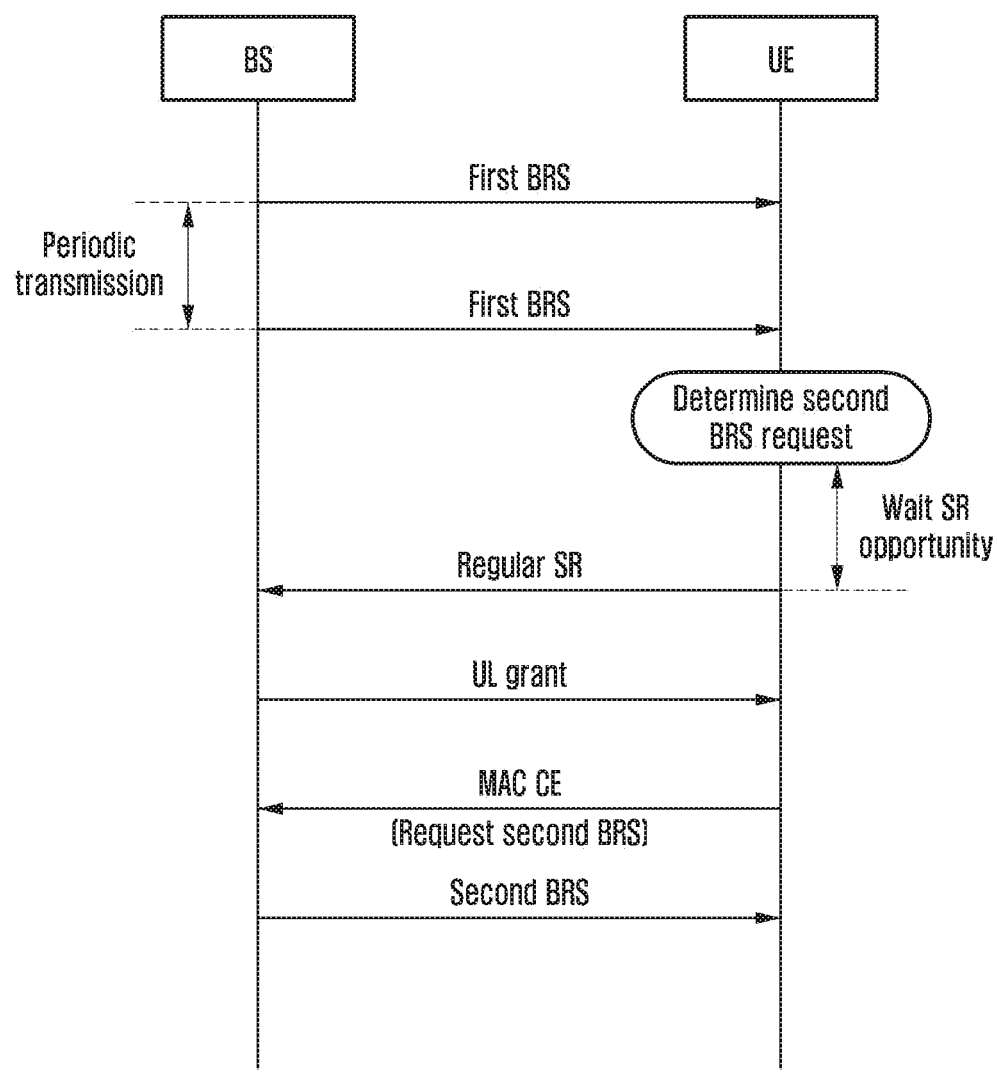

FIGS. 32A to 32C are diagrams illustrating a method for requesting a second BRS according to an embodiment of the present disclosure.

Referring to FIGS. 32A to 32C, when the UE decides to request the second BRS, the UE may transmit the scheduler request (regular SR) to the base station. The base station may receive the regular SR transmitted by the UE through the serving beam or the non-serving beam. The base station may allocate an uplink grant (hereinafter, UL grant) like a general uplink scheduling (hereinafter, UL scheduling) procedure.

The UE allocated with the UL grant may request the second BRS to the base station through PUCCH, PUSCH, media access control (MAC) control element (CE), etc.

FIGS. 32A and 32B illustrate an operation that the UE transmits the signal requesting the second BRS through PUCCH or PUSCH. When requesting the second BRS through PUCCH or PUSCH, an uplink control information (UCI) format as the following example may be used.

Table 1 shows fields for beam related information feedback for wideband reports:

TABLE 1

| Field | Bit width |
| --- | --- |
| Beam index | X bits |
| Wideband BQI | Y bits |
| Special BRS (or BRRS) request | Z bits |
| Others | |
| or | |

TABLE 1-continued

| Field | Bit width |
| --- | --- |
| Beam index | X bits |
| RSRP | Y bits |
| Special BRS (or BRRS) request | Z bits |
| Others | |
| or | |
| Special BRS (or BRRS) request | X bits |
| Others | |
| or | |
| HARQ ACK/NACK | X bits |
| Special BRS (or BRRS) request | Y bits |
| Others | |
| or | |
| SR | X bits |
| Special BRS (or BRRS) request | Y bits |
| Others | |
| or | |
| CQI | X bits |
| Special BRS (or BRRS) request | Y bits |
| Others | |

Alternatively, when the second BRS is requested, all the Tables that may be represented by a combination of the above Tables may be used.

FIG. 32C illustrates an operation of transmitting, by the UE, the signal requesting the second BRS through MAC CE. The operation of transmitting, by the UE, the special BRS request information through the MAC CE is as follows. The MAC CE may be interchangeably used with the terms such as the MAC control information.

As described above, a signal requesting, by the UE, the base station to transmit a second BRS may be transmitted through the uplink resource (PUCCH or PUSCH) previously allocated or dynamically allocated to the UE. Alternatively, the signal requesting the second BRS transmission may be transmitted through the random access channel (RACH), the beam feedback message, or the like. The detailed content thereof is described below. FIGS. 32A to 32C describe methods for transmitting a second BRS request when a second BRS is requested through a MAC CE.

The overall operation of requesting, by the UE, the base station to transmit the second BRS (specified by BRRS) is described below.

The following Table 2 shows the type of the MAC CE used when the UE requests the second BRS to the base station. The UE may request the second BRS for each component carrier (CC), and if the UE sets a bit corresponding to a k-th component carrier as 1 and transmits the setting to the base station, the base station may transmit the second BRS to the UE through the k-th component carrier. A beam adjustment request (BAR) may mean the request of the second BSR.

TABLE 2

Figure 45:
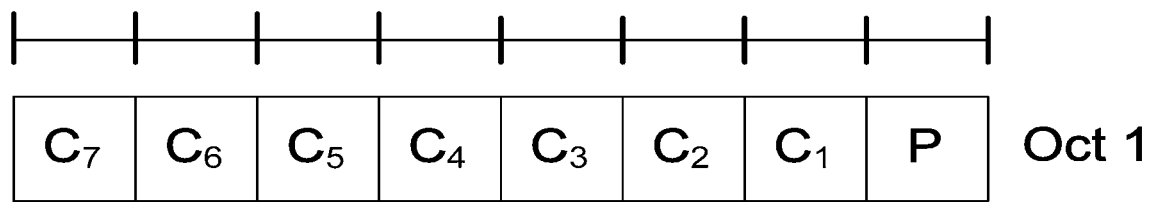
FIG. 45 is a diagram illustrating a control element according to an embodiment of the present disclosure.

6.1.3 5G MAC Control Elements
6.1.3.10 Beam Adjustment Request MAC Control Element
The Beam Adjustment Request (BAR) MAC control element is identified by a 5G MAC PDU subheader with LCID as specified in table 6.2.1-2. It has a fixed size and consists of a single octet containing seven C-fields and one P-field.
The BAR MAC control element is defined as follows (FIG. 45).
$C_i$: if there is an SCell configured with SCellIndex i as specified in [7], this field indicates the beam adjustment request is for the SCell with SCellIndex i, else the 5G MAC entity shall ignore the $C_i$ field. The $C_i$ field is set to "1" to indicate that the UE requests the BRRS (Beam Refinement Referene Signal) transmission via the SCell with SCellIndex i. The Ci field is set to "0" to indicate that the UE does not request the BRRS transmission via the SCell with SCellIndex i.

TABLE 2-continued

P: this field indicates the beam adjustment request status of the PCell. The P field is set to "1" to indicate that the UE requests the BRRS transmission
via the PCell. The P field is set to "0" to indicate that the UE does not request the BRRS transmission via the PCell.

The following Table 3 shows a logical channel identifier (hereinafter, LCID) of the MAC CE used when the UE requests the second BRS to the base station. An LCID value suggested in the present disclosure is a beam adjustment request and an index thereof is specified as 01100 as below, but other values may also be used. The following Table 3 shows that each MAC CE is classified by the LCID indicating this, and the beam adjustment request MAC CE proposed in the present disclosure may have LCID 01100, by way of example.

TABLE 3

<Formats and parameters>
5G MAC header for DL-SCH and UL-SCH
The 5G MAC header and subheaders are octet aligned.
Values of LCID for UL-SCH

| Index | LCID values |
| --- | --- |
| 00000 | Reserved |
| 00001-01010 | Identity of the logical channel |
| 01011 | Reserved |
| 01100 | Beam Adjustment Request |
| 01101-10101 | Reserved |
| 10110 | Reserved |
| 10111 | Reserved |
| 11000 | Reserved |
| 11001 | Extended Power Headroom Report |
| 11010 | Reserved |
| 11011 | C-RNTI |
| 11100 | Truncated BSR |
| 11101 | Short BSR |
| 11110 | Long BSR |
| 11111 | Padding |

The following Table 4 shows the priority of the MAC CE used when the UE requests the second BRS to the base station. Hereinafter, the MAC CE for requesting the second BRS is allocated at a just next priority of the MAC CE for the cell radio network temporary identifier (C-RNTI) but other priorities may also be used. The following Table 4 shows that if the UE is allocated the UL resource, the UE may transmit the MAC CE and the UL data by including them in the UL resource depending on the set order. Also, The content in the Table 4 indicates that when the UE is allowed the UL resource, the UE first includes the C-RNTI MAC CE in the UL resource and then includes BAR MAC CE in the allocated UL resource.

TABLE 4

<Multiplexing and assembly >

Logical channel prioritization
The 5G MAC entity shall not transmit data for a logical channel corresponding to a radio bearer that is suspended (the conditions for when a radio bearer is considered suspended are defined in [7]).
For the Logical Channel Prioritization procedure, the 5G MAC entity shall take into account the following relative priority in decreasing order:
5G MAC control element for C-RNTI;
5G MAC control element for BAR;
5G MAC control element for BSR, with exception of BSR included for padding;

TABLE 4-continued

<Multiplexing and assembly >

5G MAC control element for Extended PHR;
data from the Logical Channel;
5G MAC control element for BSR included for padding;

The following Table 5 shows an operation of resetting the MAC CE used when the UE requests the second BRS to the base station. The Table 5 indicates that when the MAC layer is reset by handover, or the like, the BAR procedure that is currently being performed is also reset.

TABLE 5

<5G MAC Reset>

If a reset of the 5G MAC entity is requested by upper layers, the 5G MAC
entity shall:
initialize Bj for each logical channel to zero;
stop (if running) all timers;
consider timeAlignmentTimer as expired and perform the corresponding actions;
set the NDIs for all uplink HARQ processes to the value 0;
stop, if any, ongoing 5G RACH procedure;
discard explicitly signalled ra-PreambleIndex and
ra-PRACH-MaskIndex, if any;
flush Msg3 buffer;
cancel, if any, triggered Scheduling Request procedure;
cancel, if any, triggered Buffer Status Reporting procedure;
cancel, if any, triggered Power Headroom Reporting procedure;
cancel, if any, triggered Beam Adjustment Request procedure;
flush the soft buffers for all DL HARQ processes;
for each DL HARQ process, consider the next received
transmission for a TB as the very first transmission;
release, if any, Temporary C-RNTI.

As described above, the signal requesting the uplink resource allocation for requesting the second BRS may be separately defined. This may be called the SR message for requesting the second BRS or the special SR.

Figure 33:
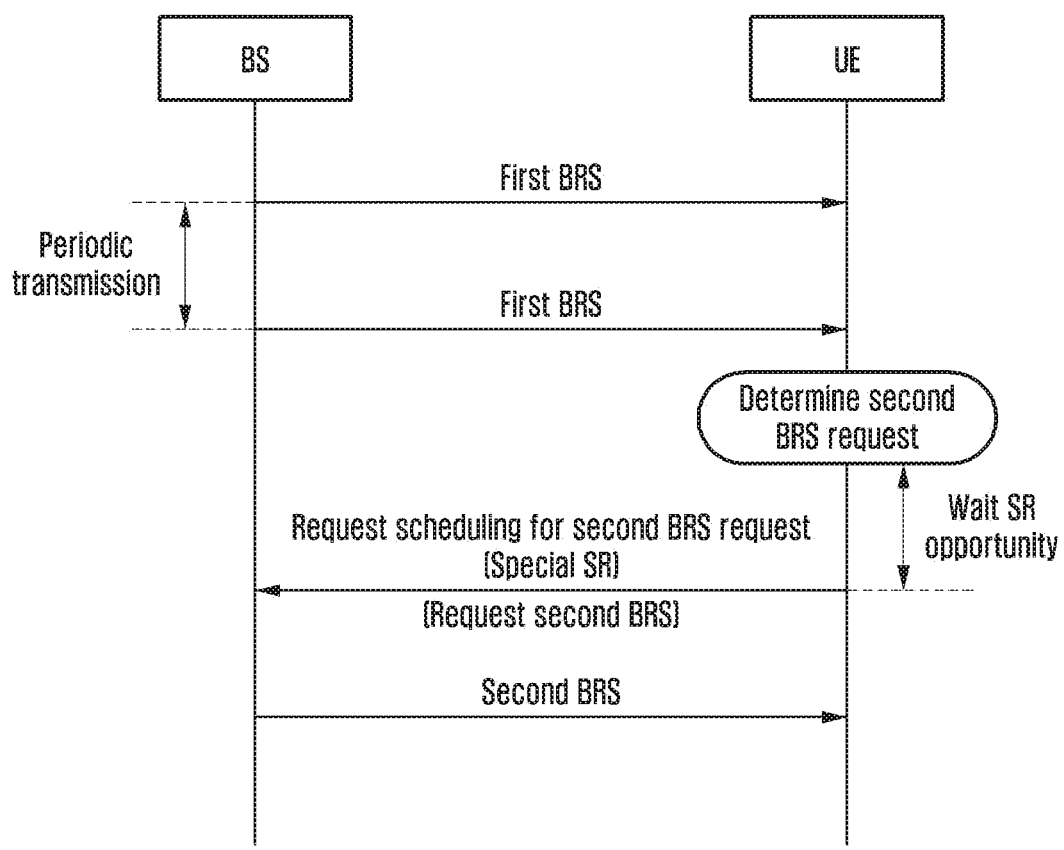
FIG. 33 is a diagram illustrating a method for requesting a second BRS according to an embodiment of the present disclosure.

FIG. 33 is a diagram illustrating a method for requesting a second BRS according to an embodiment of the present disclosure.

Referring to FIG. 33, when the UE decides to request the second BRS, the UE may transmit the special SR to the base station, (i.e., a different kind of SRs from the regular SR requesting the UL resource allocation to the base station). As such, when the SR different from the SR requesting the uplink resource allocation is used, in the present disclosure, the SR for requesting the uplink resource allocation may be called a first SR and the SR for requesting the second BRS may be also called a second SR.

In a case of LTE, the SR consists of 1 bit, and on-off keying is applied. Accordingly, after measuring an energy level from the resources allocated for an SR, if it is determined that the energy level is a predetermined level or greater, the base station understands that the UE transmits the SR and is operated. If it is determined that the energy level is lower than the predetermined level, the base station understands that the UE does not transmit the SR and is operated.

In the present disclosure, by additionally utilizing SR 1 bit, the regular SR is transmitted when the UE requests for UL resource allocation, and the special SR is transmitted when the UE requests for second BRS scheduling. Accordingly, the base station may transmit the UL grant to the UE when receiving the regular SR from the UE, and transmit the special BRS to the UE when receiving the special SR.

Referring to FIG. 33, the UE may transmit the SR message for requesting the second BRS and the base station may transmit the second BRS when receiving the message. Other operations are the same as FIG. 3 and therefore will be omitted below.

Figure 34A:
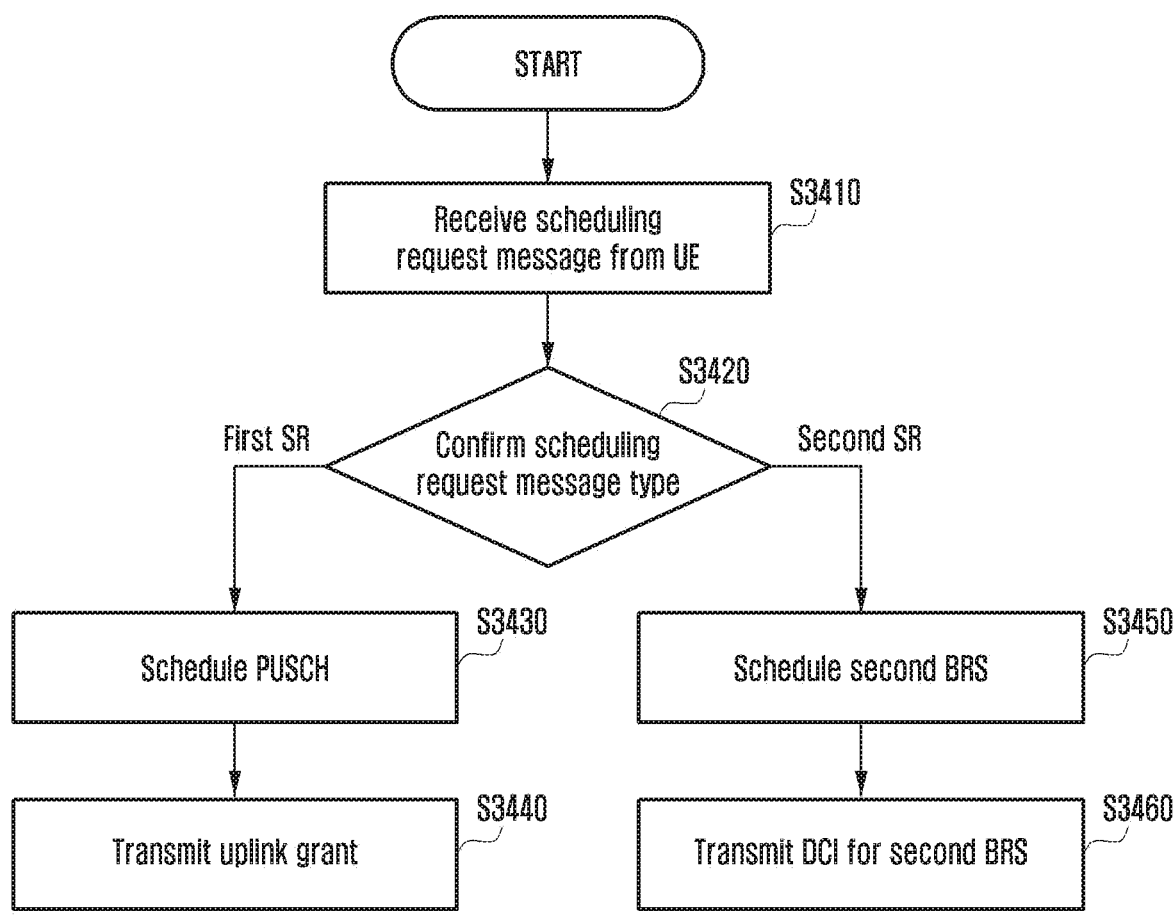
FIG. 34A is a diagram illustrating an operation of a base station for requesting a second BRS according to an embodiment of the present disclosure.

FIG. 34A is a diagram illustrating an operation of a base station for requesting a second BRS according to an embodiment of the present disclosure.

Referring to FIG. 34A, in operation S3410, the base station may receive the SR message from the UE.

In operation S3420, the base station may confirm the type of the SR message.

When the SR message is the first SR, in operation S3430, the base station may perform the PUSCH scheduling. The base station may allocate the uplink resource. In operation S3440, the base station may transmit the uplink grant.

Thereafter, the UE may transmit data using the uplink grant.

When the SR message is the second SR, then in operation S3450, the base station may schedule the second BRS. That is, the base station may allocate a resource for transmitting the second BRS.

In operation S3460, the base station may transmit downlink control information (hereinafter, DCI) on the second BRS. The base station may notify the UE of the resource for transmitting the second BRS through the DCI as a result of scheduling the second BRS and may transmit the second BRS in the resource.

Figure 34B:
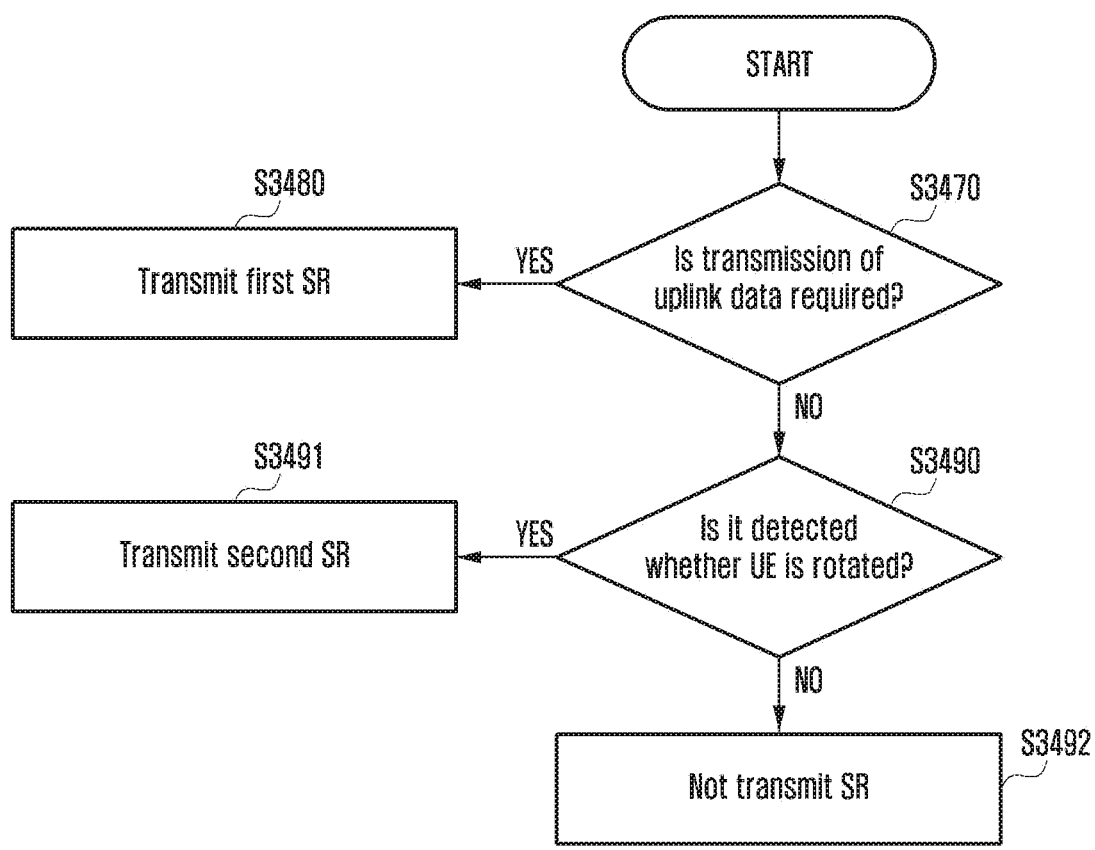
FIG. 34B is a diagram illustrating an operation of UE for requesting a second BRS according to an embodiment of the present disclosure.

FIG. 34B is a diagram illustrating an operation of a UE for requesting a second BRS according to an embodiment of the present disclosure.

Referring to FIG. 34B, in operation S3470, the UE may confirm whether the uplink data needs to be transmitted.

When the uplink data needs to be transmitted, then in operation S3480, the UE may transmit the first SR. As described above, the first SR may mean the regular SR requesting the resource for transmitting the uplink data. Accordingly, the UE may receive the uplink grant from the base station and may transmit the uplink data using the allocated resource.

On the other hand, when the uplink data need not be transmitted, in operation S3490, the UE may detect whether the UE is rotated. The method for determining whether UE is rotated is the same as the method for confirming whether a condition for requesting a second BRS transmission is satisfied and therefore will be omitted below.

If it determined that the UE is rotated, then in operation S3491, the UE may transmit the second SR. As described above, the second SR may mean the SR message for requesting the second BRS transmission. Accordingly, the UE may receive the DCI on the information on the resource for transmitting the second BRS and then receive the second BRS in the corresponding resource.

On the other hand, when the UE is not rotated, then in operation S3492, the UE may not transmit the SR. In the mobile communication system, the first SR (regular SR) may be transmitted using some region of a RACH subframe periodically present. The base station may provide the following parameters to the UE for a configuration of a signal for the first SR (regular SR). Like the first SR (regular SR), to configure the signal for the second SR (special SR), the base station may provide values of the parameters as shown in the following Table 6 to the UE, differently from the first SR (regular SR).

TABLE 6

The scheduling request region can be used to transmit beam change request and beam refinement reference signal initiation request. The higher layer provide different combinations of band number, cyclic shift and parameter to the physical layer to transmit beam change request and beam refinement reference signal initiation request.
The physical layer uses these parameters, along with SFN, $N_{BRS}$, $N_{RACH}$, M, m and $S_{Sync}^{BestBeam}$, to calculate the symbol index 1 to transmit beam change request and beam refinement reference signal initiation request As such, the base station may provide the information related to the signal configuration for the second SR (special SR) to the UE through the RRC signaling. Further, the base station may transmit the second SR (special SR) to allow the UE to turn on and off a function of requesting the second BRS. The base station may provide the on/off indicator to the UE through the RRC signaling. Accordingly, when the second BRS request function is turned on, the base station needs to continuously monitor whether a special SR transmitted from the UE is received during an RACH subframe. When the second BRS request function is turned off, the base station need not to monitor whether the second SR (special SR) transmitted from the UE is received during an RACH subframe.

When receiving the second SR (special SR) from the UE in the state in which the second BRS request function is in the turn on state, the base station may schedule the second BRS (or BRRS) for the UE. However, since the second BRS scheduling is made only by the BS scheduler (hereinafter, scheduler), the base station may not schedule the second BRS depending on the implementation of the base scheduler even if the base station receives the second SR (special SR).

As another method of UE for requesting a second BRS, the UE may request the second BRS through the PUCCH or the PUSCH previously allocated.

Figure 35:
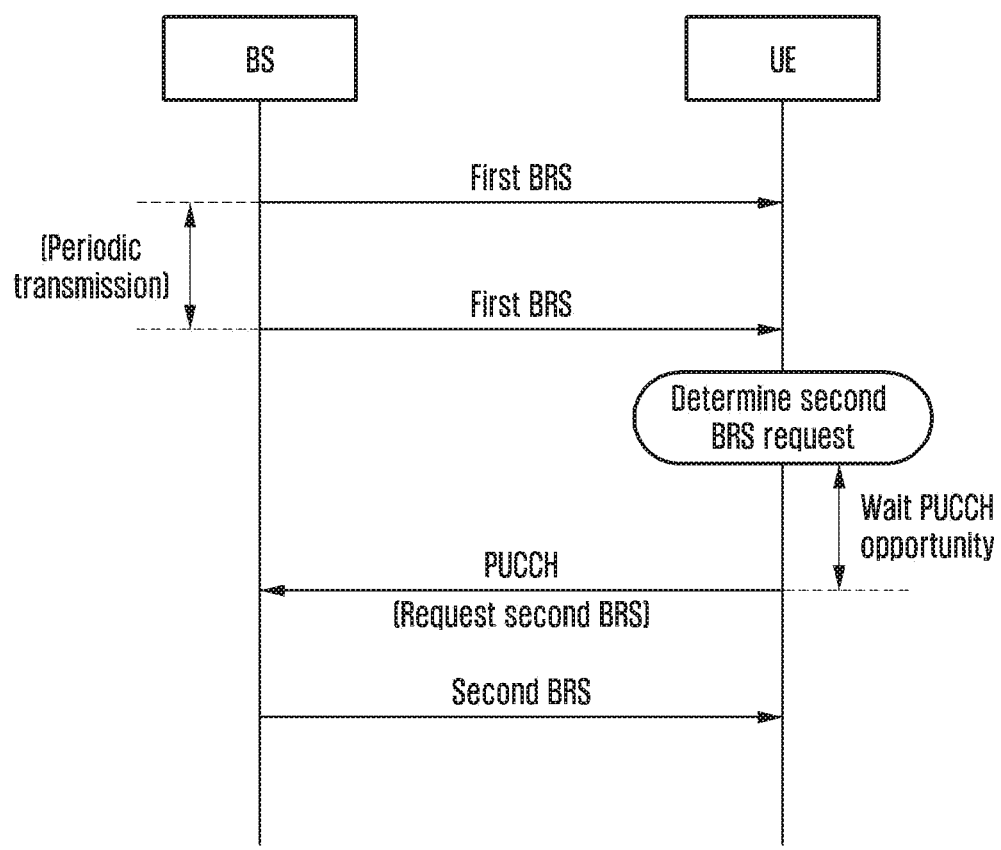
FIG. 35 is a diagram illustrating a method for requesting a second BRS according to an embodiment of the present disclosure.

FIG. 35 is a diagram illustrating a method for requesting a second BRS according to an embodiment of the present disclosure.

Referring to FIG. 35, when the UE decides to request the second BRS, the UE may transmit the signal requesting the BRS through the PUCCH or the PUSCH previously allocated. Even in the case, the UE may transmit the second BRS request information by using the UCI format shown in Table 1.

Figure 36A:
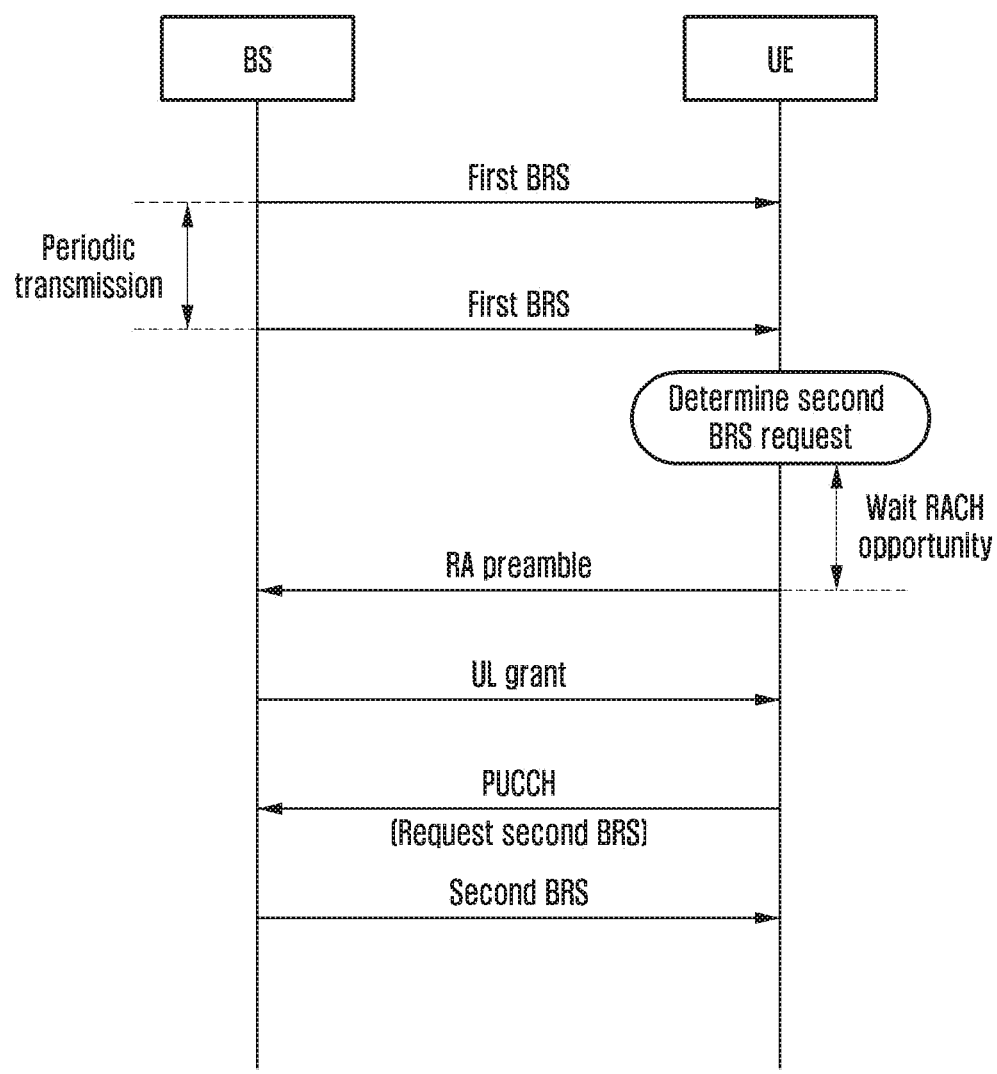
FIGS. 36A, 36B, and 36C are diagrams illustrating a method for requesting a second BRS according to an embodiment of the present disclosure.
Figure 36B:
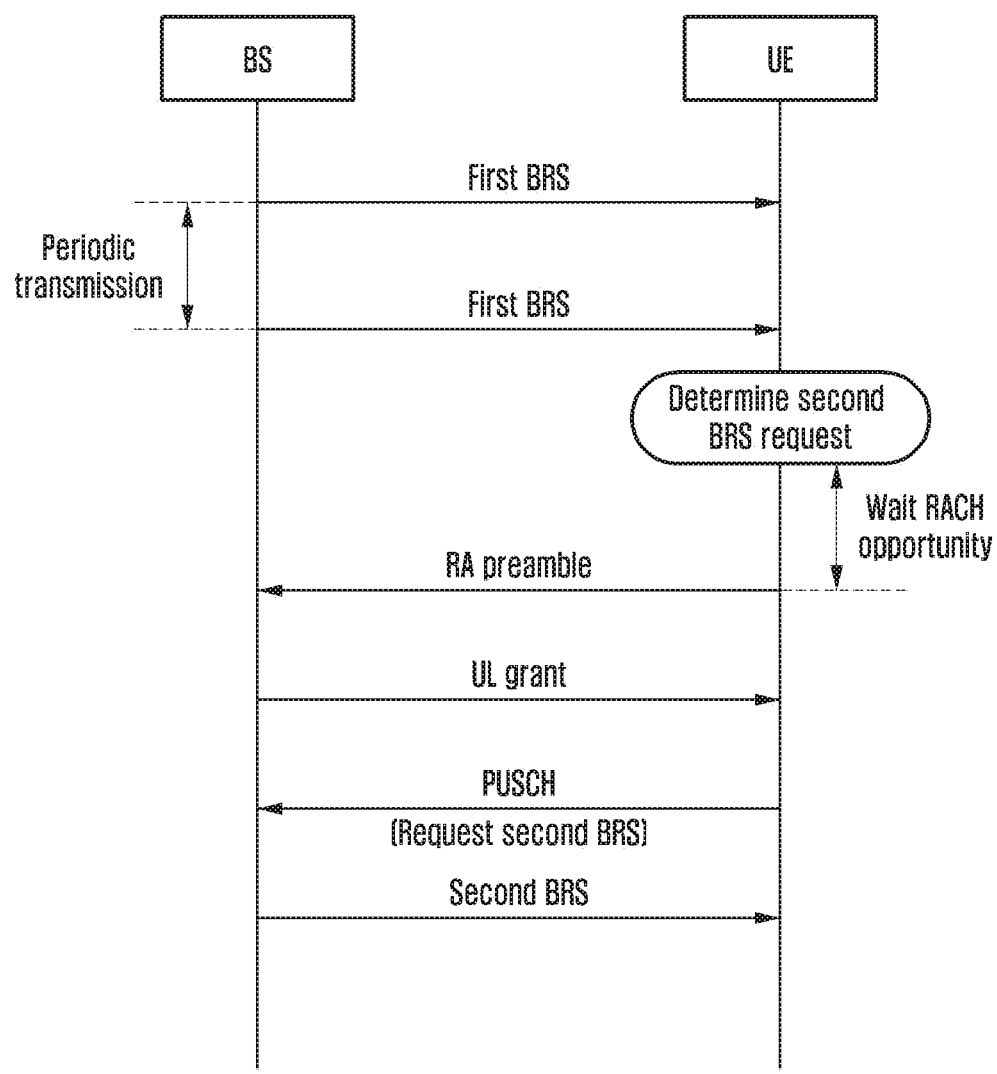
Figure 36C:
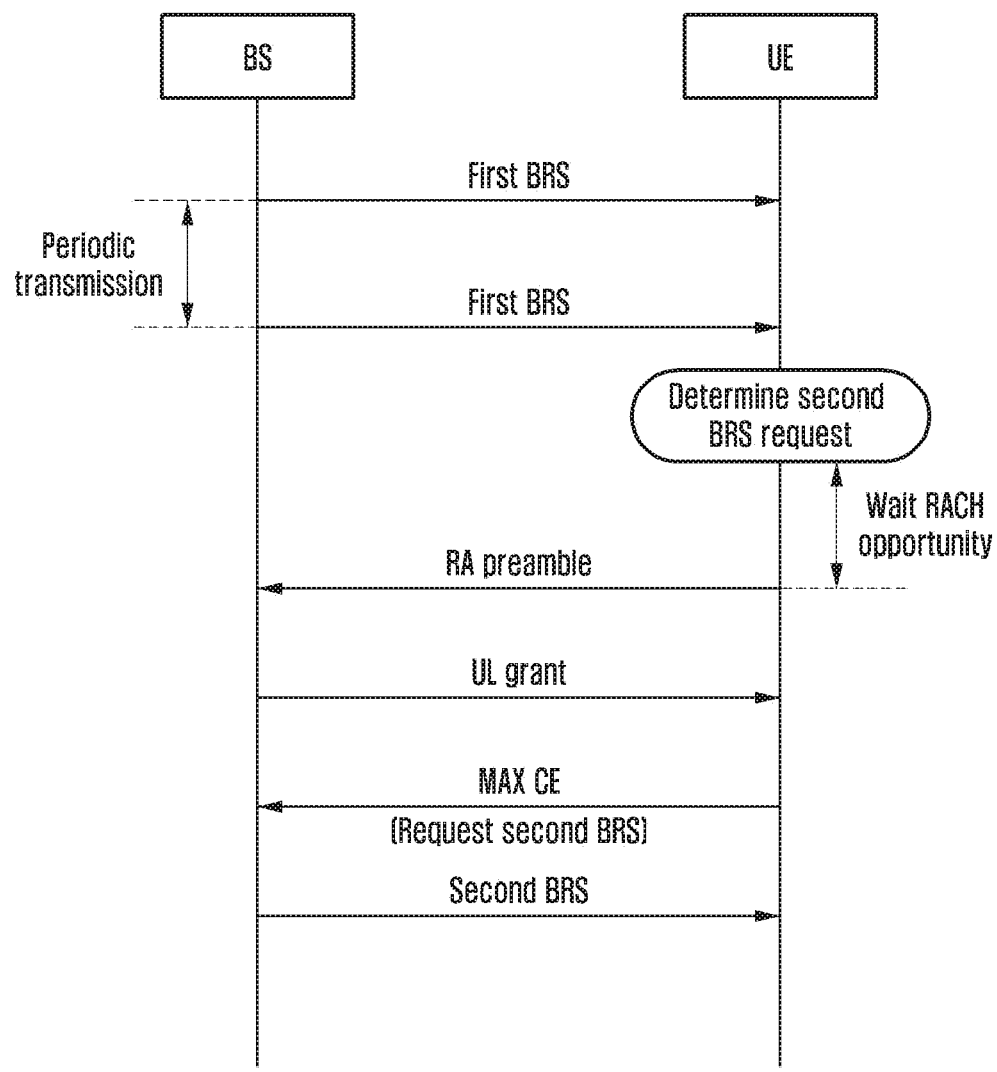

FIGS. 36A to 36C are diagrams illustrating a method for requesting a second BRS according to another embodiment of the present disclosure.

Referring to FIGS. 36A to 36C, when the UE decides to request the second BRS, the UE may transmit a random access (hereinafter, RA) preamble to the base station. To this end, the UE needs to wait RA resources set by the system.

The base station may receive the RA preamble transmitted by the UE through the serving beam or the non-serving beam. The base station may allocate the UL grant to the UE like the general UL scheduling procedure.

The UE allocated with the UL grant may request the second BRS to the base station through PUCCH, PUSCH, MAC CE, etc.

FIG. 36A corresponds to an operation that the UE transmits the signal for requesting the second BRS through PUCCH. When requesting the second BRS through PUCCH, the UCI format shown in Table 1 may be used.

FIG. 36B illustrates an operation that the UE transmits the signal for requesting the second BRS through PUSCH. Even in the case, the UE may transmit the second BRS request information by using the UCI format shown in the above Table 1.

FIG. 36C illustrates an operation of transmitting, by the UE, the signal for requesting the second BRS through MAC CE. The operation of transmitting, by UE, second BRS request information through MAC CE is the same as those described above and therefore will not be described below.

The RA preamble for requesting the second BRS may be separately defined. This may be called the RA preamble for the second BRS request or the special RA preamble.

Figure 37:
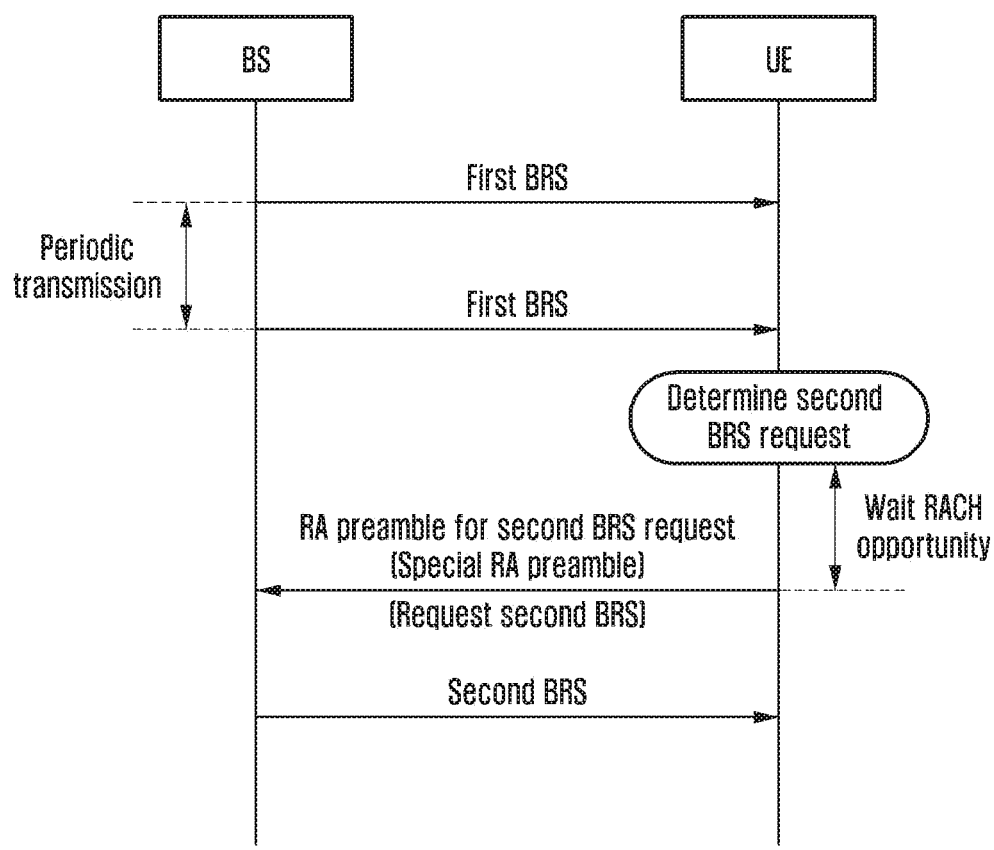
FIG. 37 is a diagram illustrating a method for requesting a second BRS according to an embodiment of the present disclosure.

FIG. 37 is a diagram illustrating a method for requesting a second BRS according to an embodiment of the present disclosure.

Referring to FIG. 37, when the UE decides to request the second BRS, the UE may request a special RA preamble to the base station, that is, request the UL resource allocation to the base station or transmit a different kind of RA preambles from the regular RA preamble used when an initial access, timing advance, etc. are performed. In the case of using preambles different from the RA preamble when the initial access, the timing advance, etc. are performed, in the present disclosure, the RA preamble used when the initial access, the timing advance, etc. are performed may be called a first RA preamble and the preamble for requesting the second BRS may be called a second RA preamble.

To this end, the base station sets some of the available RA preambles as the second RA preamble (special RA preamble), and the first RA preamble (regular RA preamble) is transmitted when the UE requests UL resource allocation to the base station or when the UE performs initial access, timing advance, etc., and the second RA preamble (special RA preamble) is transmitted when the UE requests the second BRS scheduling to the base station. When receiving the second RA preamble (special RA preamble) from the UE, the base station may transmit the second BRS to the UE.

As described above, the present disclosure suggests various methods for requesting, by the UE, a second BRS (special BRS or BRRS) (that is, an UCI, an MAC CE, a second SR (special SR), or the like transmitted through a PUCCH or a PUSCH). Such methods may be independently applied one by one, or multiple methods may be simultaneously applied, or one method among multiple methods may be applied depending on a predetermined priority or condition.

Figure 38:
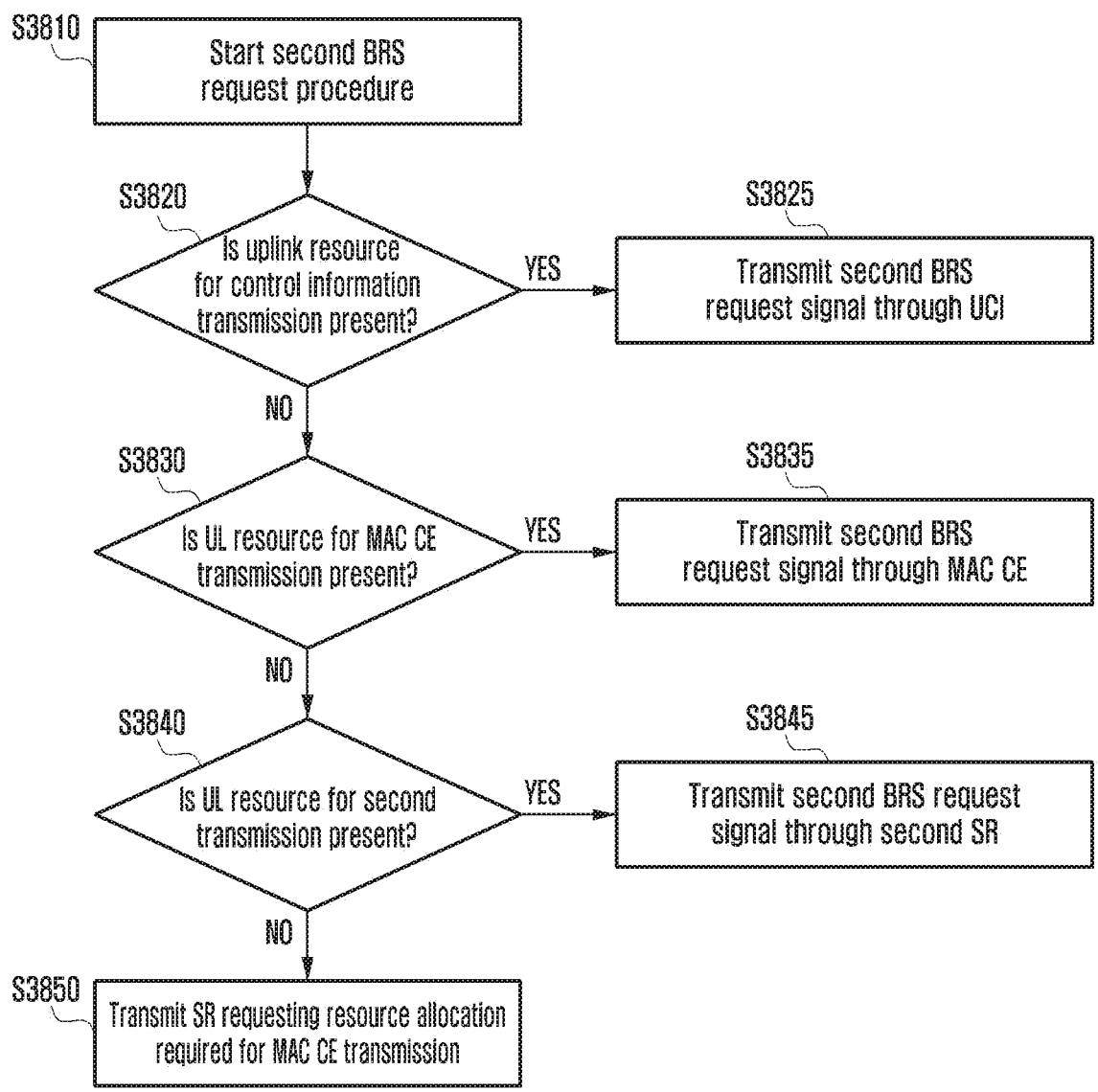
FIG. 38 is a diagram illustrating a process of requesting a second BRS according to an embodiment of the present disclosure.

FIG. 38 shows a process of requesting, by UE, a second BRS (special BRS or BRRS) through one method among various methods depending on a predetermined priority and condition.

FIG. 38 is a diagram illustrating a process of requesting a second BRS according to an embodiment of the present disclosure.

Referring to FIG. 38, in operation S3810, the procedure of requesting a second BRS (special BRS or BRRS) may be triggered. As described above, when the specific condition is satisfied, the second BRS request procedure may start.

When the second BRS request procedure is triggered, in operation S3820, the UE may confirm whether there is the uplink resource for transmitting the control information. At this point, the control information may include the UCI. The UE may confirm whether there is the UL resource for UCI transmission at the present time (TTI).

If the UL resource required for the UCI transmission is present, then in operation S3825, the UE may transmit the second BRS (special BRS or BRRS) request signal through the UCI. As described above, the UE may transmit the control information requesting the second BRS using the resources such as the PUCCH and the PUSCH.

On the other hand, if the UL resource required for UCI transmission, in S3830 is not present, the UE determines whether the UL resource for MAC CE transmission exists in the present time.

If the UL resource required for the MAC CE transmission is present, then in operation S3835, the UE may transmit the second BRS (special BRS or BRRS) request signal through the MAC CE.

If the UL resource required for the MAC CE is not present, then in operation S3840, the UE may confirm whether there is the UL resource for the second SR (special SR) transmission at the present time.

If the UL resource for the second SR (special SR) transmission is present, then in operation S3845, the UE may transmit the second BRS (special BRS or BRRS) request signal through the second SR (special SR).

On the other hand, if the UL resource for the second SR transmission is not present, then in operation S3850, the UE may transmit the SR requesting the resource allocation required for the MAC CE transmission. In operation S3850, the UE may also request the resource allocation required for the UCI transmission.

The foregoing operation may be shown as the following Table 7.

TABLE 7

<Beam Adjustment Request>

The Beam Adjustment Request (BAR) is used to request a serving 5G Node-B to transmit BRRS (Beam Refinement Reference Signal). A UE measures the BRRS in the scheduled subframe to determine the best beam pair between itself and the serving 5G Node-B. 5G-RRC controls the BAR by configuring the timer prohibitBAR-Timer, which limits the interval between two consecutive BARs, and the parameters rsrpServBeam, rsrpChangeServBeam, rsrpNeighBeam, rsrpChangeNeighBeam, and numConsNACK, which can be used to trigger a BAR.
NOTE: In 5G RAN, in addition to the parameters listed above, a UE can trigger a BAR based on other UE implementation specific conditions.
A BAR shall be triggered if prohibitBAR-Timer is not running and when any of the following conditions are met.
if the RSRP of the latest BRS measurement using the current best beam pair is less than rsrpServBeam dBm and the RSRP of the latest BRS measurement using the current best beam pair is lower by rsrpChangeServBeam dBm compared to the RSRP of the previous BRS measurement using the current beam pair
if the RSRP of the latest BRS measurement using any beam pair except the current best beam pair is more than rsrpNeighBeam dBm and
the RSRP of the latest BRS measurement using any beam pair except the current best beam pair is increased by more than rsrpChangeNeighBeam dBm compared to the RSRP of the previous BRS measurement using that beam pair
if numConsNACK HARQ NACKs are transmitted/received for DL/UL data of the UE
If the BAR procedure determines that a BAR has been triggered and not cancelled
if the 5G-MAC entity has UL resources allocated for UCI transmission that can convey a BRRS request indicator for this TTI
instruct the physical layer to signal a BRRS request indicator in the UCI on PUCCH or PUSCH
start or restart the prohibitBAR-Timer
cancel the triggered BAR
NOTE: The UCI format and procedure related to the BRRS request indicator are described in 5G.212 and 5G.213.
else if the 5G-MAC entity has UL resources allocated for new transmission for this TTI
instruct the Multiplexing and Assembly procedure to generate and transmit a BAR MAC control element as defined in 6.1.3.8

TABLE 7-continued

<Beam Adjustment Request> start or restart the prohibitBAR-Timer
cancel the triggered BAR
else if the 5G-MAC entity has UL resources allocated for
SR transmission (i.e., a RACH subframe) for this TTI and
the UE is configured to have a special SR that can be
interpreted by the serving 5G Node-B as a BRRS request
indicator
instruct the physical layer to signal the special SR
start or restart the prohibitBAR-Timer
cancel the triggered BAR
else
a SR shall be triggered to transmit a BAR MAC control
element FIG. 38 and the content of the above Table 7 show an example in which when transmitting the second BRS (special BRS or BRSS) request signal, the UE selects a transmission method in an order of the UCI, the MAC CE, and the second SR (special SR) transmitted through PUCCH or PUSCH. This is merely an example; a transmission method in the other order or arbitrary order may also be selected. An example thereof is as follows.

Example 1: UCI→MAC CE→special SR

Example 2: UCI→special SR→MAC CE

Example 3: Special SR→UCI→MAC CE

Example 4: Special SR→MAC CE→UCI

Example 5: MAC CE→UCI→Special SR

Example 6: MAC CE→Special SR→UCI

Accordingly, the order of operations S3820 to S3845 of FIG. 38 may be changed depending on the preset order or priority.

As described above, in addition to the UCI, the MAC CE, and the second SR (special SR), the second BRS may be requested using the first RA preamble, the second RA preamble, or the like. When another method may be additionally used to request the second BRS, like the above Examples 1 to 6, the transmission method may be determined depending on the preset priority.

To support the operation as described above, the base station may provide the information as illustrated in the following Table 8 to the UE.

A second BRS request prohibit timer (prohibitBAR-Timer) is a parameter for preventing the phenomenon that the UE continuously performs the second BRS request to the base station. The timer may mean an apparatus for allowing UE performing a second BRS request not to again perform a second BRS request during the second BRS request prohibit timer (prohibitBAR-Timer).

The parameters rsrpServBeam, rsrpChangeServBeam, rsrpNeighBeam, rsrpChangeNeighBeam, and numConsNACK are parameters that the UE may use as the condition of triggering the second BRS request. The rsrpServBeam means the RSRP of the serving base station and the rsrpChangeServBeam means a variation of the RSRP of the serving base station. The rsrpNeighBeam means the RSRP of neighbor base stations, the rsrpChangeNeighBeam means a variation of the RSRP of neighbor base stations, and the numConsNACK means the number of continuous NACKs received by the UE from the base station or generated by the UE itself.

TABLE 8

MAC-MainConfig (MAC)
The IE MAC-MainConfig is used to specify the MAC main configuration for
signalling and data radio bearers. All MAC main configuration parameters can be
configured independently per Cell Group (i.e. MCG or SCG), unless explicitly
specified otherwise.

MAC-MainConfig information element

```
-- ASN1START
MAC-MainConfig ::=              SEQUENCE {
    ul-SCH-Config               SEQUENCE {
        maxHARQ-Tx              ENUMERATED {
                                n1, n2, n3, n4, n5, n6, n7, n8,
                                n10, n12, n16, n20, n24, n28,
                                spare2, spare1}     OPTIONAL, -
- Need ON
        periodicBSR-Timer       PeriodicBSR-Timer-r12
    OPTIONAL, -- Need ON
        retxrBSR-Timer          RetxBSR-Timer-r12,
    }
    OPTIONAL, -- Need ON
    drx-Config                  DRX-Config
    OPTIONAL, -- Need ON
    timeAlignmentTimerDedicated TimeAlignmentTimer,
    phr-Config                  CHOICE {
        release                 NULL,
        setup                   SEQUENCE {
            periodicPHR-Timer       ENUMERATED {sf10, sf20,
sf50, sf100, sf200,
                                        sf500, sf1000, infinity},
            prohibitPHR-Timer       ENUMERATED {sf0, sf10, sf20,
sf50, sf100,
                                        sf200, sf500, sf1000},
            dl-PathlossChange       ENUMERATED {dB1, dB3, dB6,
infinity}
        }
    }                                   OPTIONAL, --
Need ON
    bar-Config                  CHOICE {
        release                 NULL,
```

TABLE 8-continued

MAC-MainConfig (MAC)
The IE MAC-MainConfig is used to specify the MAC main configuration for
signalling and data radio bearers. All MAC main configuration parameters can be
configured independently per Cell Group (i.e. MCG or SCG), unless explicitly
specified otherwise.

```
    setup                      SEQUENCE {
        prohibitBAR-Timer          ENUMERATED {sf0, sf10, sf20,
sf40, sf80,
                                    sf160, sf320, sf640}
        rsrpServBeam
        rsrpChangeServBeam
        rsrpNeighBeam
        rsrpChangeNeighBeam
        numConsNACK
    }
    }                                             OPTIONAL, --
Need ON
    ...,
    [[ sr-ProhibitTimer-r9        INTEGER (0..7)        OPTIONAL
-- Need ON
    ]],
                                   OPTIONAL, -- Need ON
```

MAC-MainConfig field descriptions prohibitPHR-Timer

Timer for PHR reporting in TS 36.321 [6]. Value in number of sub-frames.
Value sf0 corresponds to 0 subframes, sf100 corresponds to 100 subframes and so on.
prohibitBAR-Timer Timer for BAR reporting in TS 5G.321 [6]. Value in number of sub-frames.
Value sf0 corresponds to 0 subframes, sf640 corresponds to 640 subframes and so on.
rsrpServBeam Parameter (i.e., RSRP of the serving cell) for BAR reporting in TS 5G.321 [6].
Value in unit of dBm.
rsrpChangeServBeam Parameter (i.e., the variation of the RSRP of the serving cell) for BAR reporting
in TS 5G.321 [6]. Value in unit of dB.
rsrpNeighBeam Parameter (i.e., RSRP of the neighbour cell) for BAR reporting in TS 5G.321
[6]. Value in unit of dBm.
rsrpChangeNeighBeam Parameter (i.e., the variation of the RSRP of the neighbour cell) for BAR
reporting in TS 5G.321 [6]. Value in unit of dB.
numConsNACK Parameter (i.e., the number of consecutive NACKs for DL or UL data) for BAR
reporting in TS 5G.321 [6]. Value in number of NACKs.
retxBSR-Timer Timer for BSR reporting in TS 36.321 [6]. Value in number of sub-frames.
Value sf640 corresponds to 640 sub-frames, sf1280 corresponds to 1280 sub-
frames and so on.

The content proposed in the present disclosure corresponds to bar-Config. The bar-Config includes parameter used when the UE requests the BRRS to the base station. Here, prohibitBAR-timer indicates that the UE does not perform the same request for some time when requesting the BRRS to the base station once. That is, it may be considered that the minimum time between two continued BRRS requests is set. Next, rsrpServBeam and rsrpNeighBeam indicates the signal strength for the serving beam that the UE currently uses and signal strength for newly found neighbor beams. Further, rsrpChangeServBeam and rsrpChangeNeighBeam indicates a variation for the signal strength for the serving beam that the UE currently uses and a variation for signal strength for newly found neighbor beams. numConsNACK is the number of NACKs for downlink and uplink data continuously transmitted and received by the UE and the continued NACK generated by numConsNACK indicates that the UE requests the BRRS to the base station.

A method for preventing an overhead due to SR resource waste is described below.

As described above, when the reception beam of the UE having the best signal strength is changed due to the change in the direction of the UE, or the like, the UE may request the second BRS to set the reception beam of the UE again. To this end, the UE may request the resource for transmitting the second BRS request using the SR, or the like.

On the other hand, when the transmission beam of the base station is changed, the UE may measure the reference signal to determine the transmission beam having the best signal strength again. However, the UE needs to feed back the determined transmission beam to the base station to enable the base station to transmit and receive data through a new transmission beam. Therefore, the UE needs to request the resource allocation for reporting the measurement result including the information of the transmission beam to the base station.

However, resource waste may occur when the SR for requesting the second BRS and a separate SR for the feedback resource are used.

Accordingly, the present disclosure suggests an operation that the base station allocates one dedicated SR resource (preamble, etc.) to the UE so that the UE requests resource allocation required for beam feedback or requests the second BRS (BRRS) transmission to the base station. The dedicated SR may use the same SR as the second SR (special SR) described above. To this end, the UE and the base station are operated as follows.

The base station may allocate one dedicated SR resource to the UE. This is performed through the RRC signaling. The example of the RRC signaling used herein is as the following Table 9. If the UE forms the RRC connection with the base station, the UE may be allocated the dedicated SR resource by receiving information element.

TABLE 9

| In the PRACH-Config | | |
|---|---|---|
| PRACH-SpecialSrConfigInfo ::= | | SEQUENCE { |
| prach-uRoot | | INTEGER (1..70), |
| SpecialSryclicShiftV | INTEGER (0..11), | |
| rachBandIndex | | INTEGER (0..7), |
| timeDomainOcsIndexf' | | INTEGER (0..1), |
| additionalRachSubframesM | | BOOLEAN |
| preambleConfigIndex | | INTEGER (0,1) |
| } | | |

The above Table 9 shows parameters associated with the PRACH configuration. It includes prach-uRoot, SpecialSryclicShiftV, rachBandIndex, timeDomainOcsIndexf, additionalRachSubframesM, or the like. The present uses the parameters, but does not propse the parameters.

Figure 39:
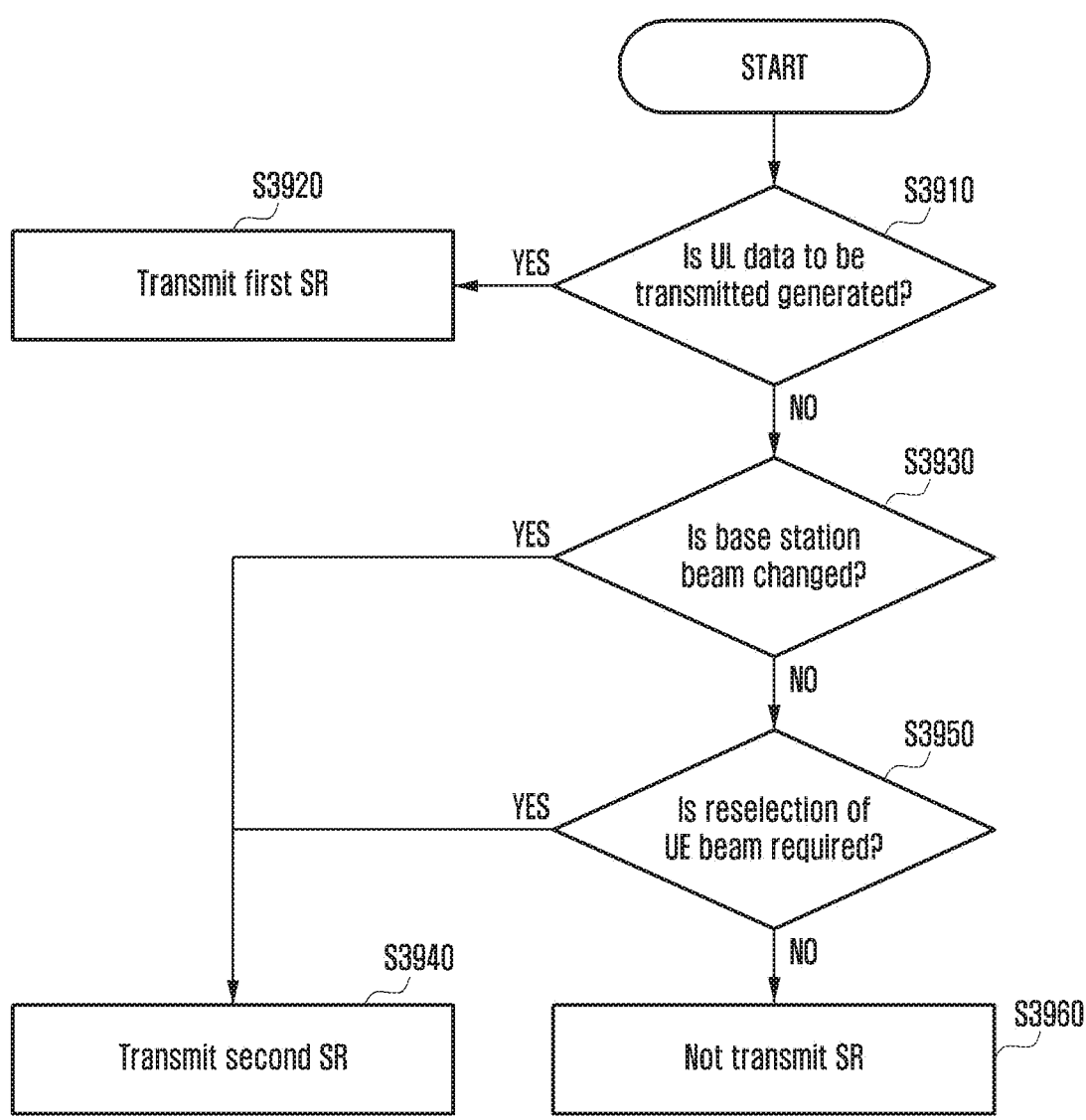
FIG. 39 is a diagram illustrating a method for reducing, by UE, a scheduling request (SR) resource according to an embodiment of the present disclosure.

FIG. 39 is a diagram illustrating a method for reducing, by UE, an SR resource according to an embodiment of the present disclosure.

Referring to FIG. 39, in operation S3910, the UE may determine whether the UL data to be transmitted is generated.

In operation S3920, if the UL data to be transmitted is generated, then the UE may transmit the first SR (normal SR) to the base station. The UE transmits the first SR to request the PUSCH resource allocation and thus may be allocated the PUSCH resource to transmit the uplink data.

In operation S3930, the UE may confirm whether the base station's beam is changed.

If it determined that the base station's beam is changed, then in operation S3940, the UE may transmit the second SR. The second SR does not mean the scheduling request (normal SR) for transmitting the uplink data as described above but may mean a separate scheduling request (special SR), that is, the dedicated SR allocated from the base station as shown in the above Table 9.

When the following conditions are satisfied, the UE may determine that the base station's beam is changed to transmit the second SR to the base station.

As a result of measuring the first BRS or the second BRS of the UE, when the signal strength or quality of the serving beam of the current serving base station is a threshold or less, and/or As a result of measuring the first BRS or the second BRS of the UE, when the signal strength or quality of the serving beam of the current serving base station is a value or less where the beam feedback is impossible, and/or As a result of measuring the first BRS or the second BRS of the UE, when the signal strength or quality of other beams other than the serving beam of the current serving base station is a threshold or less, and/or As a result of measuring the first BRS or the second BRS of the UE, when the signal strength or quality of other beams other than the serving beam of the current serving base station is improved to a level enough to implement the beam feedback, and/or As a result of measuring the first BRS or the second BRS of the UE, when the signal strength or quality of other beams other than the serving beam of the current serving base station is greater by the offset value than that of the serving beam When at least one of the conditions is satisfied, the UE may transmit the second SR (special SR) at the SR preamble reception timing of other beams satisfying the above conditions other than the serving beam of the serving base station. Generally, in the beamforming system, the base station may receive a signal of the UE by a specific beam at each timing. It may be regarded that when and by which beam the base station receives the signal of the UE are informed by the base station to the UE in advance, or are already standardized.

In operation S3950, when the base station's beam is not changed, the UE may confirm whether the reselection of the UE's beam (beam refinement) is required. The UE may determine whether there is a beam having better signal strength than the serving beam to determine whether the UE's beam needs to be changed.

If it is determined that the beam needs to be changed, then in operation S3940, the UE may transmit the second SR.

When the following conditions are satisfied, the UE determines that the UE's beam is changed and may transmit the second SR (special SR) other than the first SR (normal SR) to the base station.

As a result of measuring the first BRS or the second BRS by a serving beam of the UE, when RSRP or RSRQ of a serving beam of a current serving base station is a threshold value or less, and/or As a result of measuring the BRS or the BRRS by a beam other than the serving beam of the UE, when RSRP of a serving beam of a current serving base station is a threshold value or greater, and/or When N or more beams better than the current serving beam of the UE are found, and/or When the second BRS or second BRS request condition described above is satisfied, and/or When the UE needs to change the serving beam of the UE to a new beam by detecting rotation through a sensor, or the like.

When at least one of the above conditions is satisfied, the UE may transmit the second SR at the SR reception timing of the serving beam of the serving base station.

When there is no need to change the UE's beam, then in operation S3960, the UE may not transmit the SR.

The determination order of the flow chart of the present drawing is only an example of the method proposed by the present disclosure. That is, the order of determining the conditions for the SR transmission proposed in the present drawing may be changed. For example, the process of determining whether the base station's beam is changed and the order of determining whether the UE's beam needs to be changed may be changed.

Further, operations S3910, S3930, and S3950 of FIG. 39 may be independently performed and any one of the operations may also be omitted. When the UL data transmission is required and the base station's beam is changed, the first SR and the second SR may be simultaneously transmitted and a method for determining whether the base station's beam is changed without determining whether there is a need to transmit the UL data may also be used.

Figure 40:
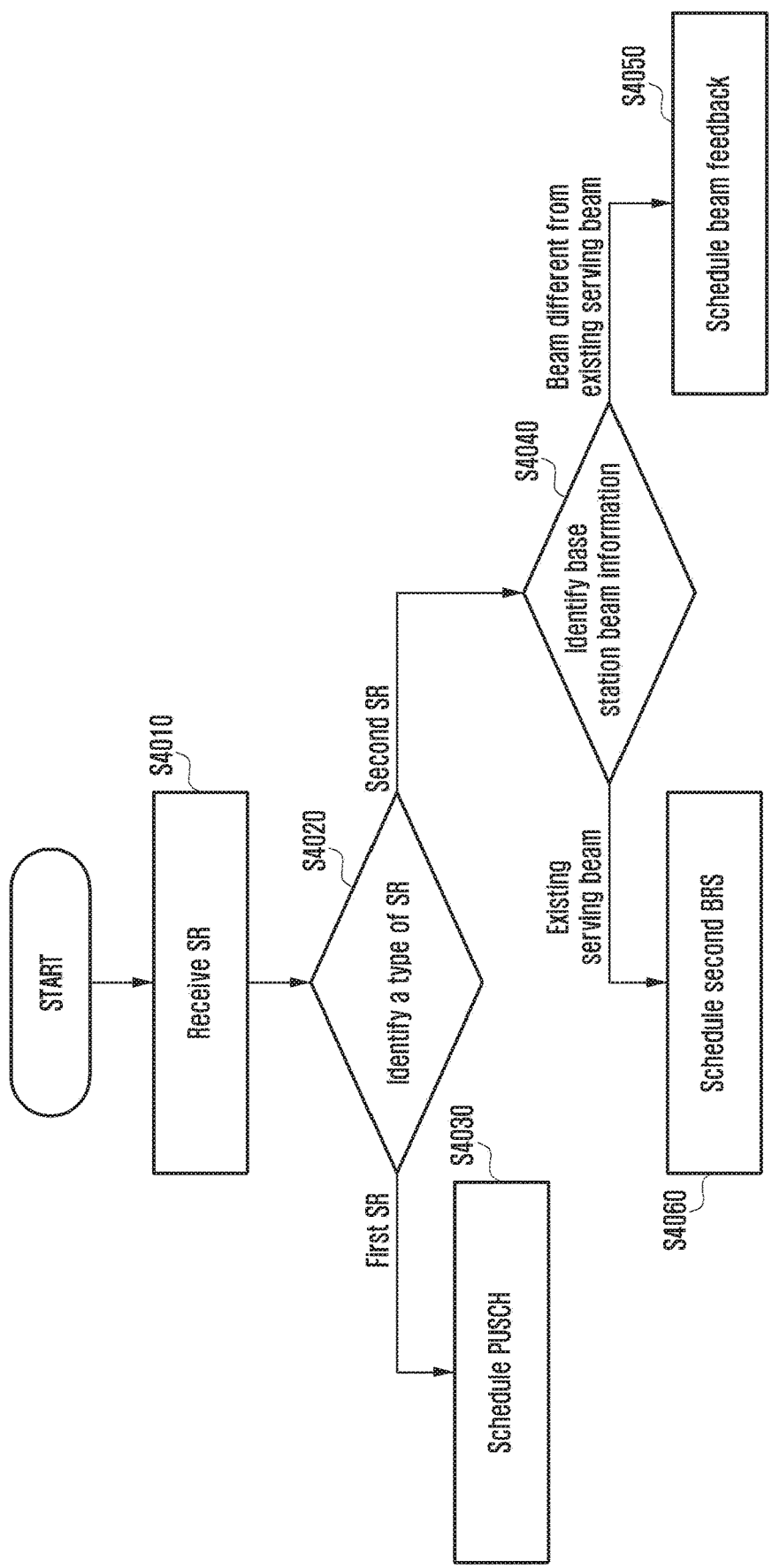
FIG. 40 is a diagram illustrating a method for reducing, by a base station, an SR resource according to an embodiment of the present disclosure.

FIG. 40 is a diagram illustrating a method for reducing, by a base station, an SR resource according to an embodiment of the present disclosure.

Referring to FIG. 40, in operation S4010, the base station may receive the SR. Further, in operation S4020, the base station may identify a type of SR.

In the case of the first SR requesting the resource allocation for transmitting the uplink data, in operation S4030, the base station may perform the PUSCH scheduling. The base station may allocate the resource for transmitting the uplink data.

On the other hand, when the base station receives the second SR from the UE, then in operation S4040, the base station identifies the UE transmitting the second SR and the base station beam information receiving the second SR.

If the base station receives the second SR allocated to the specific UE by other beam of the base station, not a current serving beam of the base station of the corresponding UE, then in operation S4050, the base station may allocate the resources for beam feedback to the UE. That is, the base station may scheduling the beam feedback.

The reason is that when the second SR is received through other beams other than the serving beam, the base station's beam having the best signal strength or quality measured by the current UE is other beams other than the current serving base station beam. Accordingly, the base station needs to update information on what signal has better strength or quality and how the signal strength is and therefore needs to receive the feedback therefor. Therefore, the base station may allocate the resource for the beam feedback.

The beam feedback may be beam feedback according to the first BRS measurement result, or the beam feedback according to the second BRS measurement result.

If the base station receives the second SR allocated to a specific UE by the current serving beam of the base station of the corresponding UE, then in operation S4060, the base station performs a procedure for transmitting the second BRS to the UE. That is, the base station may allocate the resource for transmitting the second BRS and transmit the second BRS.

The reason is that the case of receiving the second SR from the UE means that the base station's beam or the UE's beam is changed and the case of receiving the SR through the serving beam of the base station means that the best beam of the base station having the best signal strength or quality measured by the current UE is the current serving base station beam but the best beam of the UE is not the current serving UE beam.

It may be determined that the second BRS is a signal for the purpose of refinement while quickly sweeping the UE's beam and the second SR is received to request the second BRS. Therefore, the base station transmits the second BRS to the corresponding UE to provide an opportunity to update the best beam of the UE.

To transmit the second BRS, the base station may transmit the scheduling information on the region to which the second BRS is to be transmitted to the base station.

The present disclosure considers a situation in which the base station transmits the second BRS to the UE by the request of the UE. As described above, the second BRS may be transmitted through the beam having a beam width having the same as or different from the beam transmitting the first BRS (regular BRS).

Figure 41A:
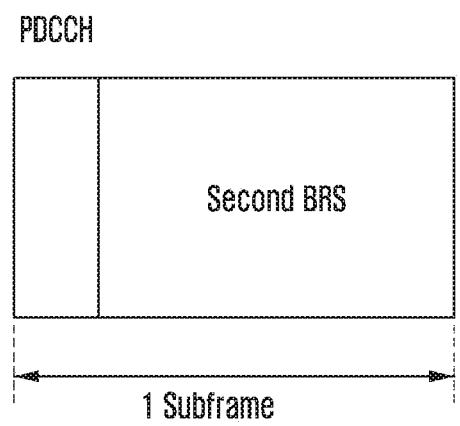
FIGS. 41A, 41B, and 41C are diagrams illustrating a location of a symbol where a second BRS is transmitted according to an embodiment of the present disclosure.
Figure 41B:
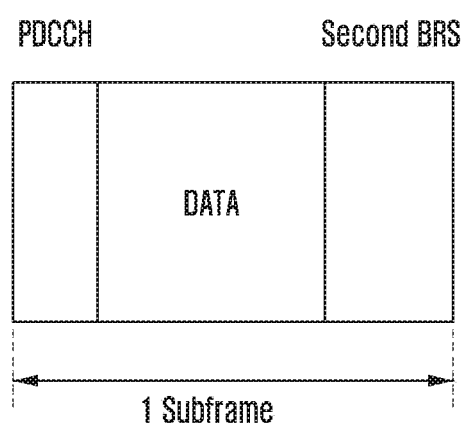
Figure 41C:
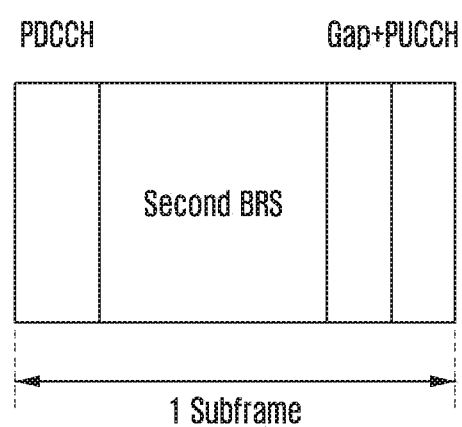

FIGS. 41A to 41C are diagrams illustrating a location of a symbol where the second BRS is transmitted according to an embodiment of the present disclosure.

Referring to FIG. 41A, the second BRS may be transmitted at all symbols other than the physical downlink control channel (PDCCH) within one subframe.

Referring to FIG. 41B, the second BRS may be transmitted at all symbols other than a region allocated to transmit the PDCCH and data within one subframe.

Referring to FIG. 41C, the second BRS may be transmitted at all symbols other than the PDCCH, a gap between DL and UL, and the PUCCH within one subframe.

Other settings may also be applied in addition to the three settings described in FIGS. 41A to 41C.

Figure 42A:
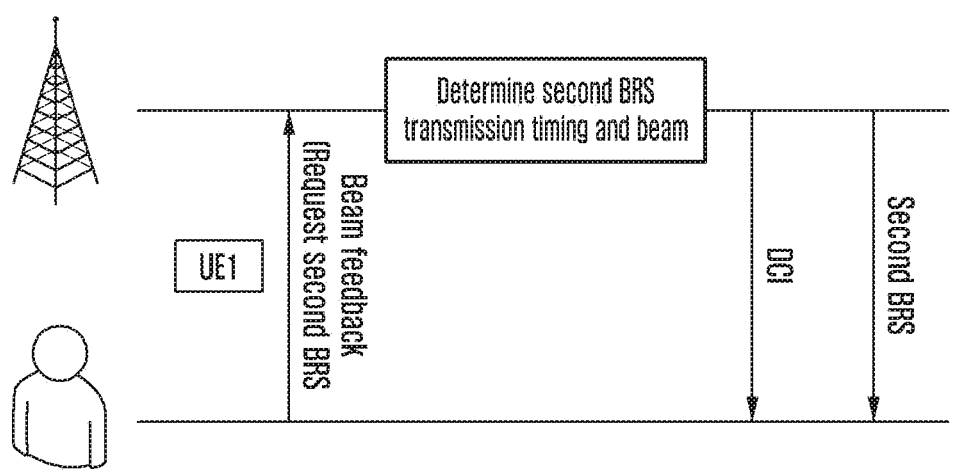
FIGS. 42A and 42B are diagrams illustrating a method for transmitting scheduling information for transmitting a second BRS that a base station transmits to UE according to an embodiment of the present disclosure.
Figure 42B:
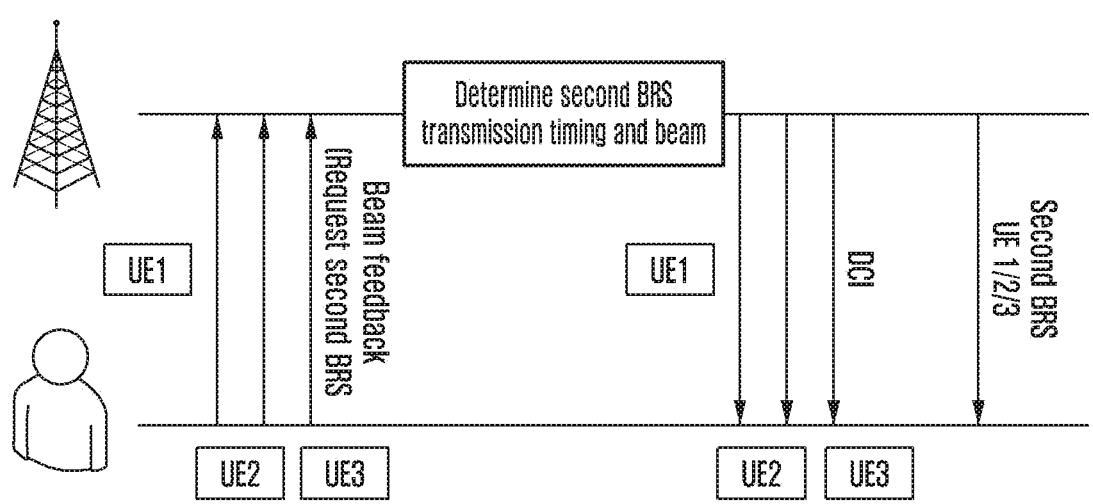

FIGS. 42A and 42B are diagrams illustrating a method for transmitting scheduling information for transmitting a second BRS that a base station transmits to UE according to an embodiment of the present disclosure.

Referring to FIG. 42A, the base station may receive the second BRS transmission request from the UE.

When receiving the second BRS transmission request, the base station may schedule the second BRS for the UE using the three settings described in FIGS. 41A to 41C or other settings. That is, the base station may determine timing and a beam for transmitting the second BRS.

The base station may transmit the DCI for scheduling the second BRS to one or a plurality of UEs receiving the second BRS through the PDCCH. The DCI may include the setting information on the second BRS, the information on the transmission timing of the second BRS, or the like.

The UE successfully receiving the DCI through the PDCCH may confirm when the base station transmits the second BRS at a certain resource.

If the base station transmits the second BRS, the UE may receive the second BRS on the basis of the corresponding information.

The UE may integrate the second BRS measurement result and the first BRS measurement result to select the beam pair and then feedback the selected beam pair to the base station.

Referring to FIG. 42B, the base station may receive the second BRS request from a plurality of UEs and may also transmit the second BRS to the plurality of UEs.

As illustrated in FIGS. 42A and 42B, if the UE requests the second BRS transmission to the base station, the base station may determine the beam and the transmission timing for transmitting the second BRS, the second BRS setting within the subframe, or the like. If the second BRS is to cope with a situation in which although the beam of the base station is not changed, but the beam of the UE is changed due to frequent movement and rotation of the UE, it is preferable for the base station to transmit the second beam BRS through the best beam of the base station currently known by the UE. The second BRS is transmitted through the beam of the base station included in beam feedback that is most recently performed by the UE. If the base station has a plurality of array antennas, the base station may transmit the second BRS by different beams as many as the number of array antennas. If the UE feeds back a measurement result for a plurality of beams of the base station to the base station, the base station selects beams as many as the number of array antennas to help the second BRS transmission to the UE. To this end, the UE informs the base station of the best n beams of the base station based on a RRM measurement result through an RRC message, and the base station selects the beam of the base station by which the second BRS is to be transmitted to the UE based on thereon. The present disclosure describes that the signal for requesting, by the UE, the second BRS (or BRRS) transmission to the base station may be the SR, the RACH, the PUCCH, the PUSCH, the MAC CE, etc. The detailed content thereof is the same as those described above and therefore will be omitted below.

Figure 43:
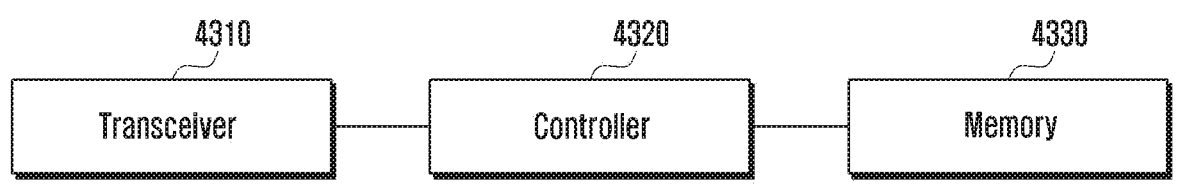
FIG. 43 is a diagram illustrating a configuration of a UE according to an embodiment of the present disclosure.

FIG. 43 is a diagram illustrating a configuration of the UE according to an embodiment of the present disclosure.

Referring to FIG. 43, the UE may be configured to include a transceiver 4310, a controller (e.g., at least one processor) 4320, and a memory 4330. For example, when defining a controller in the specification, it may be stated that "the controller may be a circuit, an application-specific integrated circuit or at least one processor.

The transceiver 4310 may transmit and receive a signal. The transceiver 4310 may receive the first BRS from the base station, transmit the SR for the second BRS, and receive the second BRS. The transceiver 4310 may report the beam measurement information.

The controller 4320 may be used to control the operation of the UE described in the present disclosure.

The controller 4320 may receive the first BRS. The controller 4320 may request the second BRS when the specific condition is satisfied as the measurement result. The specific condition may mean the case in which the direction of the UE's beam or the base station's beam is changed. The detailed content of the specific condition is the same as those described above and therefore will be omitted below.

The controller 4320 may confirm whether the resource for requesting the second BRS is present. The controller 4320 may confirm whether the the UL resource for the UCI transmission is present, whether the UL resource for the MAC CE transmission is present, and whether the UL resource for the second SR transmission is present, respectively.

When the resource is present, the controller 4320 may request the second BRS using the corresponding resource.

However, when there is no resource, the controller 4320 may transmit the SR to the base station to be allocated the resource for requesting the second BRS. The controller 4320 may transmit the SR used to request the uplink resource allocation to be allocated the resource and request the second BRS using the resource. The controller 4320 may transmit the UCI through the PUCCH or the PUSCH to request the second BRS transmission or may request the second BRS transmission through the MAC CE.

The controller 4320 may receive the second BRS by transmitting the SR for a separately set second BRS transmission request other than the SR for requesting the uplink resource allocation.

The controller 4320 may receive the second BRS by transmitting the signal in the predetermined resource.

The controller 4320 may be allocated the uplink resource using the RA preamble used to perform the initial access or the timing advance and request the second BRS using the resource.

The controller 4320 may receive the second BRS by transmitting the RA preamble for requesting the second BRS. The detailed content is the same as those described above and therefore will be omitted below.

The controller 4320 may request the second BRS transmission through the allocated resource depending on the SR, transmit the separate signal (second SR) for requesting the second BRS transmission, or the like and then may receive the second BRS.

The controller 4320 may receive the second BRS and measure the signal strength or quality, or the like to generate the beam measurement result and report the generated beam measurement result to the base station. The controller 4320 may determine a pair of the base station's beam having the signal strength or quality and the UE's beam and report the information on the base station's beam to the base station.

Therefore, the base station may transmit and receive data to and from the UE using the corresponding beam.

The first BRS and the second BRS may be transmitted through the first beam and the second beam and the controller 4420 may determine the beam pair using the first BRS and the second BRS. The detailed content is the same as those described above and therefore will be omitted below.

In addition, the controller 4320 may control all the operations of the UE described in the present disclosure.

In the present disclosure, the memory 4330 may store the information transmitted and received and generated by the controller. For example, the memory 4330 may store the beam measurement result and store the information on the selected beam pair as the beam measurement result.

Figure 44:
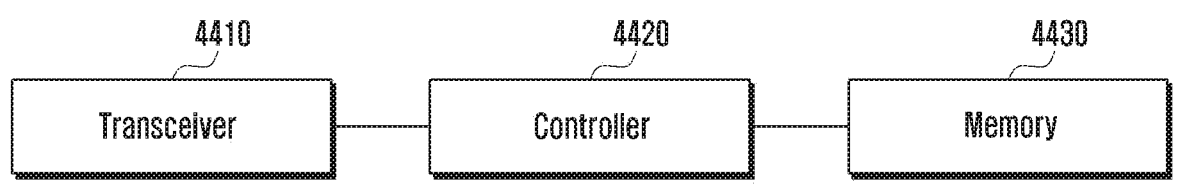
FIG. 44 is a diagram illustrating a configuration of a base station according to an embodiment of the present disclosure.

FIG. 44 is a diagram illustrating a configuration of the base station according to an embodiment of the present disclosure.

Referring to FIG. 44, the base station may be configured to include a transceiver 4400, a controller (e.g., at least one processor) 4420, and a memory 4410.

The transceiver 4410 may transmit and receive a signal. In detail, the transceiver 4410 may transmit the first BRS to the UE, transmit the SR for requesting the second BRS from the UE, and transmit the second BRS. Further, the transceiver 4410 may receive the beam measurement information.

The controller 4420 may be used to control the operation of the base station described in the present disclosure.

The controller 4420 may transmit the first BRS. The controller 4320 may request the second BRS when the specific condition is satisfied as the measurement result. The specific condition may mean the case in which the direction of the UE's beam or the base station's beam is changed. The detailed content of the specific condition is the same as those described above and therefore will be omitted below.

When the resource allocated to the UE is present, the controller 4420 may receive the second BRS request using the corresponding resource.

However, when no resource is allocated to the UE, the controller 4420 may receive the SR requesting the resource allocation for requesting the second BRS. When the controller 4420 receives the SR for requesting the uplink resource allocation, the controller 4420 may allocate the resource to the UE and receive the second BRS request using the resource.

Alternatively, the controller 4420 may set the separate scheduling request (second SR) in addition to the SR requesting the uplink resource allocation in the UE and when receiving the SR, the controller 4420 may transmit the second BRS.

However, when the second SR received to reduce the overhead of the SR transmission is received through the same beam as the serving beam of the base station, the controller 440 may transmit the second BRS but when the second SR is received through other beams, schedule the resource for feeding back the measurement result to receive the information on a newly determined base station's beam. The detailed content is the same as those described above.

The controller 4420 may transmit the second BRS when receiving the signal in the predetermined resource.

The controller 4420 may allocate the uplink resource when receiving the RA preamble used to perform the initial access or the timing advance and receive the second BRS request through the resource.

The controller 4320 may transmit the second BRS when receiving the RA preamble for requesting the second BRS. The detailed content is the same as those described above and therefore will be omitted below.

The controller 4420 may receive the beam measurement result generated on the basis of the second BRS. The controller 4420 may receive the information on the base station's beam having the best signal strength or quality.

Accordingly, the base station may transmit and receive data to and from the UE using the corresponding beam.

The first BRS and the second BRS may be transmitted through any one of the first beam and the second beam and the controller 4420 may determine the beam pair using the first BRS and the second BRS. The detailed content is the same as those described above and therefore will be omitted below.

In addition, the controller 4420 may control all the operations of the base station described in the present disclosure.

In the present disclosure, the memory 4430 may store the information transmitted and received and generated by the controller. For example, the memory 4330 may store the beam measurement result received from the UE and store the information on the selected base station's beam as the beam measurement result.

According to the present disclosure, it is possible to reduce the deterioration in communication quality by reselecting the beam within a short time when the direction of the UE is changed.

According to the present disclosure, it is possible to reduce the overhead of the signal caused at the time of requesting the reference signal for the reselection of the beam.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a user equipment (UE) in a communication system, the method comprising:
    receiving, from a base station, configuration information including information on a reference signal;
    in case that each of a plurality of beamformed reference signals is transmitted without transmission beam change according to the information on the reference signal, receiving, from the base station, based on changing a plurality of reception beams of the UE, the plurality of beamformed reference signals for beam measurement;
    in case that each of the plurality of beamformed reference signals is transmitted based on beam sweeping of transmission beams according to the information on the reference signal, receiving, from the base station, the plurality of beamformed reference signals for beam measurement;
    selecting a beam based on a measurement result of the plurality of the beamformed reference signals; and
    transmitting, to the base station, a measurement report including a reference signal received power (RSRP) and an identifier associated with the selected beam.

2. The method of claim 1, wherein the selecting of the beam further comprises:
    selecting the beam having a best signal strength or quality based on the measurement result of the plurality of the beamformed reference signals.

3. The method of claim 1, wherein the information on the reference signal includes a periodicity of the reference signal and resource information of the reference signal.

4. A method of a base station in a communication system, the method comprising:
    transmitting, to a user equipment (UE), configuration information including information on a reference signal;
    in case that each of a plurality of beamformed reference signals being transmitted without transmission beam change is configured to the UE according to the information on the reference signal, transmitting, to the UE, the plurality of beamformed reference signals for beam measurement;
    in case that each of the plurality of beamformed reference signals being transmitted based on beam sweeping of transmission beams is configured to the UE according to the information on the reference signal, transmitting, to the UE, the plurality of beamformed reference signals for beam measurement; and
    receiving, from the UE, a measurement report including a reference signal received power (RSRP) and an identifier associated with a selected beam,
    wherein the selected beam is determined based on a measurement result of the plurality of the beamformed reference signals.

5. The method of claim 4, wherein the selected beam having a best signal strength or quality is determined based on the measurement result of the plurality of the beamformed reference signals.

6. The method of claim 4, wherein the information on the reference signal includes a periodicity of the reference signal and resource information of the reference signal.

7. A user equipment (UE) in a communication system, the UE comprising:
    a transceiver; and
    a controller coupled with the transceiver and configured to:
        receive, from a base station, configuration information including information on a reference signal,
        in case that each of a plurality of beamformed reference signals is transmitted without transmission beam change according to the information on the reference signal, receive, from the base station, based on changing a plurality of reception beams of the UE, the plurality of beamformed reference signals for beam measurement,
        in case that each of the plurality of beamformed reference signals is transmitted based on beam sweeping of transmission beams according to the information on the reference signal, receive, from the base station, the plurality of beamformed reference signals for beam measurement, select a beam based on a measurement result of the plurality of the beamformed reference signals, and transmit, to the base station, a measurement report including a reference signal received power (RSRP) and an identifier associated with the selected beam.

8. The UE of claim 7, wherein the controller is configured to select the beam having a best signal strength or quality based on the measurement result of the plurality of the beamformed reference signals.

9. The UE of claim 7, wherein the information on the reference signal includes a periodicity of the reference signal and resource information of the reference signal.

10. A base station in a communication system, the base station comprising:

a transceiver; and a controller coupled with the transceiver and configured to:

transmit, to a user equipment (UE), configuration information including information on a reference signal, in case that each of a plurality of beamformed reference signals being transmitted without transmission beam change is configured to the UE according to the information on the reference signal, transmit, to the UE, the plurality of beamformed reference signals for beam measurement, in case that each of the plurality of beamformed reference signals being transmitted based on beam sweeping of transmission beams is configured to the UE according to the information on the reference signal, transmit, to the UE, the plurality of beamformed reference signals for beam measurement, and receive, from the UE, a measurement report including a reference signal received power (RSRP) and an identifier associated with a selected beam, wherein the selected beam is determined based on a measurement result of the plurality of the beamformed reference signals.

11. The base station of claim 10, wherein the selected beam having a best signal strength or quality is determined based on the measurement result of the plurality of the beamformed reference signals.

12. The base station of claim 10, wherein the information on the reference signal includes a periodicity of the reference signal and resource information of the reference signal.

* * * * *